(12) United States Patent
Grandidge et al.

(10) Patent No.: US 9,997,899 B2
(45) Date of Patent: Jun. 12, 2018

(54) MODULAR CABLE MANAGEMENT SPOOLS

(71) Applicant: Ortronics, Inc., New London, CT (US)

(72) Inventors: Ryan J. Grandidge, Westerly, RI (US); Rudolph A. Montgelas, West Hartford, CT (US); Lars R. Larsen, Old Lyme, CT (US); Chris M. Vacca, Westerly, RI (US)

(73) Assignee: Ortronics, Inc., New London, CT (US)

( * ) Notice: Subject to any disclaimer, the term of this patent is extended or adjusted under 35 U.S.C. 154(b) by 133 days.

(21) Appl. No.: 14/683,503

(22) Filed: Apr. 10, 2015

(65) Prior Publication Data

US 2015/0362092 A1  Dec. 17, 2015

Related U.S. Application Data

(63) Continuation-in-part of application No. 14/304,079, filed on Jun. 13, 2014, now Pat. No. 9,429,252.

(60) Provisional application No. 62/013,079, filed on Jun. 17, 2014.

(51) Int. Cl.
| | |
|---|---|
| *F16L 3/22* | (2006.01) |
| *H02G 11/02* | (2006.01) |
| *G02B 6/44* | (2006.01) |
| *H04Q 1/06* | (2006.01) |
| *H04Q 1/02* | (2006.01) |

(52) U.S. Cl.
CPC ........... *H02G 11/02* (2013.01); *G02B 6/4457* (2013.01); *H04Q 1/06* (2013.01); *H04Q 1/13* (2013.01); *Y10T 29/49828* (2015.01)

(58) Field of Classification Search
CPC .... H02G 11/02; G02B 6/4457; G02B 6/4452; G02B 6/4455; G02B 6/4458; H04Q 1/06; H04Q 1/13; B65H 75/22; Y10T 29/49828

USPC ...... 242/605, 118.41, 590, 608.2, 607, 118.4
See application file for complete search history.

(56) References Cited

U.S. PATENT DOCUMENTS

| | | | |
|---|---|---|---|
| 6,278,830 B1 * | 8/2001 | Levesque | G02B 6/4478 385/135 |
| 6,396,989 B1 * | 5/2002 | Johnston | G02B 6/3897 248/74.2 |
| 6,968,647 B2 | 11/2005 | Levesque et al. | |
| 7,225,586 B2 | 6/2007 | Levesque et al. | |

(Continued)

OTHER PUBLICATIONS

U.S. Appl. No. 14/304,079, filed Jun. 13, 2014.
(Continued)

*Primary Examiner* — Christopher Garft
(74) *Attorney, Agent, or Firm* — McCarter & English, LLP

(57) ABSTRACT

Improved cable management spools for patch panel assemblies/patching systems are provided. The present disclosure provides improved systems/methods for the design and use of modular cable management spool assemblies configured to mount with respect to media patching systems (e.g., to patch panel assemblies configured to support multiple media connections). The modular cable management spools are configured to mount with respect to media patching systems and/or to related supporting structures (e.g., to cable management plates, to racks, etc.) for cable management purposes. Disclosed herein is a patching system utilizing modular cable management spools for cable management purposes, the patching system (e.g., high density patching system) configured to support copper-based and/or fiber optic connections in the same patching system/enclosure.

19 Claims, 46 Drawing Sheets

(56) References Cited

U.S. PATENT DOCUMENTS

| | | |
|---|---|---|
| 7,697,811 B2 | 4/2010 | Murano et al. |
| 7,983,038 B2 | 7/2011 | Levesque et al. |
| 8,106,311 B2 | 1/2012 | Larsen et al. |
| 8,130,494 B2 | 3/2012 | Larsen et al. |
| 8,184,938 B2 | 5/2012 | Cooke et al. |
| 8,398,039 B2 | 3/2013 | Murano et al. |
| 8,439,702 B2 | 5/2013 | Dietz et al. |
| 8,526,181 B2 | 9/2013 | Levesque et al. |
| 8,672,709 B2 | 3/2014 | Dietz et al. |
| 8,731,364 B2 | 5/2014 | Murano et al. |
| 8,758,047 B2 | 6/2014 | Dietz et al. |
| 2002/0097973 A1* | 7/2002 | Petri .................... G02B 6/4457 385/134 |
| 2009/0067800 A1* | 3/2009 | Vazquez .............. G02B 6/4455 385/135 |
| 2009/0129014 A1 | 5/2009 | Larsen et al. |
| 2014/0206273 A1 | 7/2014 | Larsen et al. |

OTHER PUBLICATIONS

U.S. Appl. No. 62/013,079, filed Jun. 17, 2014.
U.S. Appl. No. 14/683,433, filed Apr. 10, 2015.
U.S. Appl. No. 14/683,503, filed Apr. 10, 2015.
U.S. Appl. No. 14/683,569, filed Apr. 10, 2015.
U.S. Appl. No. 14/683,723, filed Apr. 10, 2015.
U.S. Appl. No. 14/683,786, filed Apr. 10, 2015.

* cited by examiner

MODULAR CABLE MANAGEMENT SPOOLS

CROSS-REFERENCE TO RELATED APPLICATIONS

This application claims priority to and is a continuation-in-part of co-pending U.S. patent application Ser. No. 14/304,079 (entitled "Cable Trough") filed Jun. 13, 2014, and this application also claims the benefit of U.S. Provisional Application No. 62/013,079 filed Jun. 17, 2014, both of which are hereby incorporated by reference in their entireties.

FIELD OF THE DISCLOSURE

The present disclosure relates to modular cable management spools and, more particularly, to modular cable management spool assemblies configured to mount with respect to media patching systems (e.g., to patch panel assemblies/cable management plates) and/or to related supporting structures (e.g., to racks) for cable management purposes.

BACKGROUND OF THE DISCLOSURE

In general, devices for interfacing with high frequency data transfer media are known. See, e.g., U.S. Pat. Nos. 8,439,702; 8,672,709 and 8,731,364, the entire contents of each being hereby incorporated by reference in their entireties.

For example, connectors or jack assemblies having a plurality of contacts (e.g., modular communication jacks) have been developed that facilitate communication with contacts in connecting assemblies (e.g., plug connectors), that in turn interact with various media (e.g., copper-based media such as unshielded twisted pair (UTP) media, fiber optic cables, etc.). The jack assembly contacts are typically positioned for communication with data signal transmission media plug elements/contacts introduced to a receiving space of the jack assembly.

In general, many data transfer media includes multiple pairs of lines bundled together. Communications systems typically incorporate such media (e.g., UTP media, fiber optic cables, etc.) and connectors (e.g., jack/plug combinations) for data transfer. For example, a plurality of jack assemblies/housings may be positioned adjacent one another in a multi-gang jack panel or the like, with each jack assembly/housing releasably secured and/or attached to the jack panel or the like.

In general, commercial buildings require an effective and efficient telecommunications infrastructure to support the wide variety of services that rely on the transport of information. Typically, wiring systems within buildings are terminated at a location where they may be interconnected with one another, and/or to other cabling systems or telecommunications equipment. Cables are often terminated on wire panels or patch panels or the like, which can be mounted to racks or to some other location/structure.

Patch panels are known in the field of data communication systems. See, e.g., U.S. Pat. No. 8,106,311, the entire contents of which is hereby incorporated by reference in its entirety. Some other exemplary assemblies/systems in this general field are described and disclosed in U.S. Pat. Nos. 7,697,811; 7,983,038; 8,184,938; 8,398,039; and U.S. Patent Pub. Nos. 2012/0064760 and 2013/0129296, the entire contents of each being hereby incorporated by reference in their entireties.

A patch panel generally provides a plurality of network ports incorporated into a structural element that connect incoming and outgoing lines of a communication/electrical system (e.g., a local area network (LAN) or the like). Typical patch panels are mounted hardware units that include a plurality of port locations, and utilize cables for interconnections. A patch panel can use patch cords to create the interconnections. Patch panel systems are generally intended to facilitate organization and management in implementing telecommunications wiring systems (e.g., for high speed data networks).

In general, many rows of cabinets or racks typically fill a data center or telecommunications room. Patch panels affixed to a rack and/or a telecommunications room provide convenient access to telecommunication devices (e.g., servers) within the rack or room. As the demand for the use of telecommunication devices rapidly grows, space for such devices becomes limited and/or expensive.

A constant need exists among manufacturers to develop patch panel assemblies/patching systems or the like that include improved features and structures.

Thus, an interest exists for improved patch panel assemblies/patching systems and related accessories. These and other inefficiencies and opportunities for improvement are addressed and/or overcome by the assemblies, systems and methods of the present disclosure.

SUMMARY OF THE DISCLOSURE

The present disclosure provides advantageous modular cable management spools configured to mount with respect to media patching systems (e.g., to patch panel assemblies configured to support multiple media connections). More particularly, the present disclosure provides improved systems/methods for the design and use of modular cable management spool assemblies configured to mount with respect to media patching systems (e.g., to patch panel assemblies/cable management plates) and/or to related supporting structures (e.g., to racks) for cable management purposes.

In exemplary embodiments, disclosed herein is a patching system utilizing modular cable management spools for cable management purposes, the patching system (e.g., high density patching system) configured to support multiple media connections (e.g., copper-based and/or fiber optic connections) in the same patching system/enclosure. For example, high density jack patch panels can be utilized to support multiple media connections (e.g., copper and/or fiber optic connections). Exemplary patching assemblies disclosed herein can advantageously increase the patching density of the systems of the present disclosure, and provide improved access to the media connectors and cabling elements.

Disclosed herein is an advantageous cable management spool assembly, the cable management spool assembly including at least one spool member, with each spool member having top and bottom walls extending from an inner wall. The top, bottom and inner walls define a cavity that is configured and dimensioned to support and/or at least partially house media cables or the like. Exemplary spool members include attachment features/structures (e.g., flanges) that are advantageously configured and dimensioned to releasably mount with respect to media patching systems (e.g., to patch panel assemblies/cable management plates) and/or to related supporting structures (e.g., relative to vent holes of a rack) for cable management purposes.

The present disclosure provides for a cable management assembly including a mounting body; a first spool member having an inner wall, with a top wall and a bottom wall extending from the inner wall to define a cavity configured to support and at least partially house media cables; and at least one flange extending from the bottom wall, the at least one flange configured to releasably mount to the mounting body; wherein the inner, top and bottom walls of the first spool member each extend substantially arcuately from a first end to a second end; and wherein the mounting body is configured to be removably mounted to an aperture of a supporting unit.

The present disclosure also provides for a cable management assembly further including second, third and fourth spool members, the second, third and fourth spool members each having an inner wall, a top wall and a bottom wall, with the inner, top and bottom walls of the second, third and fourth spool members each defining a respective cavity configured to support and at least partially house media cables; and wherein the second, third and fourth spool members each include at least one flange extending from its respective bottom wall, each flange configured to releasably mount to the mounting body.

The present disclosure also provides for a cable management assembly wherein the first, second, third and fourth spool members each include at least one slot positioned on its respective top wall; wherein the slot of the first spool member is configured to releasably mount to a first upper spool member; wherein the slot of the second spool member is configured to releasably mount to a second upper spool member; wherein the slot of the third spool member is configured to releasably mount to a third upper spool member; and wherein the slot of the fourth spool member is configured to releasably mount to a fourth upper spool member.

The present disclosure also provides for a cable management assembly wherein the inner, top and bottom walls of the first, second, third and fourth spool members each extend substantially arcuately from a first end to a second end. The present disclosure also provides for a cable management assembly wherein when the first, second, third and fourth spool members are releasably mounted to the mounting body, the inner, top and bottom walls of the first, second, third and fourth spool members are positioned so that: (i) the inner walls of the first, second, third and fourth spool members define a substantially circular and substantially continuous inner surface, (ii) the top walls of the first, second, third and fourth spool members define a substantially circular and substantially continuous top surface, and (iii) the bottom walls of the first, second, third and fourth spool members define a substantially circular and substantially continuous bottom surface.

The present disclosure also provides for a cable management assembly wherein the first end of the bottom wall of the first spool member includes a first abutment wall extending from an outer end of the bottom wall, and the second end of the bottom wall of the second spool member includes a second abutment wall extending from an outer end of the bottom wall; and wherein the first abutment wall is positioned proximal to the second abutment wall after the first and second spool members are releasably mounted to the mounting body.

The present disclosure also provides for a cable management assembly wherein the bottom wall extends from an inner end to an outer end; and wherein the inner end includes a first flange, and the outer end includes a second and a third flange, with the first, second and third flanges each configured to releasably mount to the mounting body.

The present disclosure also provides for a cable management assembly wherein the top wall extends from an inner end to an outer end; and wherein the inner end includes a first slot and the outer end includes a second and a third slot, with the first, second and third slots positioned on the top wall and configured to releasably mount to a first upper spool member.

The present disclosure also provides for a cable management assembly wherein the top and bottom walls are substantially parallel to one another, and the inner wall is substantially perpendicular to the top and bottom walls.

The present disclosure also provides for a cable management assembly further including at least one additional spool member, each of the at least one additional spool members having an inner wall and a top wall and a bottom wall extending from the inner wall to define a cavity configured to support and at least partially house media cables, with at least one flange extending from each bottom wall, each flange configured to releasably mount to the mounting body; wherein the inner wall of each of the at least one additional spool member extends substantially arcuately from a first end to a second end; and when the first spool member and each of the at least one additional spool members are all mounted to the mounting body, the inner walls of the plurality of spool members are positioned to define a substantially circular inner surface.

The present disclosure also provides for a cable management assembly wherein the supporting unit is a rack; and wherein the aperture of the rack has a substantially hexagonal shape.

The present disclosure also provides for a cable management assembly wherein the mounting body includes a mounting surface, with an attachment flange extending from the mounting surface, the attachment flange including: (i) a first attachment member extending from a first flange wall of the attachment flange, and (ii) a second attachment member extending from a second flange wall of the attachment flange; wherein the first and second flange walls are proximal to one another and angled at a first pre-determined angle relative to one another; wherein the first and second attachment members are proximal to one another and angled at the first pre-determined angle relative to one another; wherein the first attachment member is configured to releasably mount to an edge of the aperture of the supporting unit when the attachment flange is in a first angled position relative to the supporting unit; and wherein the second attachment member is configured to releasably mount to the edge of the aperture of the supporting unit when the attachment flange is in a second angled position relative to the supporting unit.

The present disclosure also provides for a cable management assembly wherein the second attachment member is unable to mount to the edge of the aperture of the supporting unit when the attachment flange is in the first angled position relative to the supporting unit; and wherein the first attachment member is unable to mount to the edge of the aperture of the supporting unit when the attachment flange is in the second angled position relative to the supporting unit.

The present disclosure also provides for a cable management assembly further including a third attachment member extending from a third flange wall of the attachment flange, and a fourth attachment member extending from a fourth flange wall of the attachment flange; wherein the third and fourth flange walls are proximal to one another and angled at a second pre-determined angle relative to one another; wherein the third and fourth attachment members are proximal to one another and angled at the second pre-determined angle relative to one another; wherein the first and third attachment members are configured to releasably mount to the edge of the aperture of the supporting unit when the attachment flange is in the first angled position relative to the supporting unit; and wherein the second and fourth attachment members are configured to releasably mount to the edge of the aperture of the supporting unit when the attachment flange is in the second angled position relative to the supporting unit.

The present disclosure also provides for a cable management assembly wherein the mounting surface includes a hole therethrough, the hole configured to substantially match up with and align with the aperture when the attachment flange is in the first or second angled position relative to the supporting unit.

The present disclosure also provides for a cable management assembly including a mounting member; a first spool member having an inner wall, with a top wall and a bottom wall extending from the inner wall to define a cavity configured to support and at least partially house media cables; and at least one flange extending from the bottom wall, the at least one flange configured to releasably mount to the mounting member; wherein the inner, top and bottom walls of the first spool member each extend substantially arcuately from a first end to a second end; and wherein the mounting member is configured to be removably mounted to a manager member, the manager member having one or more horizontal members and one or more vertical members.

The present disclosure also provides for a cable management assembly wherein the manager member is configured to be removably mounted with respect to a panel assembly with the manager member engaging a protrusion member of a first side segment of the panel assembly, and with the manager member engaging a protrusion member of a second side segment of the panel assembly.

The present disclosure also provides for a cable management assembly wherein the removably mounted manager member translates along with the panel assembly when the panel assembly is moved relative to first and second bracket members.

The present disclosure also provides for a method for assembling a cable management spool assembly, the cable management spool assembly including a first plurality of spool members, each spool member of the first plurality of spool members having an inner wall, a top wall, and a bottom wall extending from the inner wall to define a cavity configured to support and at least partially house media cables, each spool member of the first plurality of spool members further having at least one flange extending from the bottom wall, the method including releasably mounting the at least one flange of each spool member of the first plurality of spool members to a mounting body; and removably mounting the mounting body to an aperture of a supporting unit; wherein after the first plurality of spool members are releasably mounted to the mounting body, the inner walls of the first plurality of spool members are positioned to define a substantially circular inner surface.

The present disclosure also provides for a method for assembling a cable management spool assembly wherein the cable management spool assembly further includes a second plurality of spool members, each spool member of the second plurality of spool members having an inner wall, a top wall, and a bottom wall extending from the inner wall to define a cavity configured to support and at least partially house media cables, each spool member of the second plurality of spool members further having at least one flange extending from the bottom wall, the method further including releasably mounting the at least one flange of each spool member of the second plurality of spool members to a spool member of the first plurality of spool members such that each spool member of the second plurality of spool members is located above a respective spool member of the first plurality of spool members; wherein after the second plurality of spool members are releasably mounted to the first plurality of spool members, the inner walls of the second plurality of spool members are positioned to define a substantially circular inner surface.

Any combination or permutation of embodiments is envisioned. Additional advantageous features, functions and applications of the disclosed systems, methods and assemblies of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein.

DETAILED DESCRIPTION OF DISCLOSURE

Figure 1:
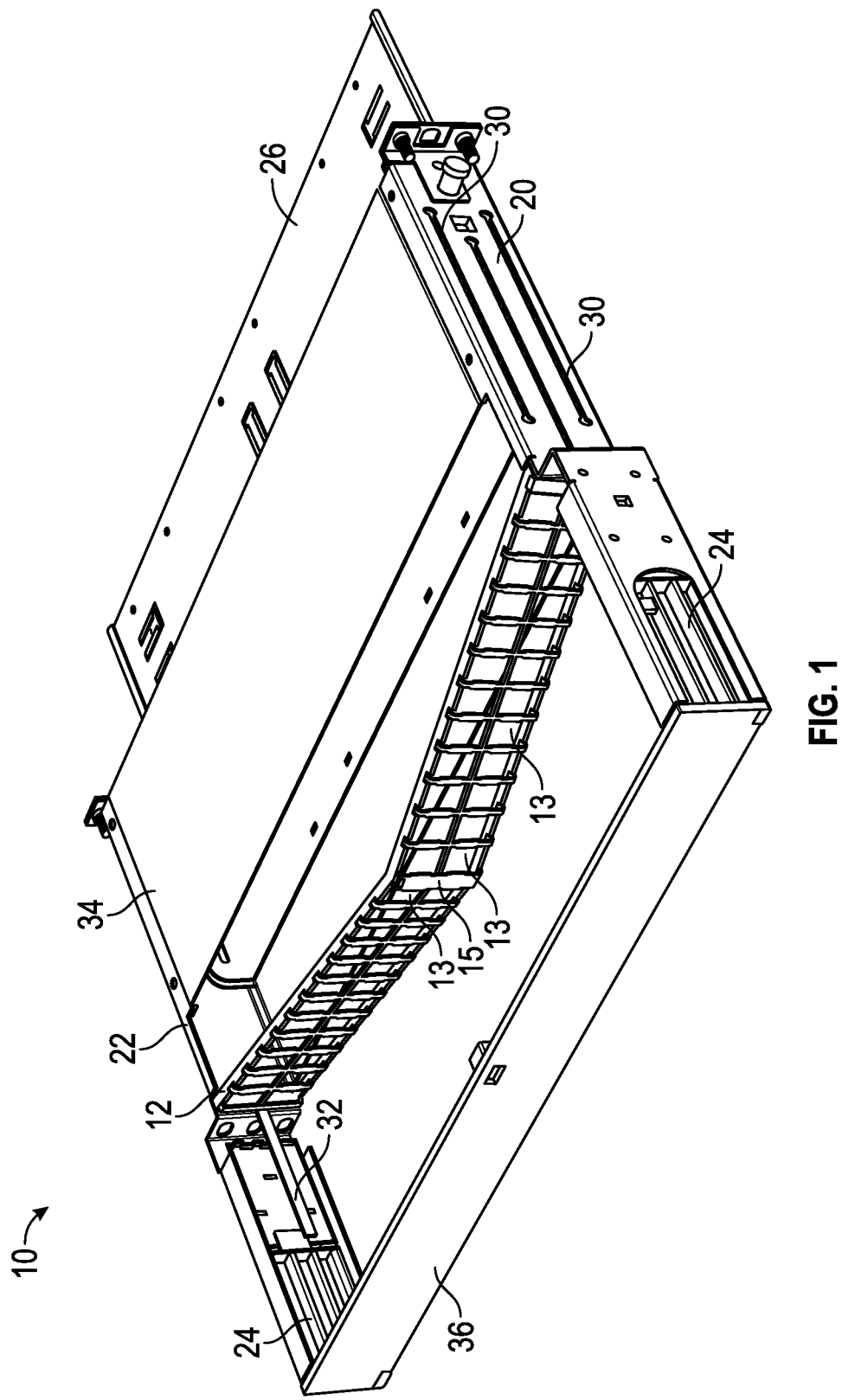
FIG. 1 is a top perspective view of a media patching system according to an exemplary embodiment of the present disclosure, prior to connector assemblies mounted to the system.
Figure 2:
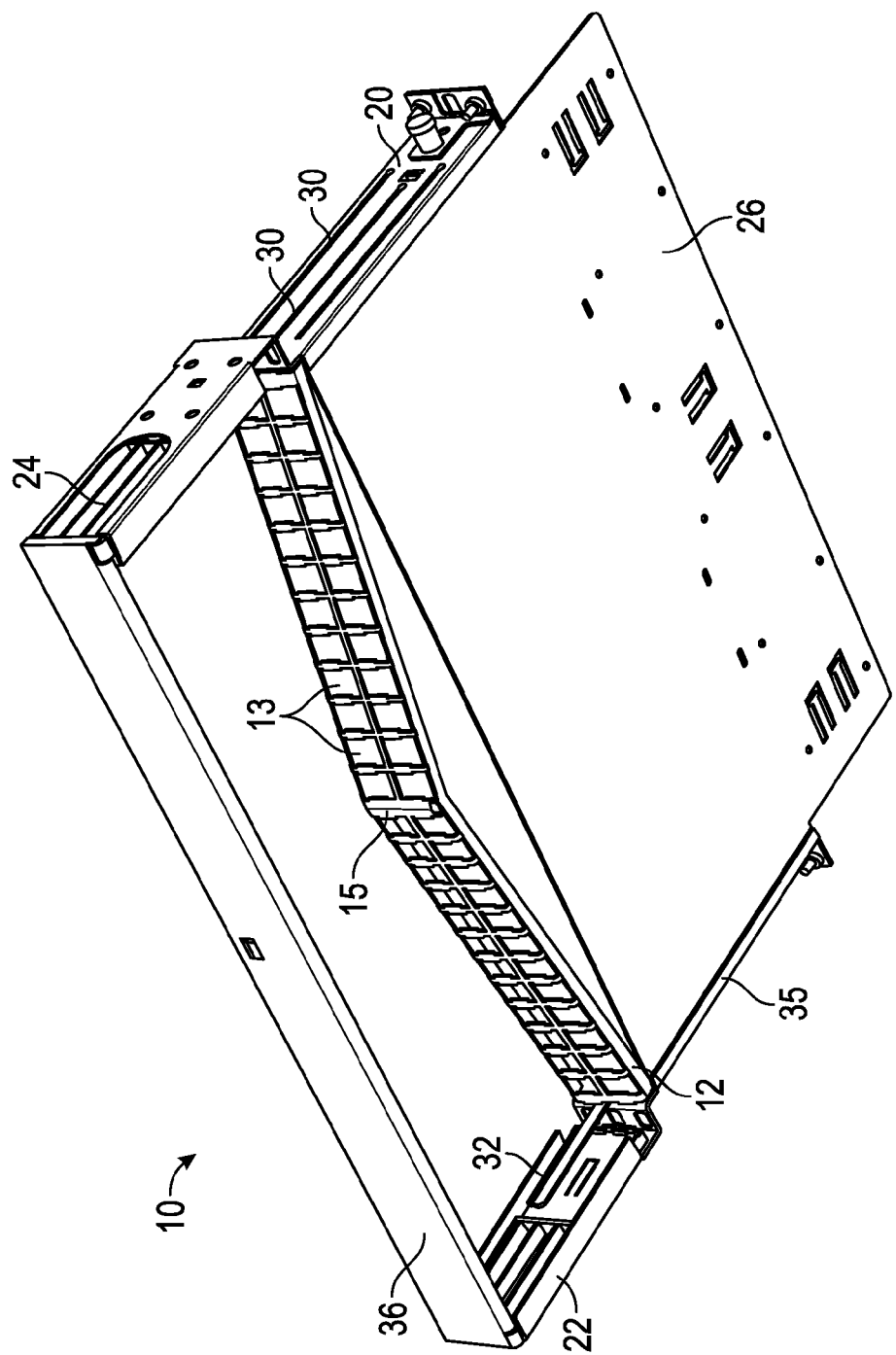
FIG. 2 is a bottom perspective view of the system of FIG. 1.
Figure 3:
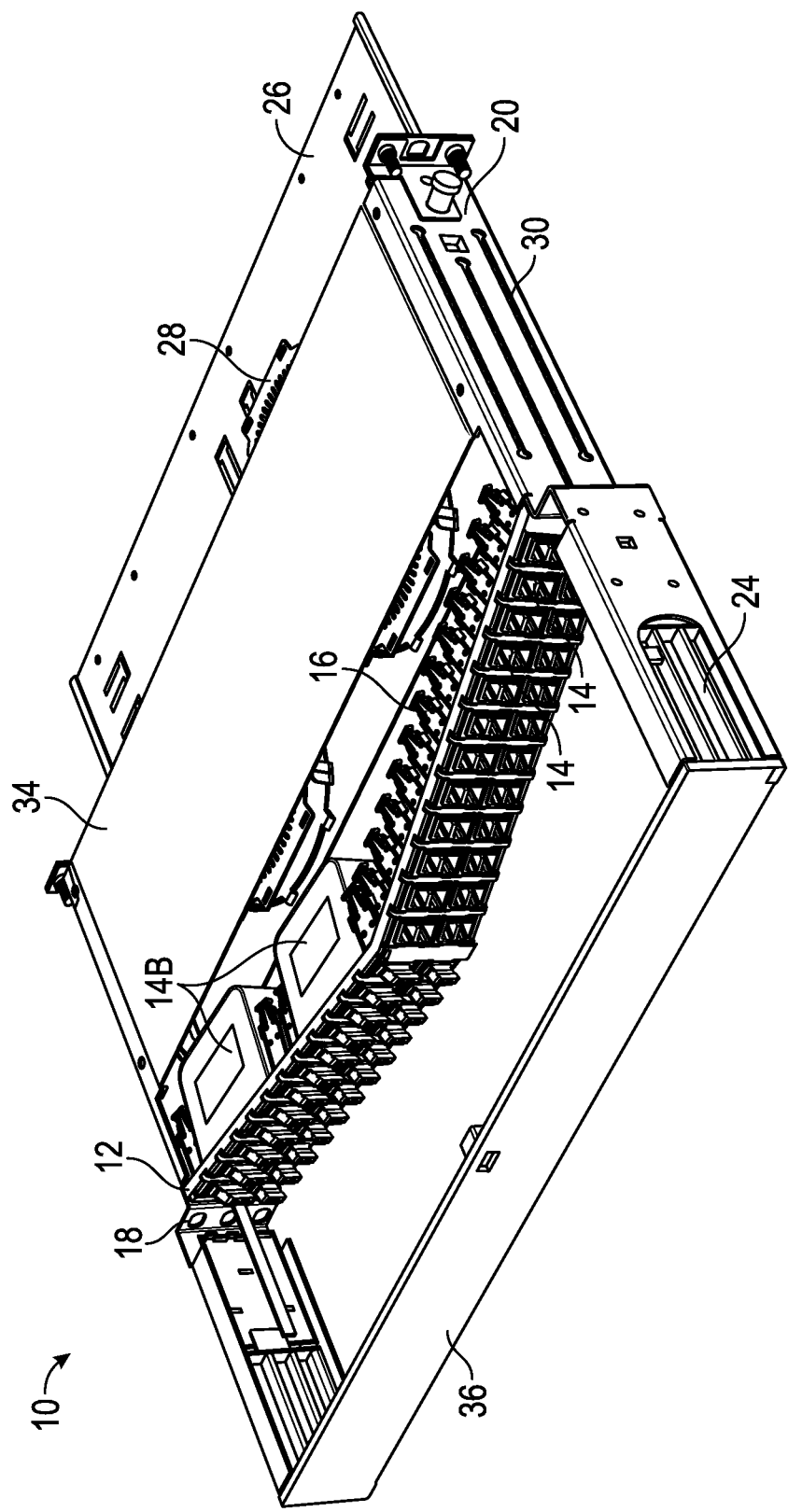
FIG. 3 is a top perspective view of the system of FIG. 1, after exemplary connector assemblies are mounted to the system.
Figure 4:
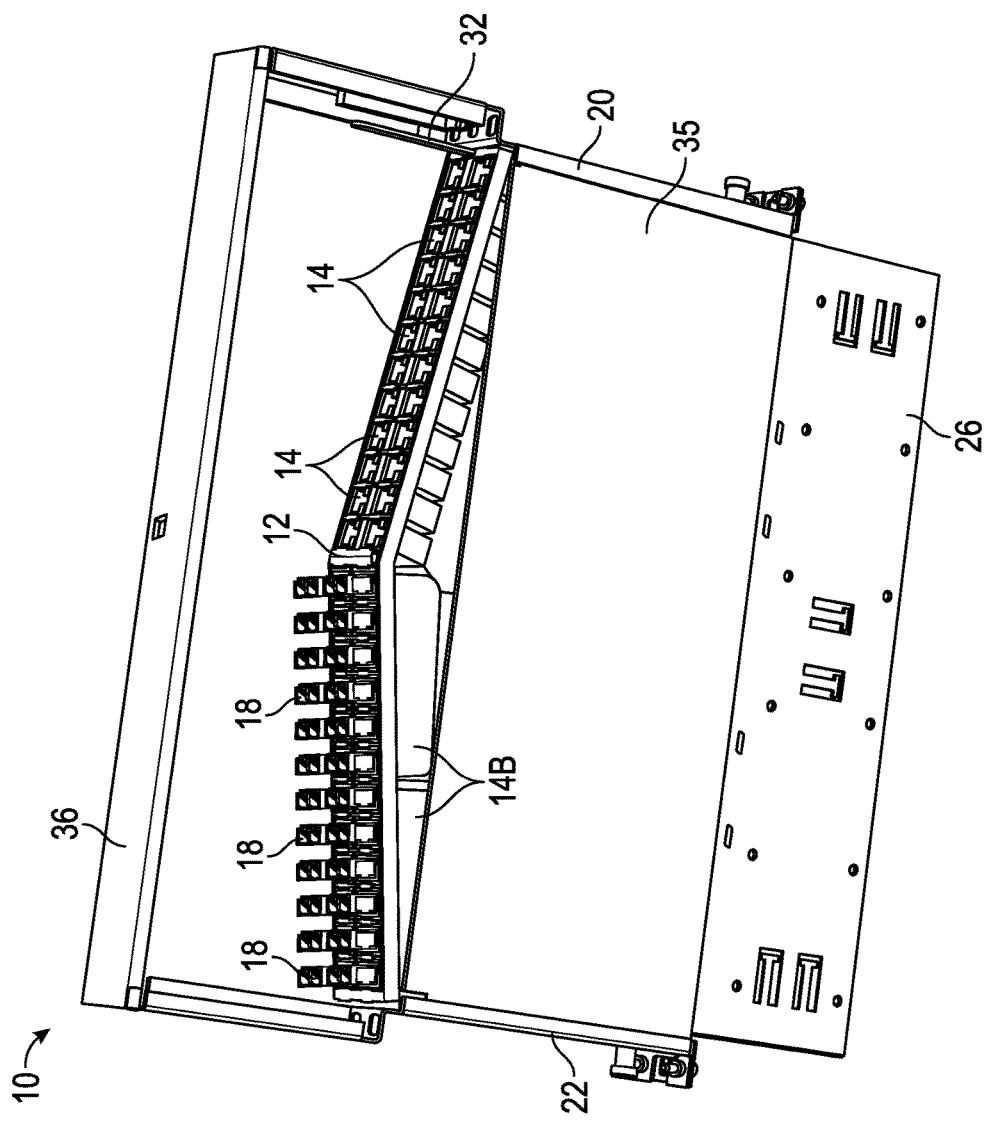
FIG. 4 is a bottom perspective view of the system of FIG. 3.
Figure 5:
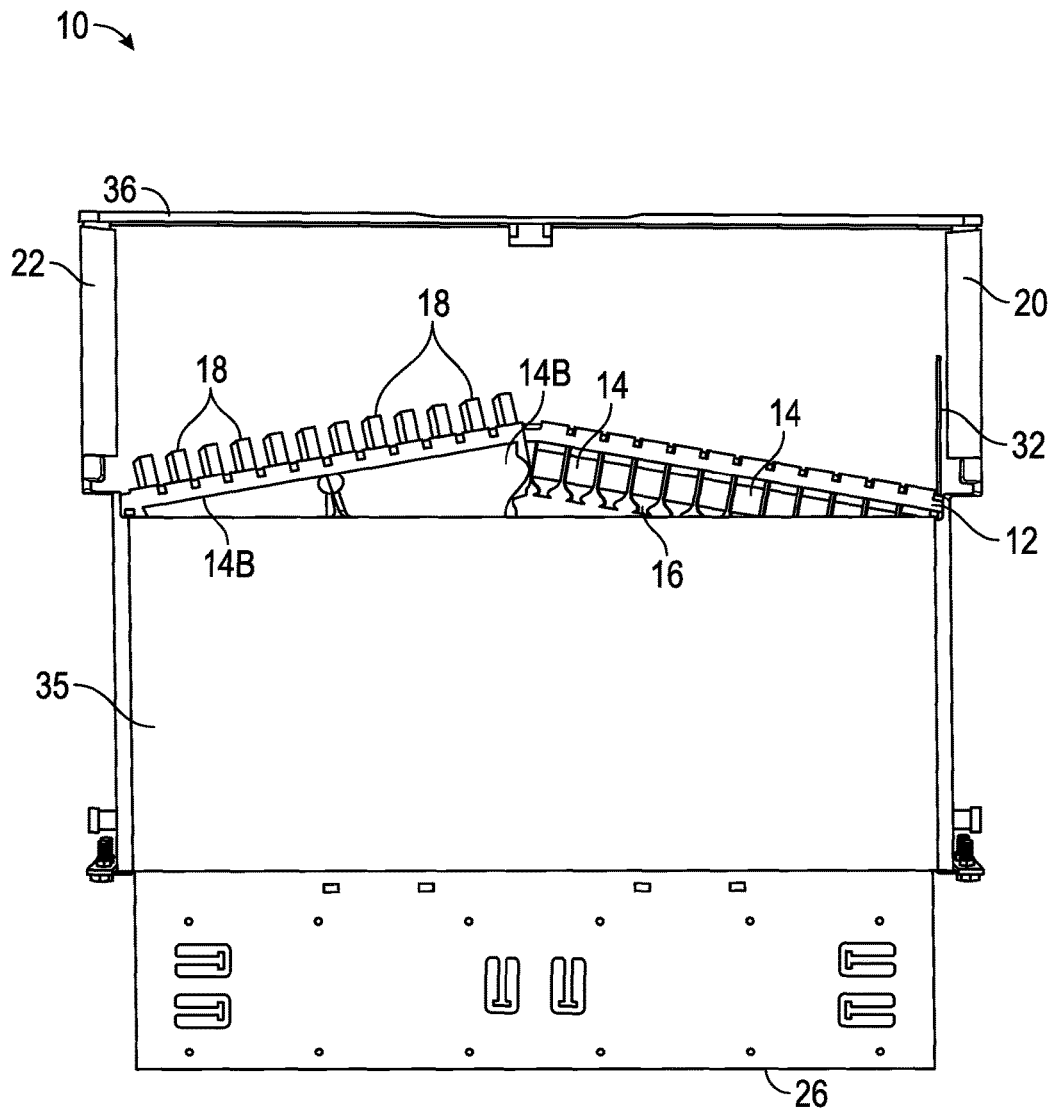
FIG. 5 is a bottom view of the system of FIG. 3.
Figure 6:
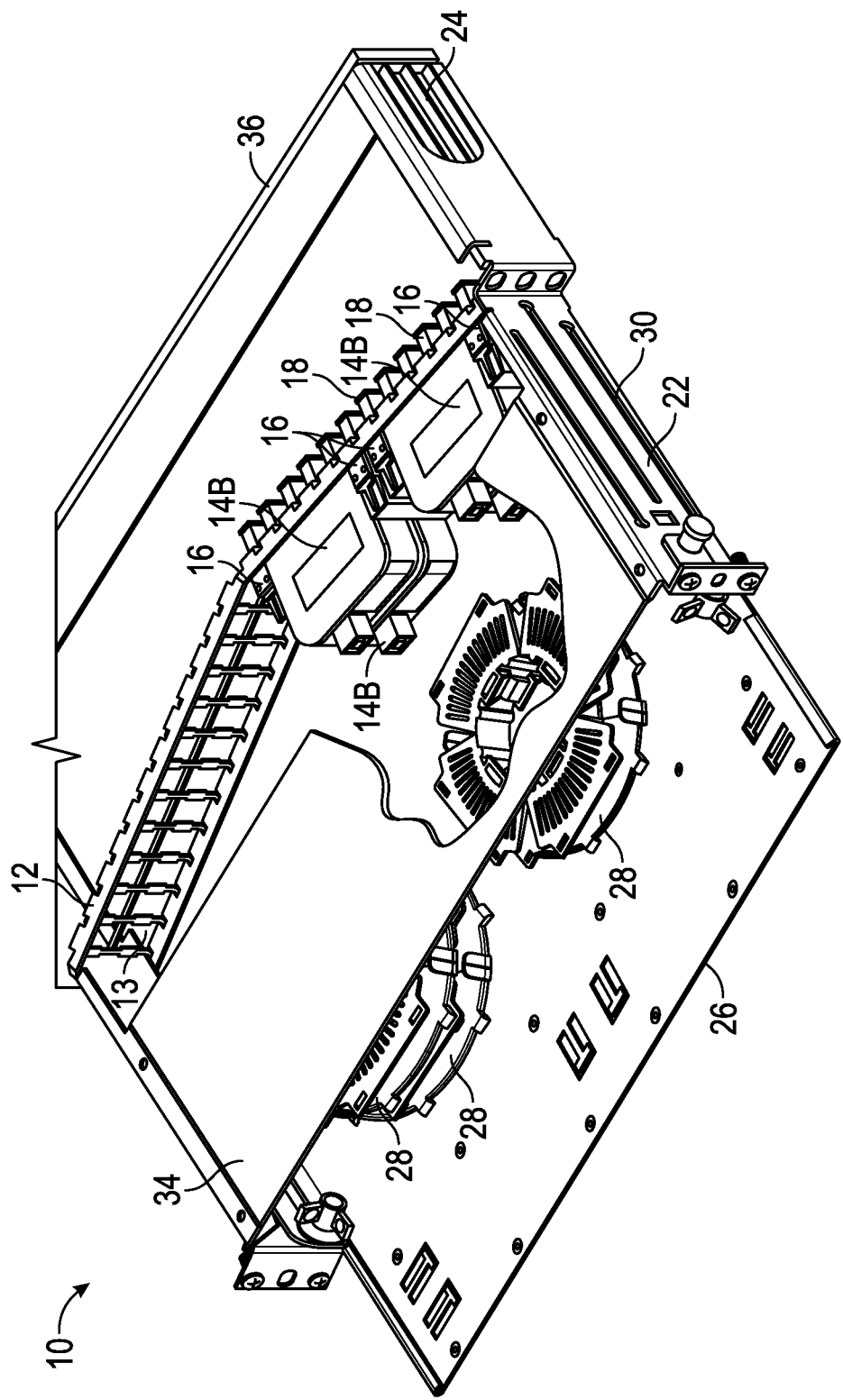
FIG. 6 is a partial top perspective view of the system of FIG. 1, after exemplary connector assemblies are mounted to the system.

The exemplary embodiments disclosed herein are illustrative of advantageous cable management spool assemblies for media patching systems of the present disclosure and methods/techniques thereof. It should be understood, however, that the disclosed embodiments are merely exemplary of the present disclosure, which may be embodied in various forms. Therefore, details disclosed herein with reference to exemplary cable management spool assemblies/fabrication methods and associated processes/techniques of assembly and use are not to be interpreted as limiting, but merely as the basis for teaching one skilled in the art how to make and use the advantageous cable management spool assemblies/systems and/or alternative assemblies of the present disclosure.

In general, the present disclosure provides improved spool assemblies for patching systems (e.g., patch panel assemblies) and related structures, and improved methods for using the same. The present disclosure provides improved systems/methods for the design and use of modular cable management spools configured to mount with respect to media patching systems (e.g., to patch panel assemblies configured to support multiple media connections).

More particularly, the present disclosure provides advantageous systems/methods for the design and use of modular cable management spool assemblies configured to mount with respect to media patching systems (e.g., to patch panel assemblies/cable management plates) or to related supporting structures (e.g., to racks) for cable management purposes.

In exemplary embodiments, the present disclosure provides for an advantageous cable management spool assembly, the cable management spool assembly including at least one spool member, with each spool member having top and bottom walls extending from an inner wall. In general, the top, bottom and inner walls define a cavity that is configured and dimensioned to support and/or at least partially house media cables or the like. Spool members can include attachment features/structures (e.g., flanges) that are configured to releasably mount with respect to media patching systems (e.g., to cable management plates or the like) and/or to related supporting structures (e.g., to a rack) for cable management purposes.

Disclosed herein is a patching system (e.g., high density patching system) configured to support multiple media connections. The improved systems provide users with the ability to install multiple media connections (e.g., copper-based and/or fiber optic connections) in the same patching system/enclosure. For example, high density jack patch panels can be utilized to support multiple media connections. The exemplary patching systems can be used to support one or more types of cables used in a communication network. Moreover, exemplary patch panel assemblies disclosed herein can advantageously increase patching density of the media patching system while maintaining port accessibility.

In exemplary embodiments, the present disclosure provides for improved systems/methods for the design/use of patch panel assemblies configured to support multiple media connections (e.g., copper and/or fiber optic connections) in the same patching system/enclosure, thereby providing a significant operational, commercial and/or manufacturing advantage as a result.

Moreover, the present disclosure also provides for cable management spool assemblies advantageously configured to mount with respect to media patching systems (e.g., to cable management plates) or to related supporting structures (e.g., to racks) for cable management purposes, thereby providing a significant operational, commercial and/or manufacturing advantage as a result. More particularly, current practice provides that many media cables associated with media patching systems or the like travel to and/or from the media patching systems, and such cables may be unsupported and/or insufficiently supported during this travel. In exemplary embodiments, the present disclosure provides for improved systems/methods for the design and use of advantageous cable management spool assemblies configured to support media cables associated with a media patching system or the like, thereby providing a significant operational, commercial and/or manufacturing advantage as a result.

Referring now to the drawings, like parts are marked throughout the specification and drawings with the same reference numerals, respectively. Drawing figures are not necessarily to scale and in certain views, parts may have been exaggerated for purposes of clarity.

With reference to FIGS. 1-6, there is illustrated an embodiment of an exemplary media patching system 10 according to the present disclosure. In general, media patching system 10 is configured and dimensioned to be used as a patching system for media connections. More particularly, media patching system 10 can be configured to support high density, multiple (mixed) media connections, as discussed further below. It is noted that media patching system 10 can take a variety of forms, shapes and/or designs.

In exemplary embodiments, system 10 is a high density patching system configured to support multiple (mixed) media connections. In certain embodiments, system 10 provides users with the ability to install multiple media connections (e.g., copper-based connections, fiber optic connections, combinations thereof, or the like) in the same patching system/enclosure 10.

As discussed further below, panel assemblies 12 (e.g., patch panel assemblies/multi-connector panel assemblies 12) can be utilized with system 10 to support multiple media connections (e.g., copper and/or fiber optic connections). Exemplary patch panel assemblies/multi-connector panel assemblies 12 disclosed herein can advantageously increase the patching density of system 10.

Figure 11:
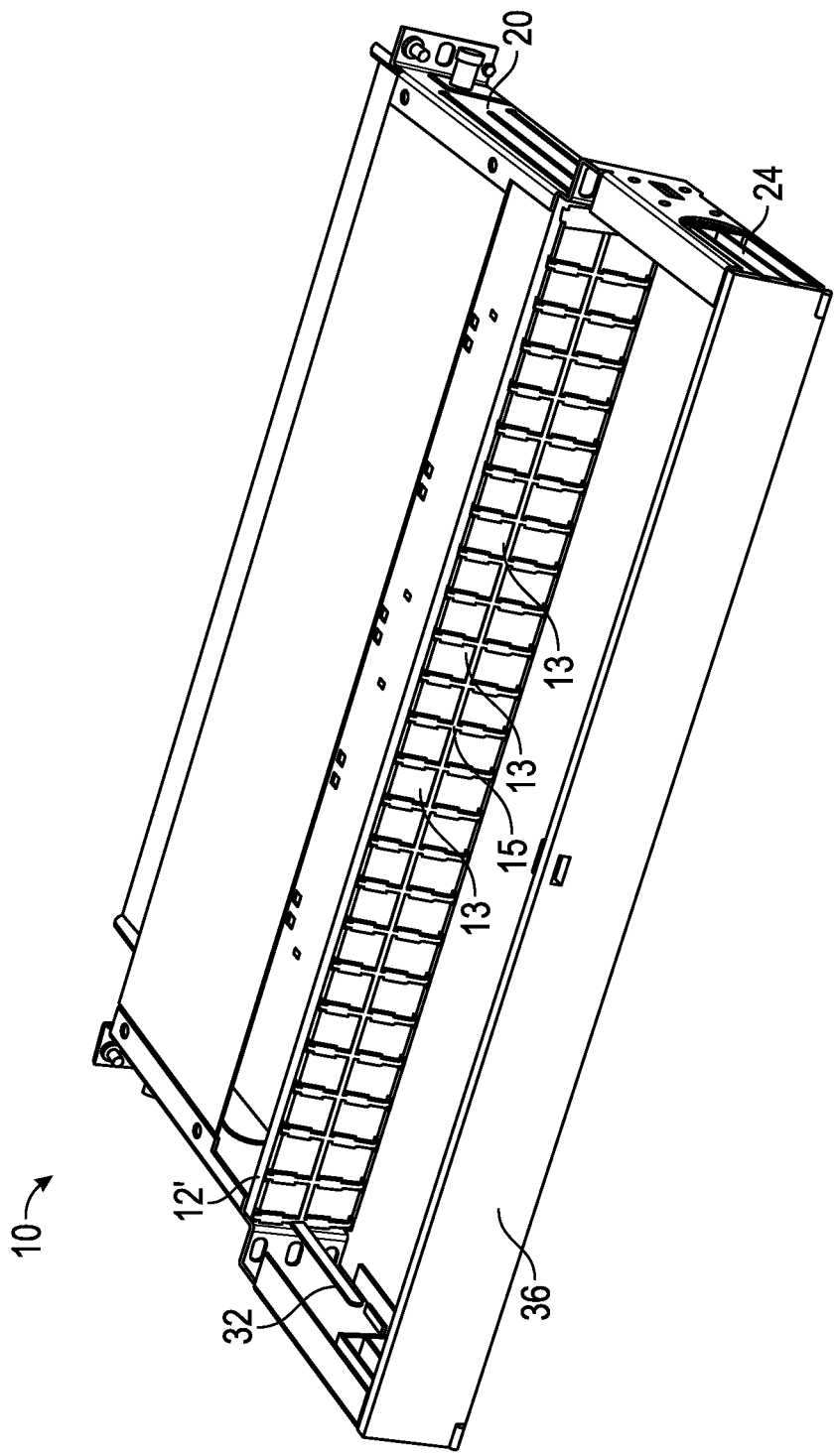
FIG. 11 is a top perspective view of another exemplary media patching system of the present disclosure, prior to connector assemblies mounted to the system.
Figure 12:
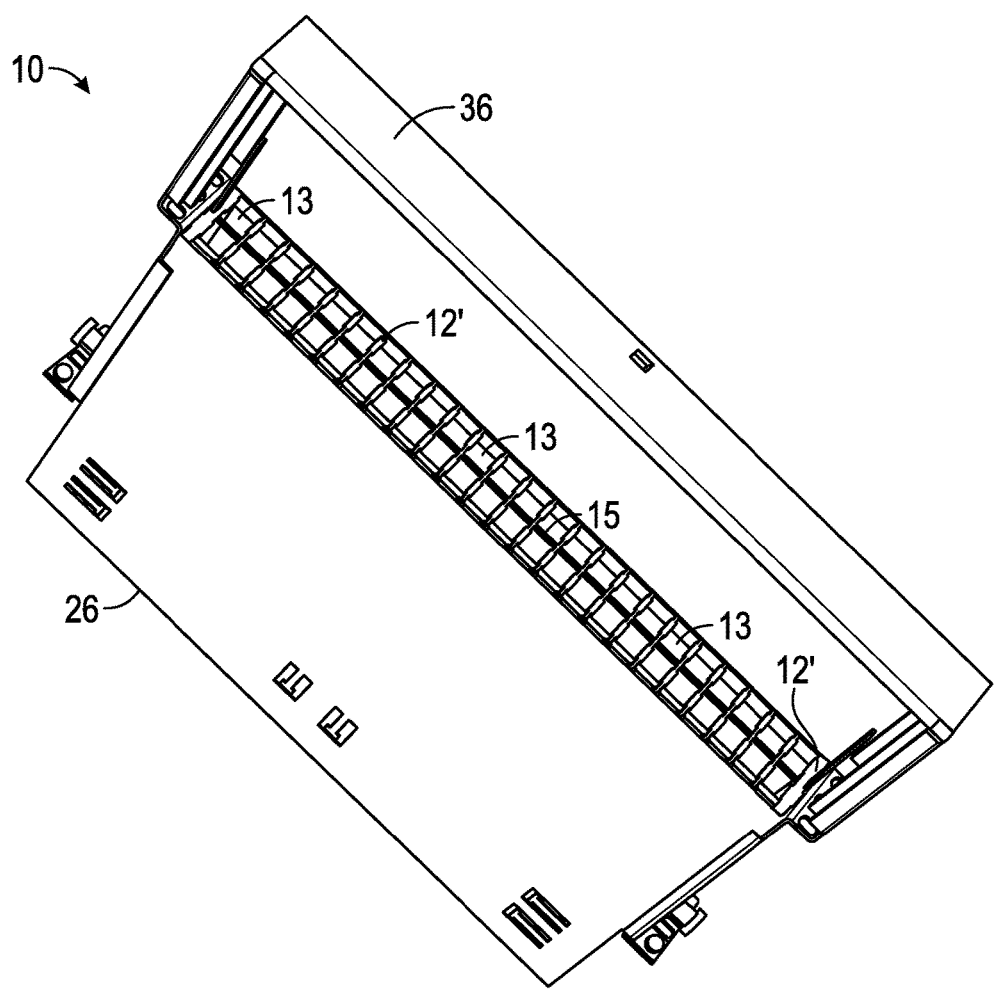
FIG. 12 is a bottom perspective view of the system of FIG. 11.

In general, media patching system 10 includes a panel assembly 12 (e.g., patch panel assembly/multi-connector panel assembly 12). Exemplary panel assembly 12 has a front panel surface/segment 15 that includes a plurality of apertures 13 therethrough. Each aperture 13 is typically configured and dimensioned to have a connector assembly/connective device 14, 14A or 14B mounted with respect thereto (FIGS. 3-6, 13, 16, 21 and 26). It is noted that the front panel surface/segment 15 of panel assembly 12 can be angled (FIGS. 1-6), or it can be substantially flat or planar (panel assembly 12' of FIGS. 11-13). Additionally, it is further noted that panel assembly 12, 12' can take a variety of shapes, forms and/or geometries.

As shown in FIGS. 1 and 3-5, one or more connector assemblies 14 can be mounted with respect to panel assembly 12 (e.g., with one aperture 13 configured to house/mount to one assembly 14), as described and disclosed in U.S. Pat. Nos. 8,439,702 and 8,672,709 noted above. More particularly, each connector assembly 14 typically includes a movable locking member 16 (FIGS. 3, 6 and 21) that is configured to releasably secure the connector assembly 14 to panel assembly 12 as described and disclosed in U.S. Pat. Nos. 8,439,702 and 8,672,709. Panel assembly 12 can include any number of connector assemblies 14 mounted thereon (e.g., one, two, three, four, a plurality, etc.).

Each exemplary connector assembly 14 takes the form of a copper-based electrical connector assembly 14. More particularly, it is noted that each connector assembly 14 includes a jack housing (e.g., high density modular communication jack housing) that is adapted to receive signals from a mating connecting assembly (e.g., a plug connector, such as an RJ-45 plug or an IEC 60603-7-7 compliant plug) inserted or introduced to a receiving space of the jack housing. As such, associated contacts (e.g., eight contacts) or the like of the jack housing are positioned for electrical communication with data signal transmission media plug elements/contacts introduced to the receiving space of the jack housing. In general, the jack housing of electrical connector assembly 14 is suitable for use in various applications, e.g., for interfacing with high frequency data transfer media, connection to data transfer devices or the like, etc. For example, the jack housing of connector assembly 14 may be mounted to a printed circuit board (PCB) and signals may transfer from a plug connector introduced to the receiving space of connector assembly 14 to the PCB and then to insulation displacement contacts (IDCs), thus completing the data interface and transfer through connector assembly 14.

Figure 13:
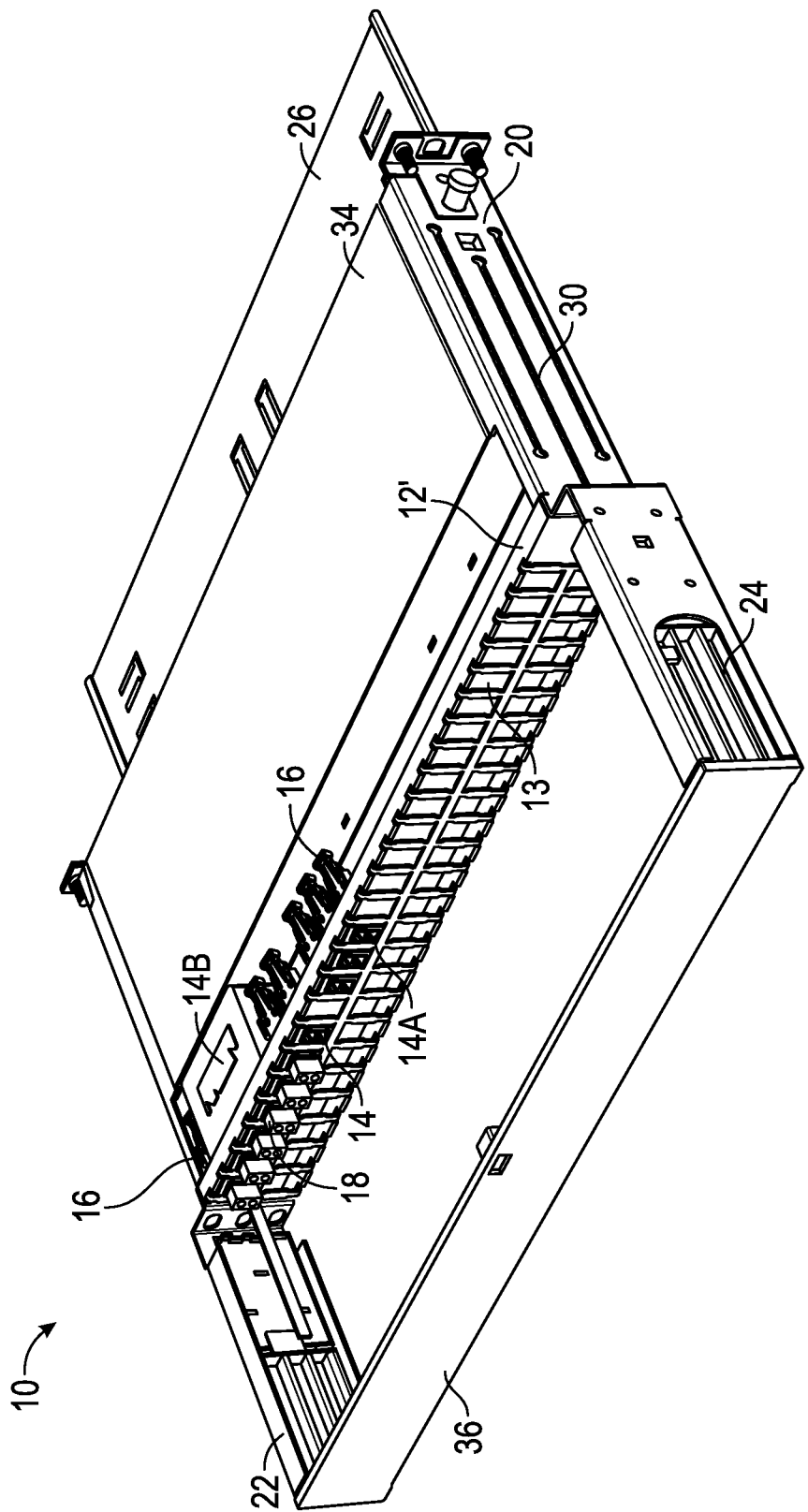
FIG. 13 is a top perspective view of the system of FIG. 11, after exemplary connector assemblies are mounted to the system.

In other embodiments and as discussed below in connection with FIGS. 13 and 21, panel assembly 12 can have one or more connector assemblies 14A mounted thereon (via apertures 13). Each connector assembly 14A takes the form of a fiber optic connector assembly 14A. Panel assembly 12 can include any number of connector assemblies 14A mounted thereon (e.g., one, two, three, four, a plurality, etc.).

More particularly, each connector assembly 14A includes one or more ports/adapters to facilitate communication with a mating assembly (e.g., fiber optic connector), that in turn can interact with various fiber optic media (fiber optic cables, etc.). The ports/adapters of assembly 14A are typically positioned for communication with fiber optic connectors introduced to a receiving space of connector assembly 14A. Similar to connector assembly 14, each connector assembly 14A can include a movable locking member 16 (FIGS. 13 and 21) that is configured to releasably secure the connector assembly 14A to panel assembly 12, as described above.

As shown in FIGS. 3-6, one or more connector assemblies 14B can be mounted with respect to panel assembly 12. Panel assembly 12 can include any number of connector assemblies 14B mounted thereon. Exemplary connector assembly 14B takes the form of a fiber optic cassette 14B having a plurality of fiber optic ports/adapters (e.g., 12 ports) for mating with fiber optic connectors. In certain embodiments, connector assembly 14B includes six port housings 18, with each port housing 18 including two or more fiber optic ports/adapters (e.g., LC, SC, MPO adapters).

Figure 22:
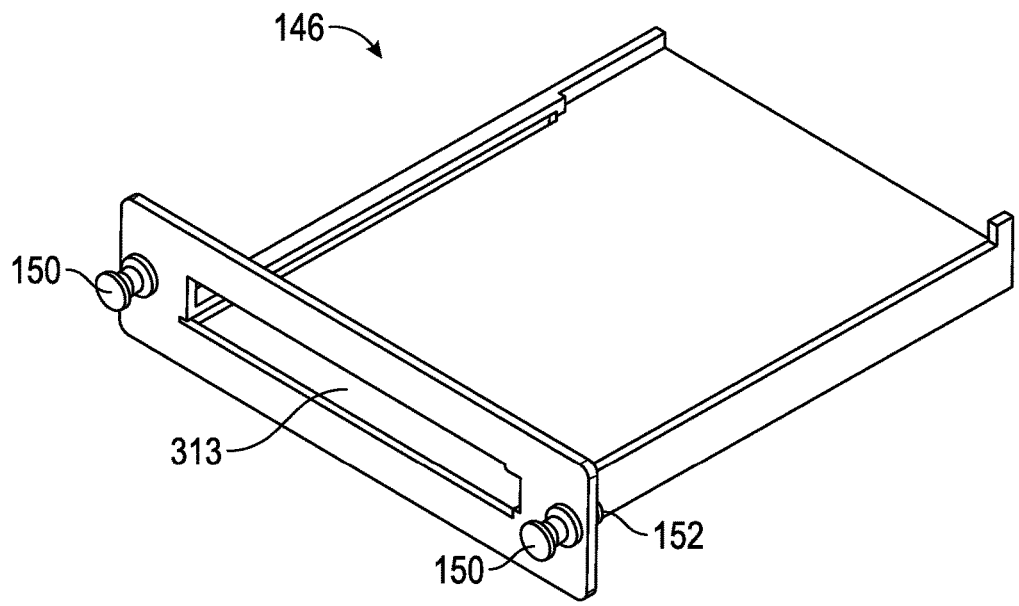
FIG. 22 is a front perspective view of another exemplary bezel member for use with the system of FIG. 14.

Each port housing 18 is configured to be inserted through and mounted with respect to six respective apertures 13 of panel assembly 12 via locking members 16 disposed on each top end of connector assembly 14B (FIGS. 3 and 22), as similarly discussed above for locking members 16 of assemblies 14 and 14A. It is noted that connector assembly 14B can include any suitable number of port housings 18 and/or fiber optic ports and/or locking members 16 for mounting to panel assembly 12, and/or for fiber optic communication purposes.

Figure 26:
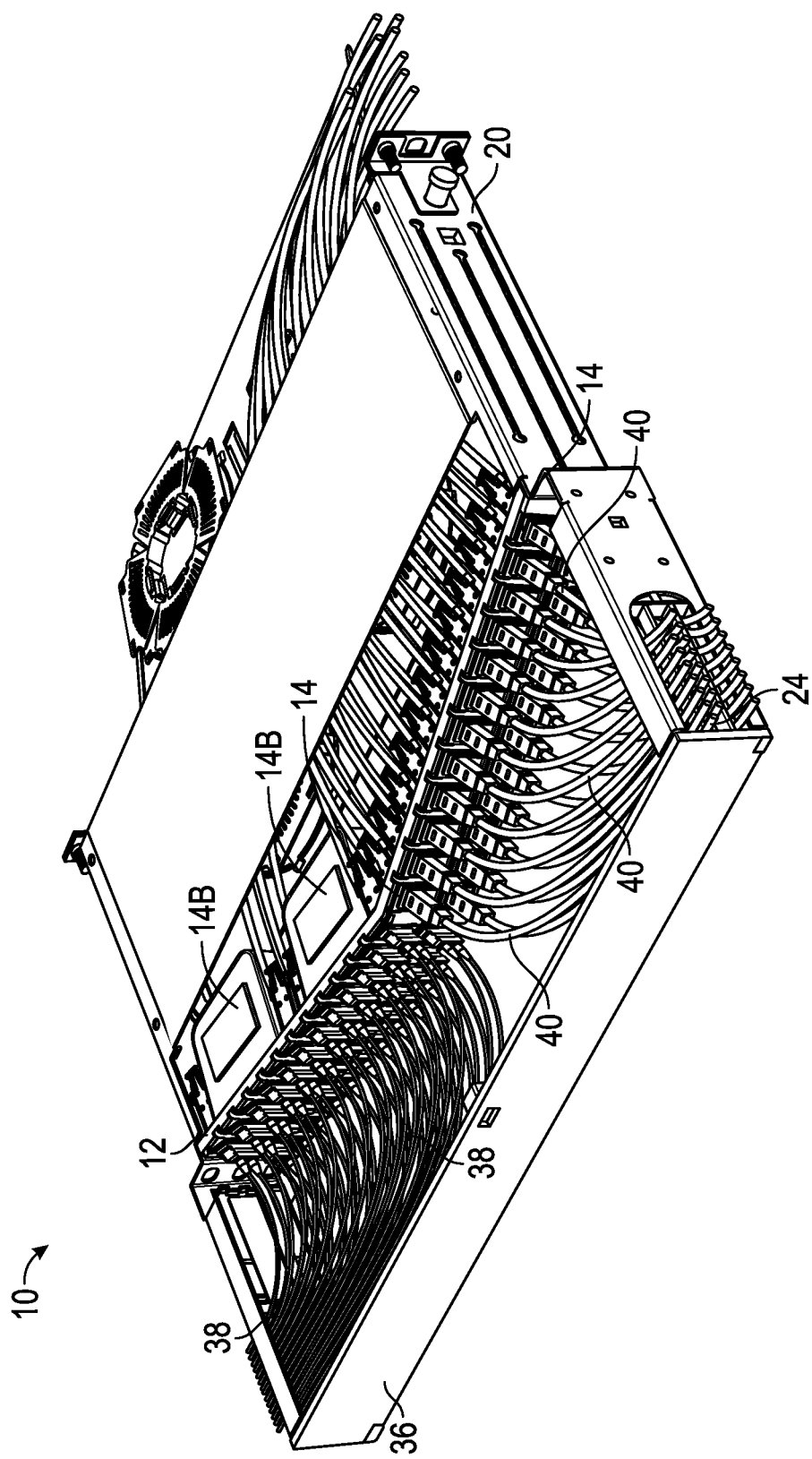
FIG. 26 is a top perspective view of the system of FIG. 3, after exemplary cables/wires are mounted to the system.

It is noted that panel assembly 12 of system 10 can include any number, combination and/or permutation of connector assemblies/connector devices 14, 14A and/or 14B. As such, panel assembly 12 can include connector assemblies 14, 14A or 14B, or mixtures thereof. Thus, panel assembly 12 of system 10 advantageously provides users with the ability to install multiple (mixed) media connections (e.g., copper-based 14 and/or fiber optic connections 14A, 14B) in the same patching system/enclosure 10. Moreover, panel assembly 12 can advantageously increase patching density of the media patching system 10 while maintaining port accessibility. FIG. 26 shows a plurality of cables 38 mounted with respect to the ports of connector assemblies 14B, and a plurality of cables 40 mounted with respect to the jack housings of connector assemblies 14.

Figure 27:
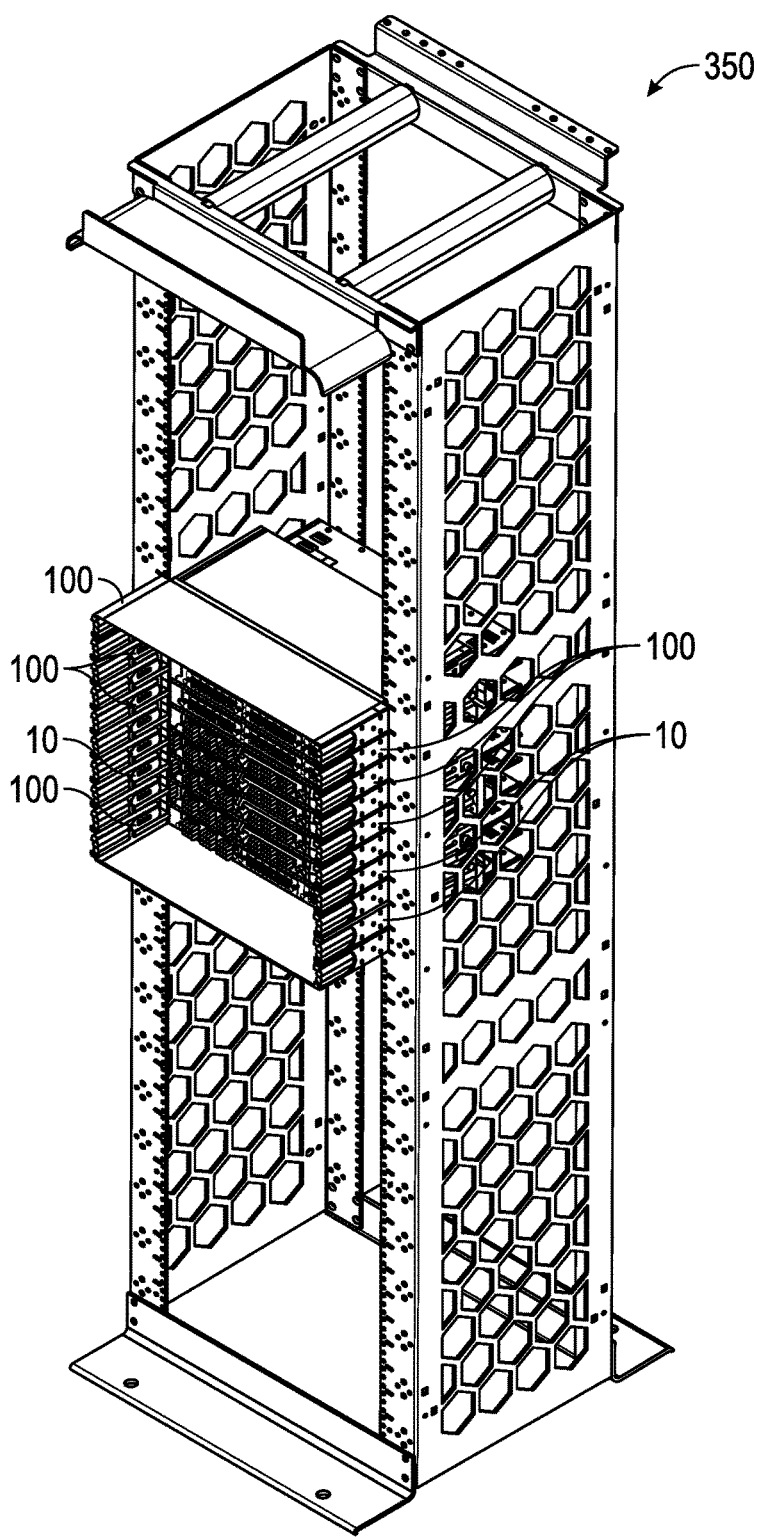
FIG. 27 is a side perspective view of exemplary media patching systems mounted with respect to a supporting structure.

In certain embodiments, media patching system 10 is configured and dimensioned to be mounted with respect to a supporting structure 350 (e.g., rack 350-FIG. 27) or the like. As shown in FIG. 27, it is noted that exemplary media patching systems 10 (and 100) are adapted for use in conjunction with a rack 350 (e.g., network or server rack) or the like, although the present disclosure is not limited thereto. Rather, the disclosed media patching systems 10 and/or 100 are adapted for use in conjunction with other structures, such as, for example, frames, cabinets, supporting structures, or other structures that stand to benefit from proximate cable management functionality. For ease of disclosure, the potential structures to which the disclosed systems 10/100 may be mounted are collectively referred to as "rack(s)." However, it is to be understood that the present disclosure is not limited by or to implementations wherein the disclosed systems 10/100 are mounted with respect to, or used in conjunction with, a rack 350, but may be mounted with respect to, or used in conjunction with other structures/units (e.g., structures/units associated with cable routing).

As shown in FIG. 27, one or more media patching systems 10 and/or 100 can be mounted with respect to rack 350 or the like. Any suitable number of systems 10/100 can be mounted with respect to rack 350, and the systems 10/100 may or may not include cover members 33, 34 and/or 35. For example and as shown in FIG. 27, ten systems 10/100 are mounted with respect to rack 350, with the ten systems mounted proximal to one another within rack 350. In one embodiment, the top system 100 in rack 350 includes top cover members 33 and 34, and the bottom system 100 includes lower cable management plate 35.

Exemplary rack 350 is depicted in FIG. 27, and such rack 350 and other exemplary mounting structures suitable for use with systems 10/100 are described and disclosed in U.S. Pat. No. 7,983,038, the entire contents of which is hereby incorporated by reference in its entirety. However and as noted above, systems 10/100 may be mounted with respect to or used in conjunction with other structures/units.

Figure 9:
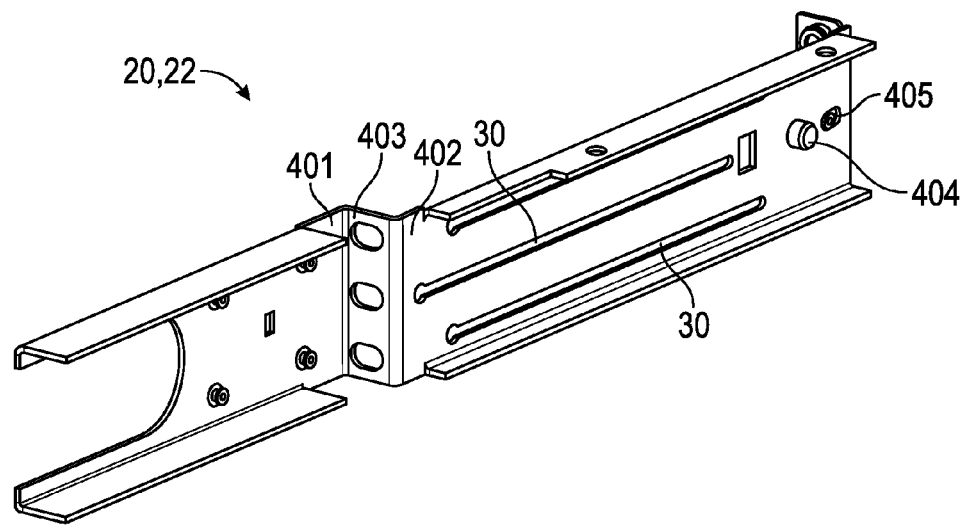
FIG. 9 is a side perspective view of a bracket member of the system of FIG. 1.
Figure 10:
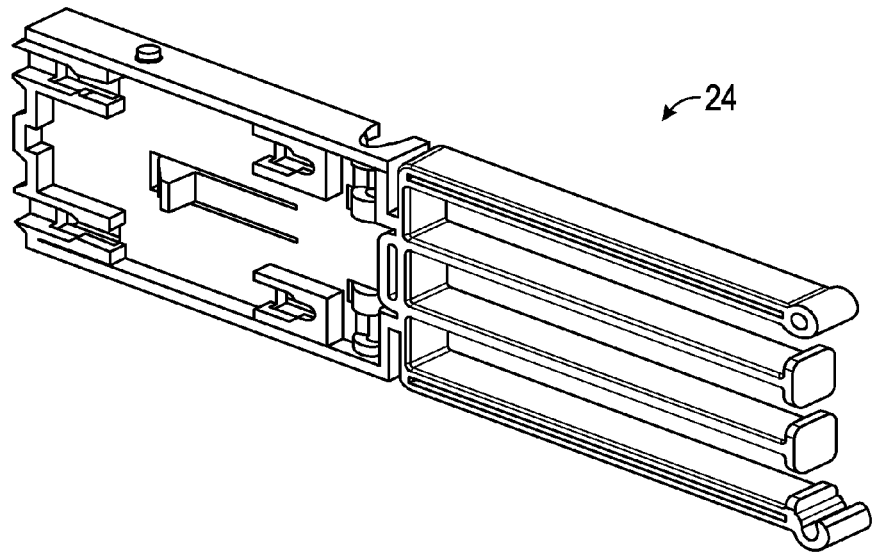
FIG. 10 is a side perspective view of a cable management member of the system of FIG. 1.

Panel assembly 12 (e.g., patch panel assembly/multi-connector panel assembly 12) of media patching system 10 can be mounted with respect to a first bracket member 20 and a second bracket member 22 (FIGS. 1 and 9). A cable management member 24 can be mounted with respect to each bracket member 20, 22 for cable/wire management purposes of system 10. Each bracket member 20, 22 can be mounted with respect to an upper cable management plate 26. Upper cable management plate 26 can include one or more cable management spool assemblies 28 or the like removably mounted thereon for cable/wire management purposes of system 10. System 10 may or may not include top covers 33, 34 and/or lower cable management plate 35 (e.g., mounted with respect to bracket members 20, 22). System 10 may also include a door assembly 36 (e.g., mounted with respect to bracket members 20, 22) that is configured to open, close, lock and unlock as desired by a user.

Figure 7:
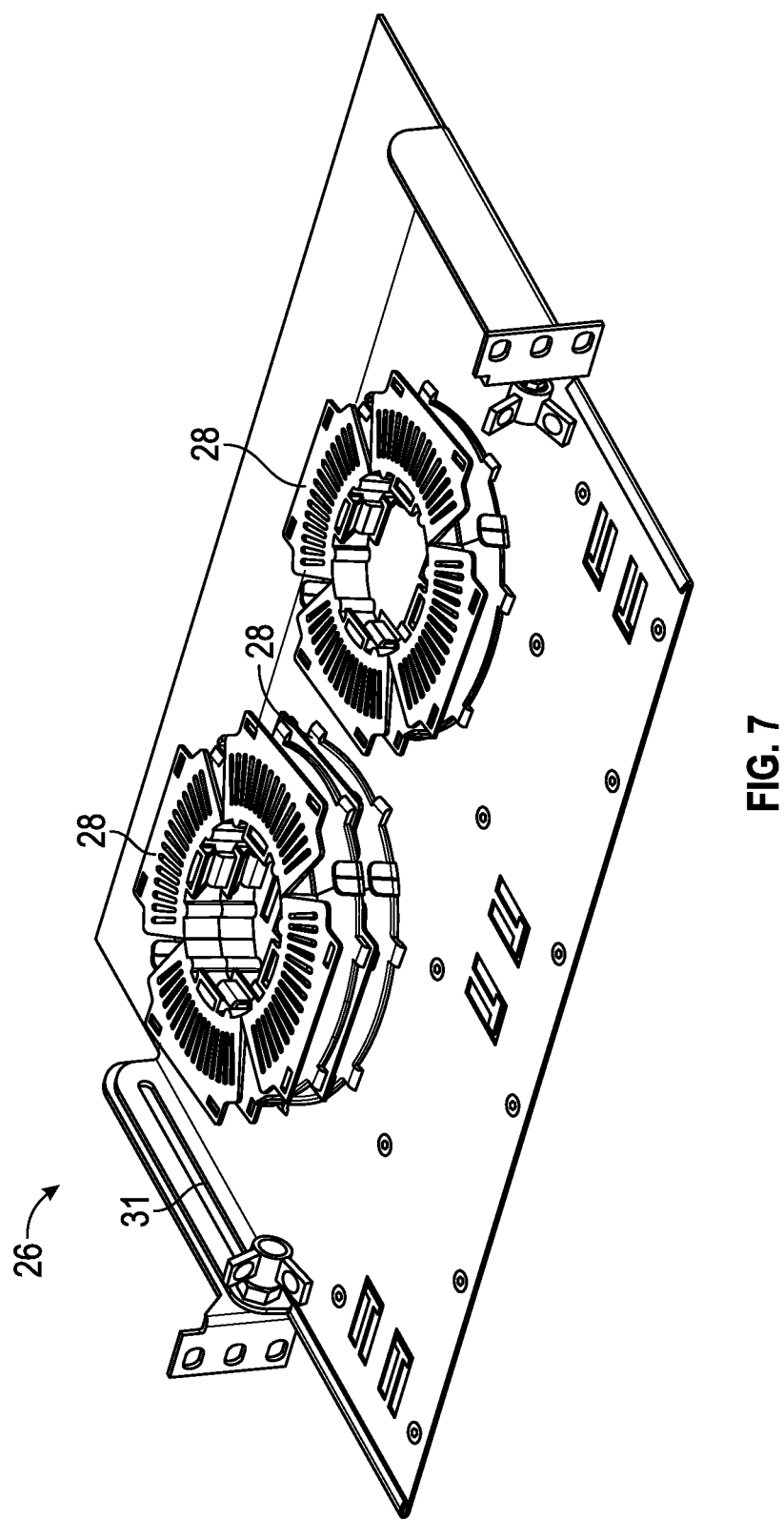
FIG. 7 is a top perspective view of the cable management plate assembly including upper cable management plate and lower cable management plate of the system of FIG. 1.
Figure 8:
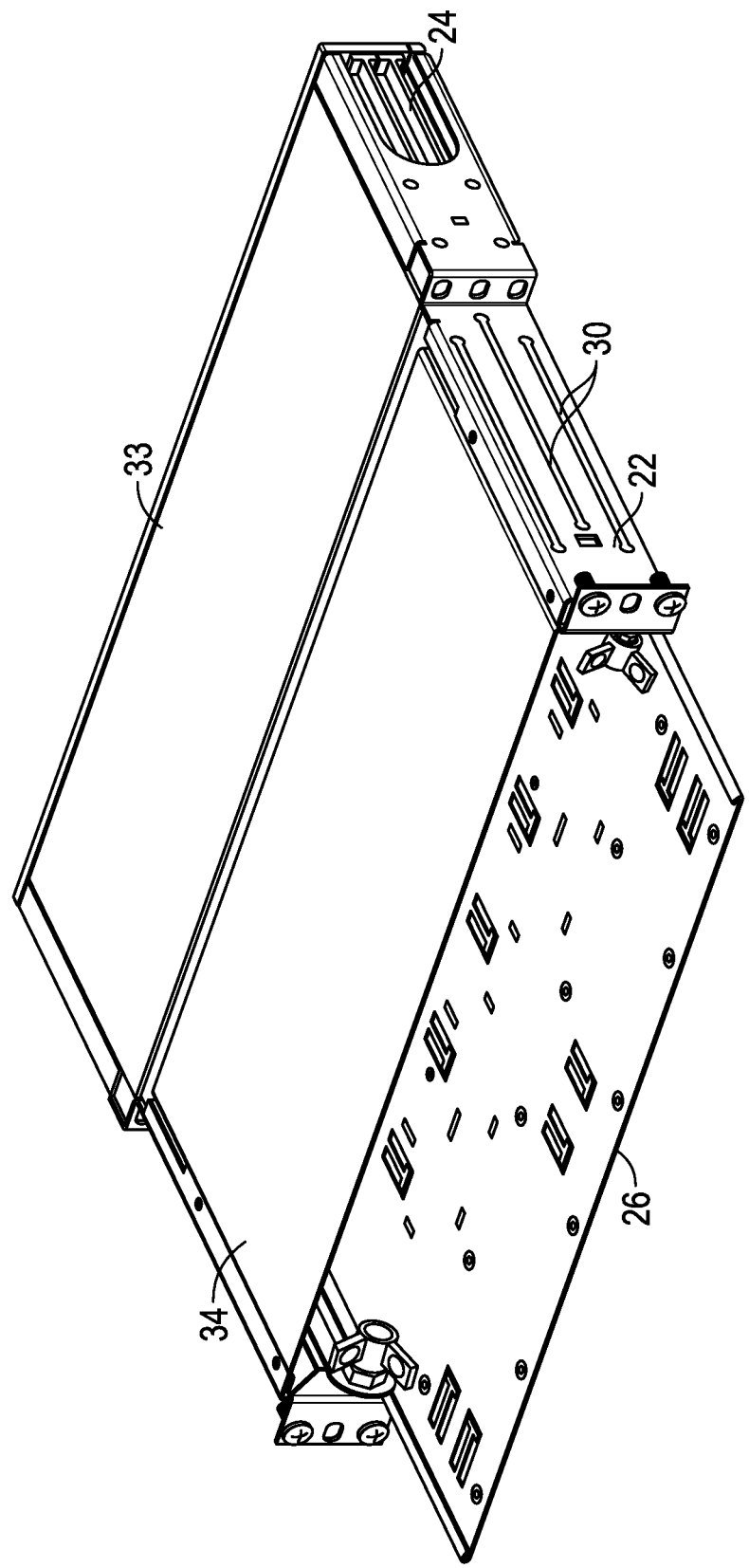
FIG. 8 is a top perspective view of the system of FIG. 1, with front cover member attached.

In certain embodiments, panel assembly 12 can be movably mounted relative to bracket members 20, 22 via one or more slots 30 of bracket members 20, 22. Pull tab members 32 of panel assembly 12 can facilitate movement of panel assembly 12 relative to bracket members 20, 22. Upper cable management plate 26 can move relative to bracket members 20, 22 via slots 31 of upper cable management plate 26 (FIG. 7). In some embodiments, movement or sliding of the upper cable management plate 26 relative to bracket members 20, 22 can be independent from movement of panel assembly 12. Upper cable management plate 26 can therefore be extended from the media patching system 10 without affecting the position of panel assembly 12 (or 112).

As noted above and as shown in FIGS. 11-13, system 10 can include an alternative panel assembly 12' having a front panel surface/segment 15 that is substantially flat or planar. Similar to panel assembly 12, the flat/planar front panel surface/segment 15 of panel assembly 12' can include any number, combination and/or permutation of connector assemblies/connector devices 14, 14A and/or 14B mounted thereon, via apertures 13 of panel assembly 12'. As such, panel assembly 12' can include connector assemblies 14, 14A or 14B, or mixtures thereof. Thus, panel assembly 12' of system 10 advantageously provides users with the ability to install multiple (mixed) media connections (e.g., copper-based connections 14, fiber optic connections 14A, 14B, combinations thereof, or the like) in the same patching system/enclosure 10. Moreover, panel assembly 12' can advantageously increase patching density of the media patching system 10 while maintaining port accessibility. Panel assembly 12' can be mounted with respect to first bracket member 20 and second bracket member 22, as similarly discussed above.

Figure 14:
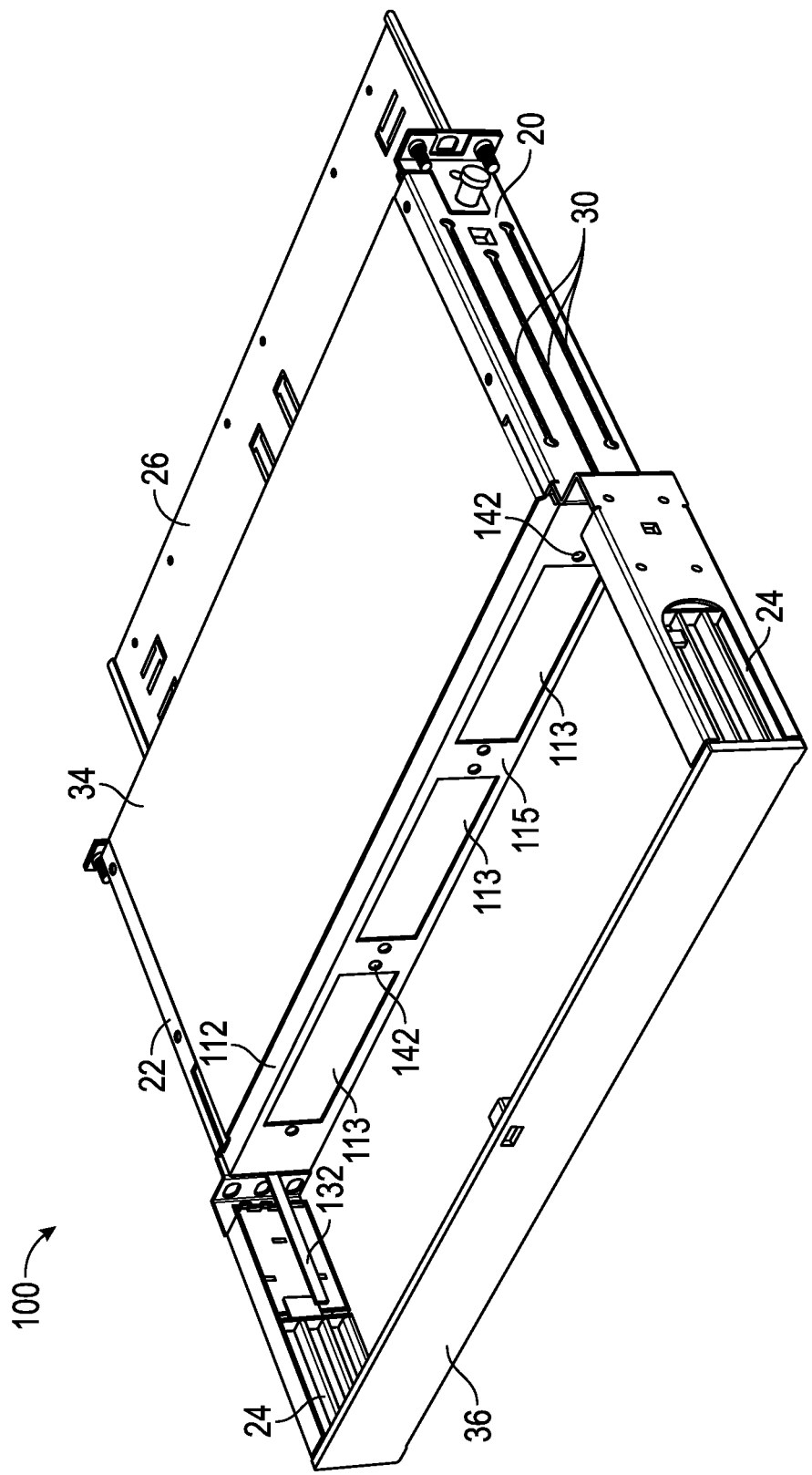
FIG. 14 is a top perspective view of another exemplary media patching system of the present disclosure, prior to connector assemblies mounted to the system.
Figure 15:
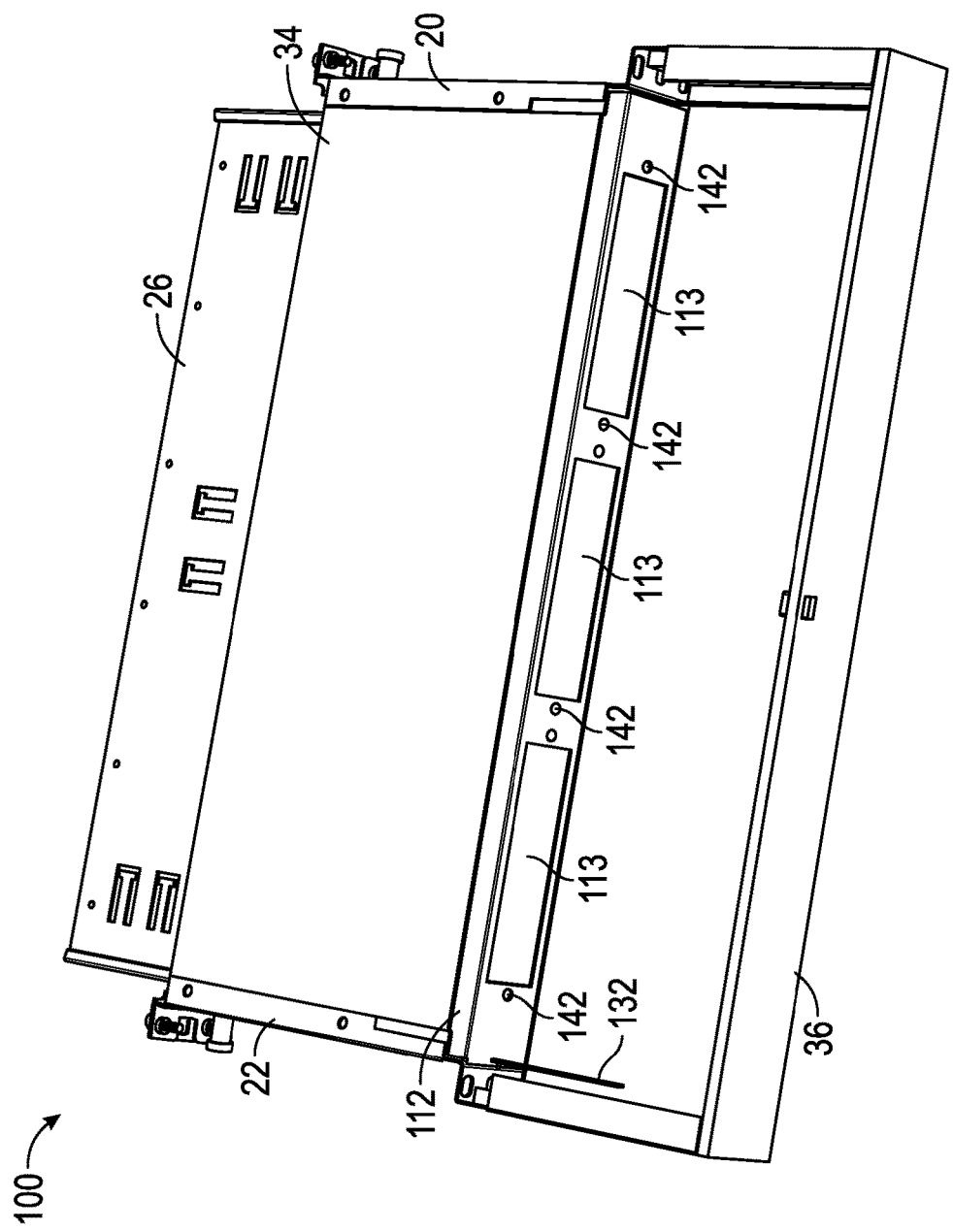
FIG. 15 is another top perspective view of the system of FIG. 14.
Figure 16:
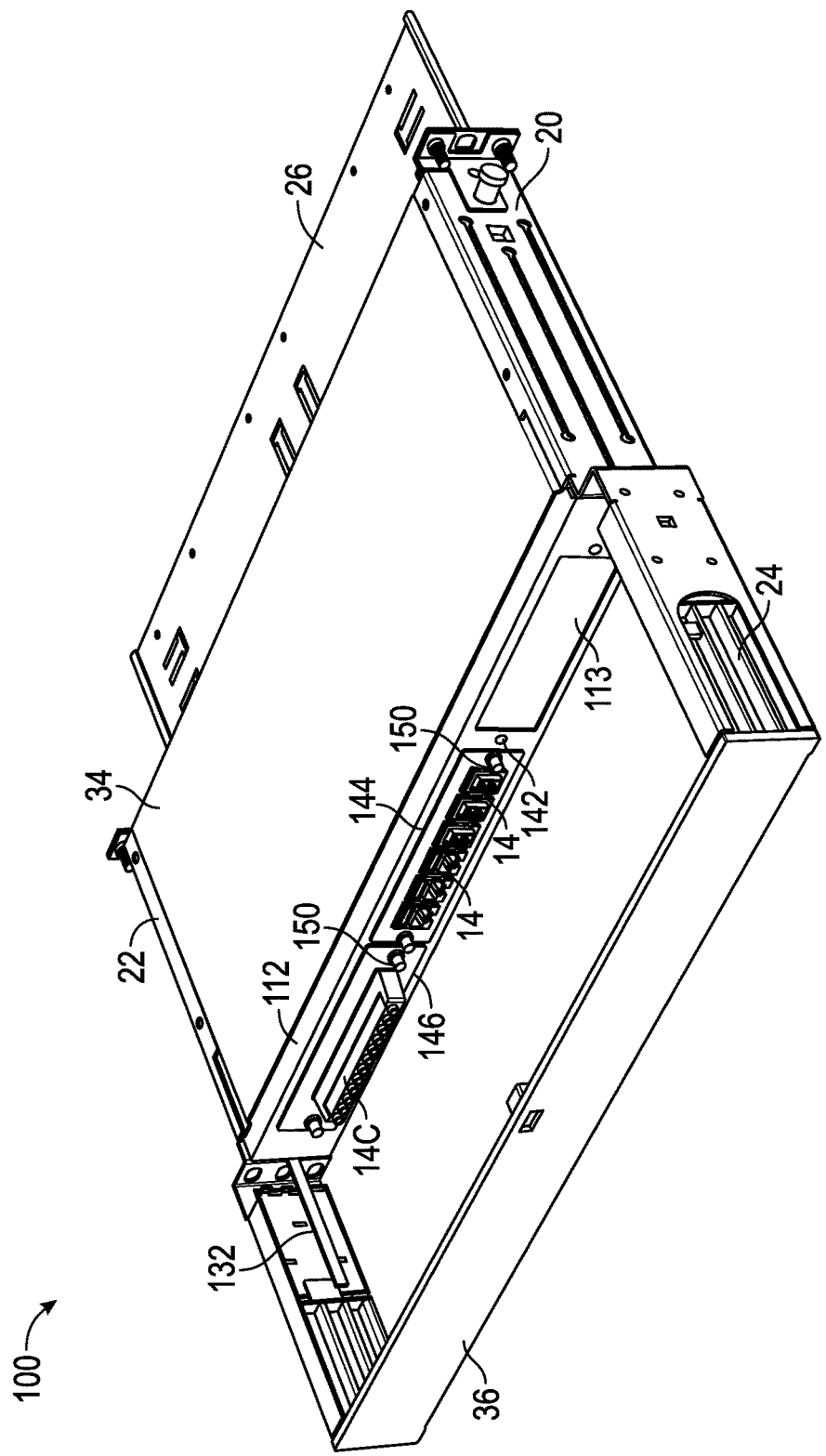
FIG. 16 is a top perspective view of the system of FIG. 14, after exemplary connector assemblies are mounted to the system.
Figure 17:
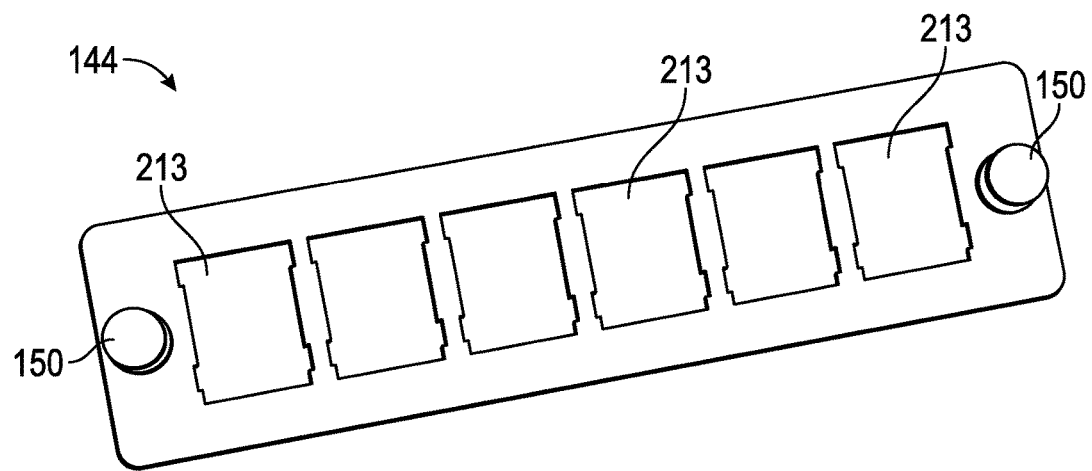
FIG. 17 is a front view of an exemplary bezel member for use with the system of FIG. 14.
Figure 18:
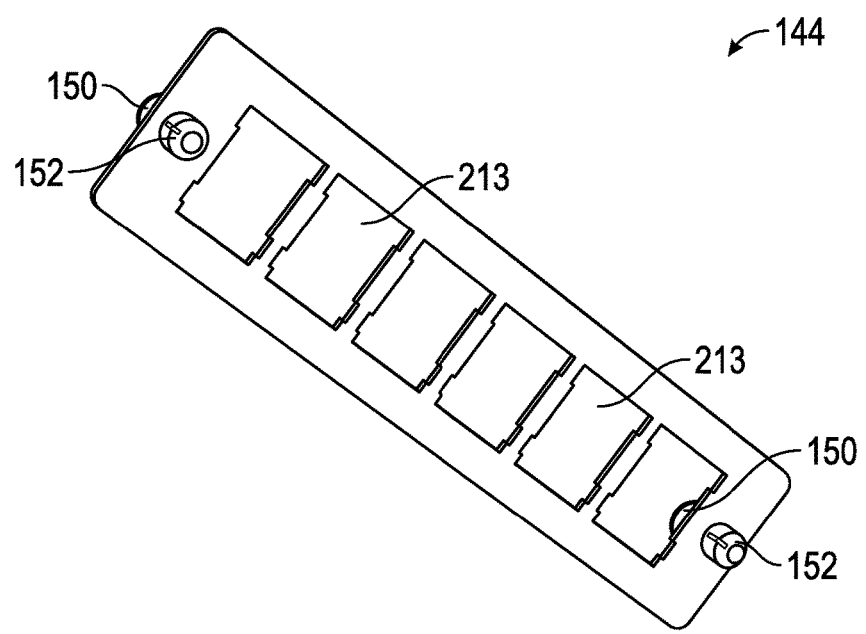
FIG. 18 is a rear view of the bezel member of FIG. 17.
Figure 19:
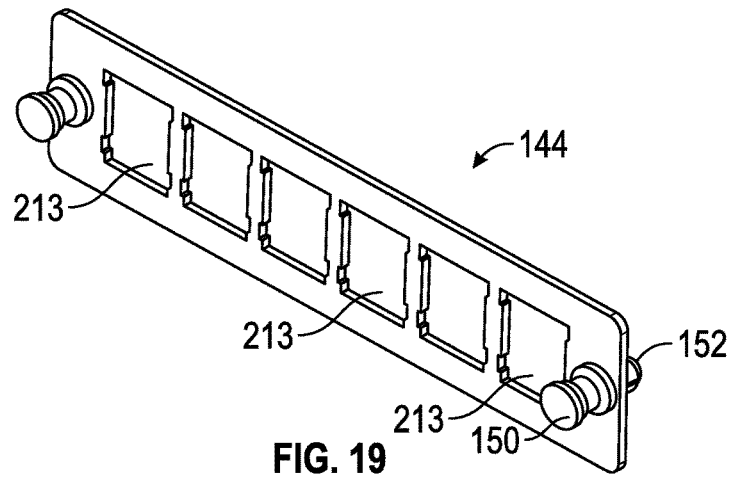
FIG. 19 is a front perspective view of the bezel member of FIG. 17.

In other embodiments and as shown in FIGS. 14-16, exemplary media patching system 100 is similar to system 10 discussed above, with some differences. Similar to system 10 discussed above, media patching system 100 is configured and dimensioned to be used as a patching system for multiple media connections. More particularly, media patching system 100 can be configured to support high density, multiple (mixed) media connections. It is noted that media patching system 100 can take a variety of forms, shapes and/or designs.

In exemplary embodiments, system 100 is a high density patching system configured to support multiple media connections. System 100 provides users with the ability to install multiple media connections (e.g., e.g., copper-based connections, fiber optic connections, combinations thereof, or the like) in the same patching system/enclosure 100.

Similar to system 10 above, media patching system 100 includes a panel assembly 112 (e.g., patch panel assembly or multi-connector panel assembly 112). In certain embodiments, media patching system 100 is configured and dimensioned to be mounted with respect to a supporting structure 350 (e.g., rack 350-FIG. 27) or the like. As shown in FIG. 27, it is noted that exemplary media patching systems 100 (and 10) are adapted for use in conjunction with a rack 350 (e.g., network or server rack) or the like. As shown in FIG. 27, one or more media patching systems 100 (and/or 10) can be removably mounted with respect to rack 350 or the like.

Panel assembly 112 of media patching system 100 can be mounted with respect to a first bracket member 20 and a second bracket member 22 (FIGS. 9 and 14-16). A cable management member 24 can be mounted with respect to each bracket member 20, 22 for cable/wire management purposes of system 100. Each bracket member 20, 22 can be mounted with respect to an upper cable management plate 26. Upper cable management plate 26 can include one or more cable management spool assemblies 28 or the like removably mounted thereon for cable/wire management purposes. System 100 may or may not include top covers 33, 34 and/or lower cable management plate 35 (e.g., mounted with respect to bracket members 20, 22). System 100 may also include a door assembly 36 (e.g., mounted with respect to bracket members 20, 22) that is configured to open, close, lock and unlock as desired by a user.

In certain embodiments, panel assembly 112 can be movably mounted relative to bracket members 20, 22 via one or more slots 30 of bracket members 20, 22. Pull tab members 132 of panel assembly 112 can facilitate movement of panel assembly 112 relative to bracket members 20, 22. Upper cable management plate 26 can move relative to bracket members 20, 22 via slots 31 of upper cable management plate 26 (FIG. 7).

Exemplary panel assembly 112 has a front panel surface/segment 115 that includes a plurality of apertures 113. As shown in FIGS. 14-25 and as discussed in further detail below, each aperture 113 is typically configured and dimensioned to have a connector assembly/connective device 14, 14A, 14B, 14C or 14D mounted with respect thereto (e.g., via bezel member 144, 146 or 148). As discussed further below, each aperture 113 of panel assembly 112 is typically associated with one or more mounting holes 142 of front panel surface/segment 115 of panel assembly 112.

It is noted that the front panel surface/segment 115 of panel assembly 112 can be substantially flat or planar (FIGS. 14-16), or it can be can be angled. Additionally, it is further noted that assembly 112 can take a variety of shapes, forms and/or geometries.

Figure 20:
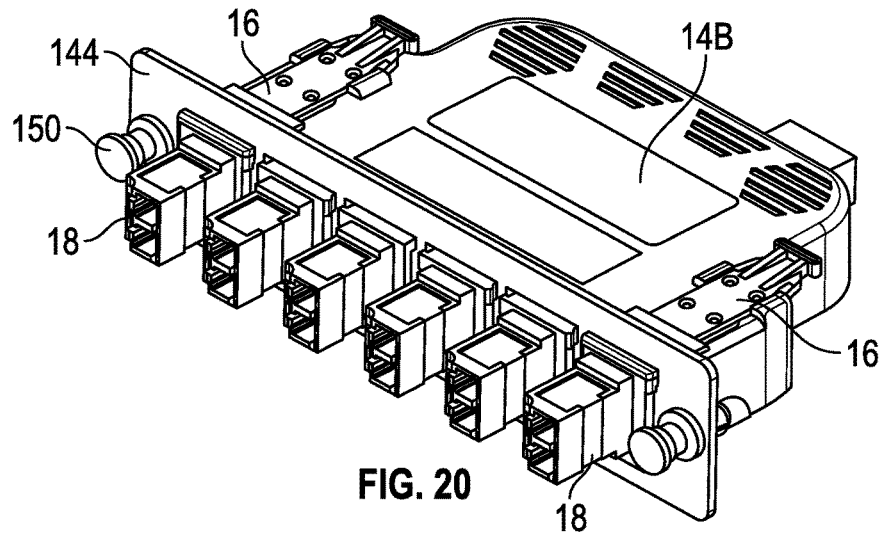
FIG. 20 is a front perspective view of the bezel member of FIG. 17, after an exemplary connector assembly is mounted to the bezel member.
Figure 21:
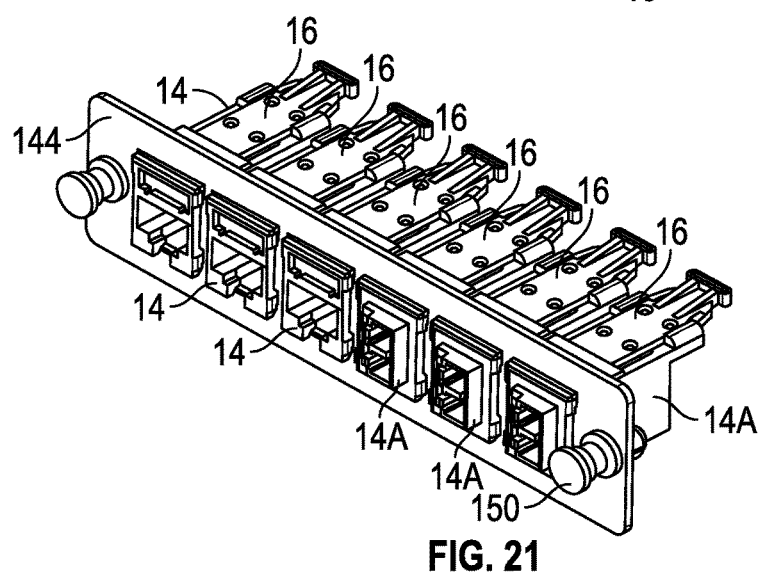
FIG. 21 is a front perspective view of the bezel member of FIG. 17, after exemplary connector assemblies are mounted to the bezel member.

As shown in FIGS. 16-25, exemplary panel assembly 112 can include or be associated with one or more removable bezel members 144, 146 and/or 148. Bezel member 144 can include one or more apertures 213, with each aperture 213 configured and dimensioned to have a connector assembly/connective device 14, 14A, 14B mounted/housed with respect thereto, as similarly discussed above in connection with apertures 13 of panel assembly 12 (e.g., via moving locking members 16 of connector assembly/connective device 14, 14A, 14B). As such, one or more connector assembly/connective device 14, 14A, 14B can be mounted with respect to bezel member 144 (FIGS. 20-21).

In exemplary embodiments, the front face of bezel member 144 includes one or more handle members 150, and the rear face of bezel member 144 includes one or more mounting members 152 for the releasable attachment to mounting holes 142 of panel assembly 112.

Figure 23:
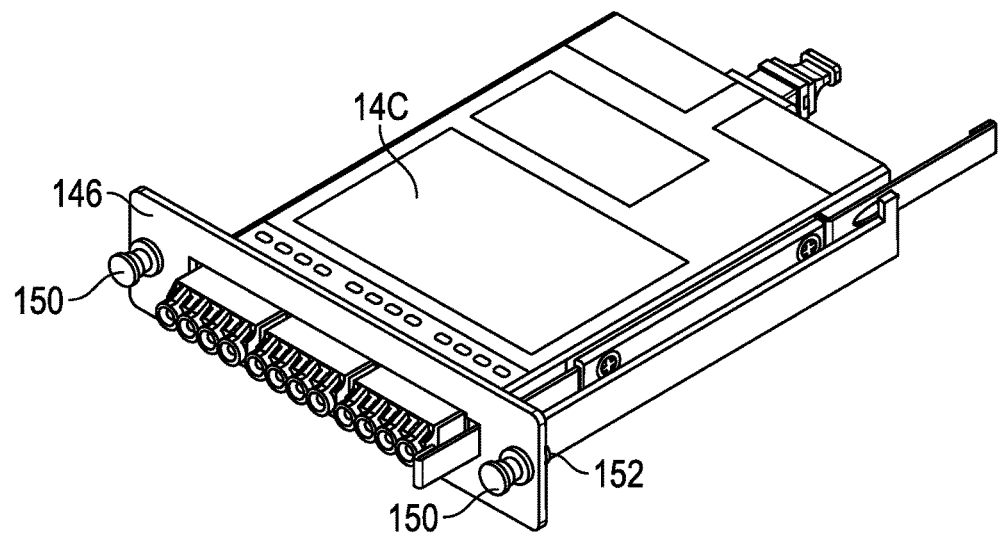
FIG. 23 is a front perspective view of the bezel member of FIG. 22, after an exemplary connector assembly is mounted to the bezel member.
Figure 24:
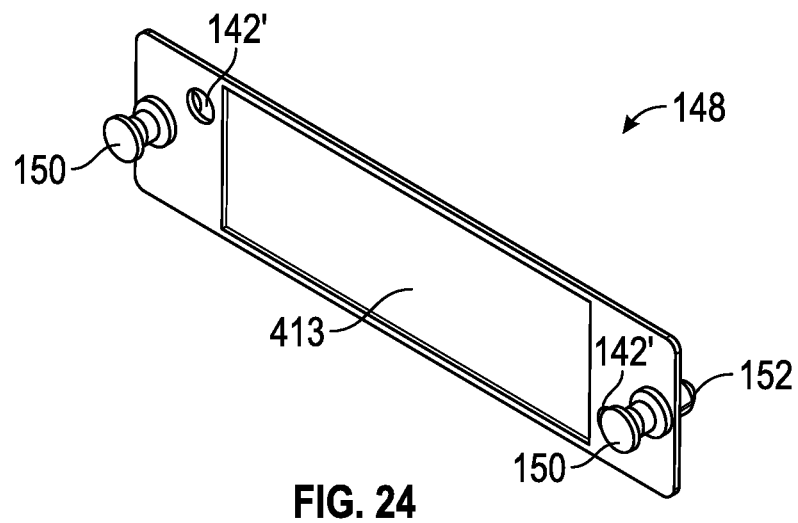
FIG. 24 is a front perspective view of another exemplary bezel member for use with the system of FIG. 14.

Turning to bezel member 146 (FIG. 22), exemplary bezel member 146 includes an aperture or slot 313, with aperture 313 configured and dimensioned to have a connector assembly/connective device 14C mounted/housed with respect thereto (FIG. 23). Similar to bezel member 144, the front face of bezel member 146 includes one or more handle members 150, and the rear face of bezel member 146 includes one or more mounting members 152 for the releasable attachment to mounting holes 142 of panel assembly 112. Exemplary connector assembly 14C takes the form of a fiber optic cassette 14C having a plurality of fiber optic ports/adapters (e.g., 12 ports) for mating with fiber optic connectors.

Figure 25:
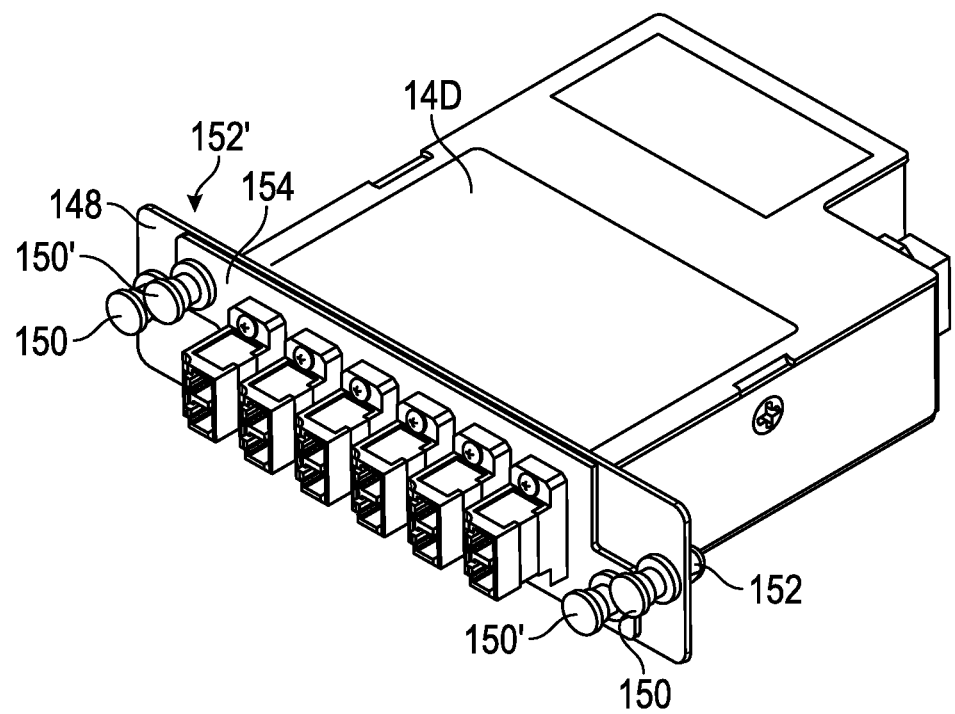
FIG. 25 is a front perspective view of the bezel member of FIG. 24, after an exemplary connector assembly is mounted to the bezel member.

With reference to bezel member 148 (FIG. 24), exemplary bezel member 148 includes an aperture or slot 413, with aperture 413 configured and dimensioned to have a connector assembly/connective device 14D mounted/housed with respect thereto (FIG. 25). Similar to bezel member 144, the front face of bezel member 148 includes one or more handle members 150, and the rear face of bezel member 148 includes one or more mounting members 152 for the releasable attachment to mounting holes 142 of panel assembly 112.

In certain embodiments, connector assembly 14D includes a mounting plate 154, with the front face of mounting plate 154 having one or more handle members 150', and the rear face of mounting plate 154 having one or more mounting members 152' for the releasable attachment to mounting holes 142' of bezel member 148. Exemplary connector assembly 14D takes the form of a fiber optic cassette 14D having a plurality of fiber optic ports/adapters (e.g., 12 ports) for mating with fiber optic connectors.

It is noted that panel assembly 112 of system 100 can include any number, combination and/or permutation of bezel members 144, 146 and/or 148, and thus can include any number, combination and/or permutation of connector assemblies/connector devices 14, 14A, 14B, 14C and/or 14D. As such, panel assembly 112 can include connector assemblies 14, 14A, 14B, 14C and/or 14D (alone or in combinations thereof). Thus, panel assembly 112 of system 100 advantageously provides users with the ability to install multiple media connections (e.g., e.g., copper-based connections 14, fiber optic connections 14A, 14B, 14C, 14D, combinations thereof, or the like) in the same patching system/enclosure 100. Moreover, panel assembly 112 can advantageously increase patching density of the media patching system 100 while maintaining port accessibility.

Figure 28:
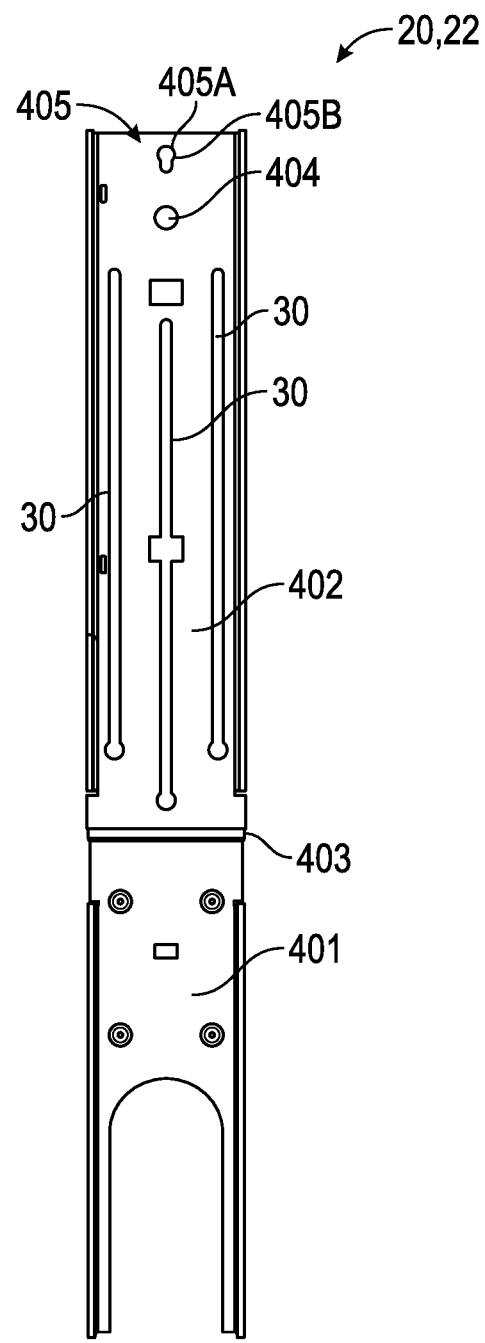
FIG. 28 is a side view of the exemplary bracket member of FIG. 9.

With reference to FIGS. 9 and 28, perspective and side views of exemplary bracket members 20, 22 are shown. In exemplary embodiments, each bracket member 20, 22 defines a substantially z-shaped configuration, including a first planar segment 401, a second planar segment 402, and a third planar segment 403 connecting the first and second planar segments 401, 402. Exemplary first and second planar segments 401, 402 are substantially parallel relative to each other and define sides of the media patching system 10, 100. Exemplary third planar segment 403 is substantially perpendicular to first and second planar segments 401, 402, although the present disclosure is not limited thereto. One or more slots 30 can extend along (and through) a length defined by second planar segment 402.

Exemplary bracket members 20, 22 include a first aperture 404 and a second aperture 405 spaced relative to each other and passing through the second planar segment 402. Exemplary first aperture 404 defines a circular shape. Second aperture 405 includes a large diameter portion 405a and a small diameter portion 405b. As discussed further below, first and second apertures 404, 405 can be used to detachably secure a bracket 34 (shown in FIG. 34) to the bracket members 20, 22.

Turning now to FIGS. 29-32, perspective, top and side views of an exemplary upper cable management plate 26 of a cable management plate assembly are provided. Upper cable management plate 26 can define a substantially rectangular configuration, including first and second side edges 406, 407, a front edge 408, and a rear edge 409. Front and rear edges 408, 409 define a width 410 of upper cable management plate 26 and first and second side edges 406, 407 define a depth 411 of upper cable management plate 26. The width 410 can be dimensioned such that upper cable management plate 26 can be positioned between the first and second bracket members 20, 22.

Upper cable management plate 26 includes a substantially planar body portion 412 extending between first and second side edges 406, 407, front edge 408, and rear edge 409. Each of the first and second side edges 406, 407 includes a flange 414, 415 extending therefrom in a direction perpendicular to the plane defined by body portion 412. Body portion 412 can define a cable supporting surface of upper cable management plate 26. Flanges 414, 415 extend a partial distance along depth 411. In particular, exemplary flanges 414, 415 extend from front edge 408 to an approximate midpoint of depth 411. In some embodiments, the length of flanges 414, 415 can be varied to change the distance which upper cable management plate 26 can slide and extend from the rear portion of media patching system 10, 100. Although discussed herein with respect to media patching system 10, 100, it is understood that upper cable management plate 26 can be used in conjunction with a variety of media patching systems or racks or the like.

Each flange 414, 415 includes an elongated slot 31 (e.g., a track 31) formed therein along which upper cable management plate 26 can slide or move relative to first and second bracket members 20, 22. Each slot 31 includes a proximal end 416 and a distal end 417. In particular, proximal end 416 can be disposed near front edge 408 and distal end 417 can be disposed near the midpoint of upper cable management plate 26.

Exemplary body 412 includes one or more groups of slots 418 formed thereon. In particular, groups of slots 418 include two slots 419 which are aligned and parallel to each other, and a slot 420 which is offset from and parallel to slots 419. In some embodiments, four groups of slots 418 can be positioned circumferentially around a central bore 421. As discussed further below, groups of slots 418 can be used to detachably secure one or more spool assemblies 28 to body 412 (e.g., for cable management purposes).

In some embodiments, body 412 includes one or more tabs 422 formed therein for organizing cables 38, 40 on upper cable management plate 26. In some embodiments, body 412 includes one or more apertures with a threaded insert 423 positioned therein. Threaded inserts 423 can be used to secure additional cable management or organization components to upper cable management plate 26.

Figure 33:
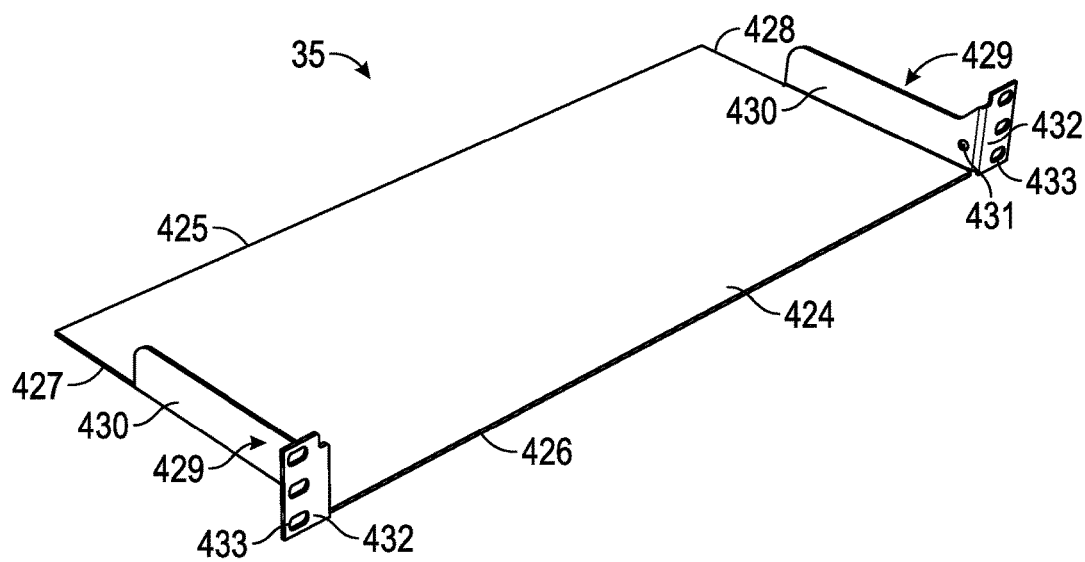
FIG. 33 is a perspective view of an exemplary lower cable management plate according to the present disclosure.

FIG. 33 shows a perspective view of an exemplary lower cable management plate 35 of media patching system 10. Together, upper cable management plate 26 and lower cable management plate 35 interconnect to form a cable management plate assembly. Additionally, components such as spools, can be added to the cable management plate assembly formed by upper cable management plate 26 and lower cable management plate 35. Lower cable management plate 35 includes a planar body 424 with a front edge 425, a rear edge 426, and first and second side edges 427, 428. Each of the first and second side edges 427, 428 includes a flange 429 (e.g., an L-shaped flange 429) extending perpendicularly relative to body 424. Each flange 429 includes a first portion 430 extending parallel to the respective first and/or second side edge 427, 428. In particular, first portion 430 extends a partial distance from rear edge 426 to a point offset from front edge 425. First portion 430 includes an aperture 431 that is involved in the connection of the upper cable management plate 26 to the lower cable management plate 35 in a manner that is explained below. Each flange 429 further includes a second portion 432 extending approximately ninety degrees from first portion 430 and extending parallel to rear edge 426. Second portion 432 extends away from body 424. Second portion 432 can include two or more openings 433 formed therein.

Figure 34:
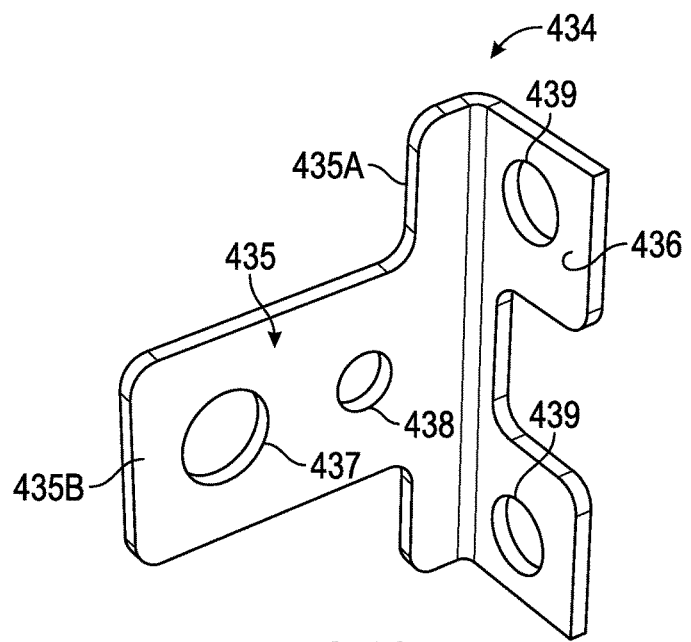
FIG. 34 is a perspective view of an exemplary bracket according to the present disclosure.

FIG. 34 shows a perspective view of an exemplary securing member 434. As discussed below, securing member 434 assists in interlocking lower cable management plate 35 to first and second bracket members 20, 22. Securing member 434 can define a substantially L-shaped configuration including a first portion 435 and a second portion 436 extending at approximately ninety degrees relative to each other. First portion 435 includes an inner surface 435a and an outer surface 435b. First portion 435 includes two apertures 437, 438 (e.g., circular openings) formed therein which are complementary to respective first and second apertures 404, 405 of first and second bracket members 20, 22. Second portion 436 includes two separated extensions, each including an aperture 439 complementary to an opening 433 formed in second portion 432 of lower cable management plate 35.

Figure 54:
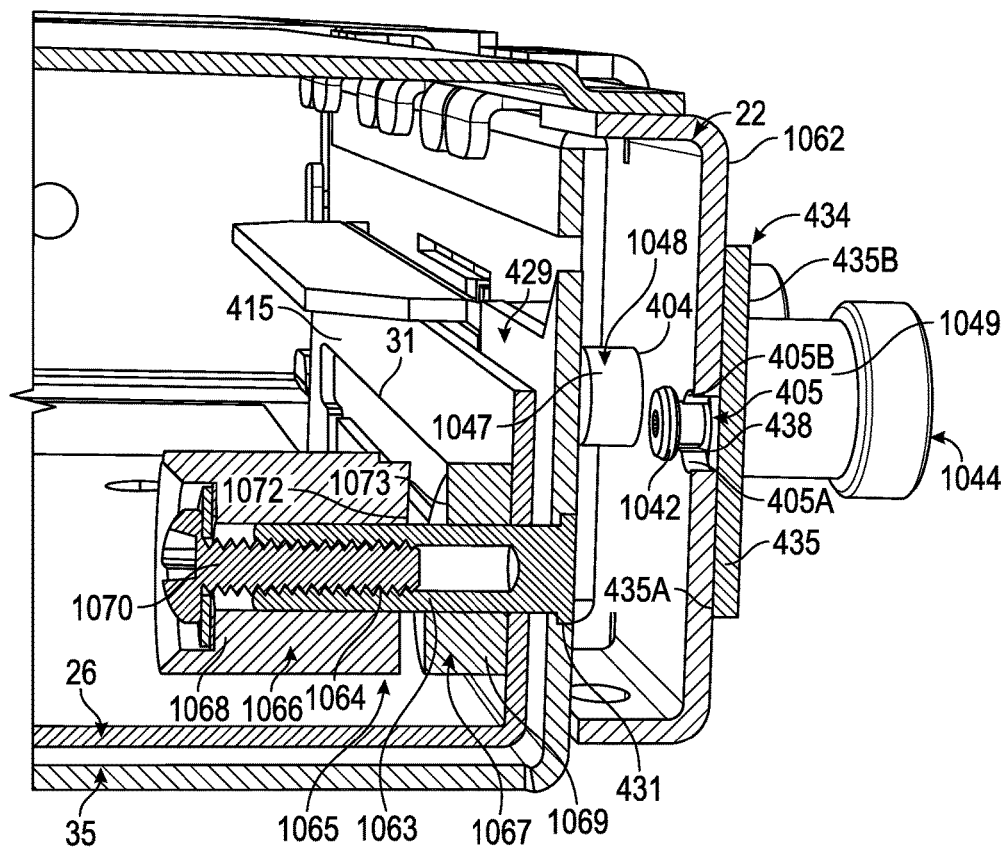
FIG. 54 is a cross-sectional view of a partial assembly of an exemplary media patching system of FIG. 1, including first and second bracket members, lower cable management plate, upper cable management plate, and a bracket.

FIG. 54 is a perspective cut away view that shows the bracket 434 connected to a bracket member 22. It should be understood that a bracket 434 can be connected to bracket member 20 in a substantially similar manner. A pem 1042 can be compression fit into opening 438 in bracket 434 such that the pem 1042 extends from the inner surface 435a of the first portion 435 of the bracket 434 and passes through opening 405 in the bracket member 20. In particular, the pem 1042 can pass freely through the large diameter opening 405a and can be configured to prevent passage of the pem 1042 through the small diameter opening 405b. A spring-loaded pin assembly 1044 can also be mated with the bracket 434. The spring-loaded pin assembly 1044 includes a housing 1049 that can be compression fit into opening 437 of the bracket 434 such that the spring-loaded pin assembly 1044 extends from the outer surface 435b of the first portion 435 of the bracket 434. An end portion 1047 of a pin body 1048 disposed within the pin housing 1049 can extend from the inner surface 435a of the first portion 435 of the bracket 434 and passes through opening 404 in the bracket member 20.

Figure 55:
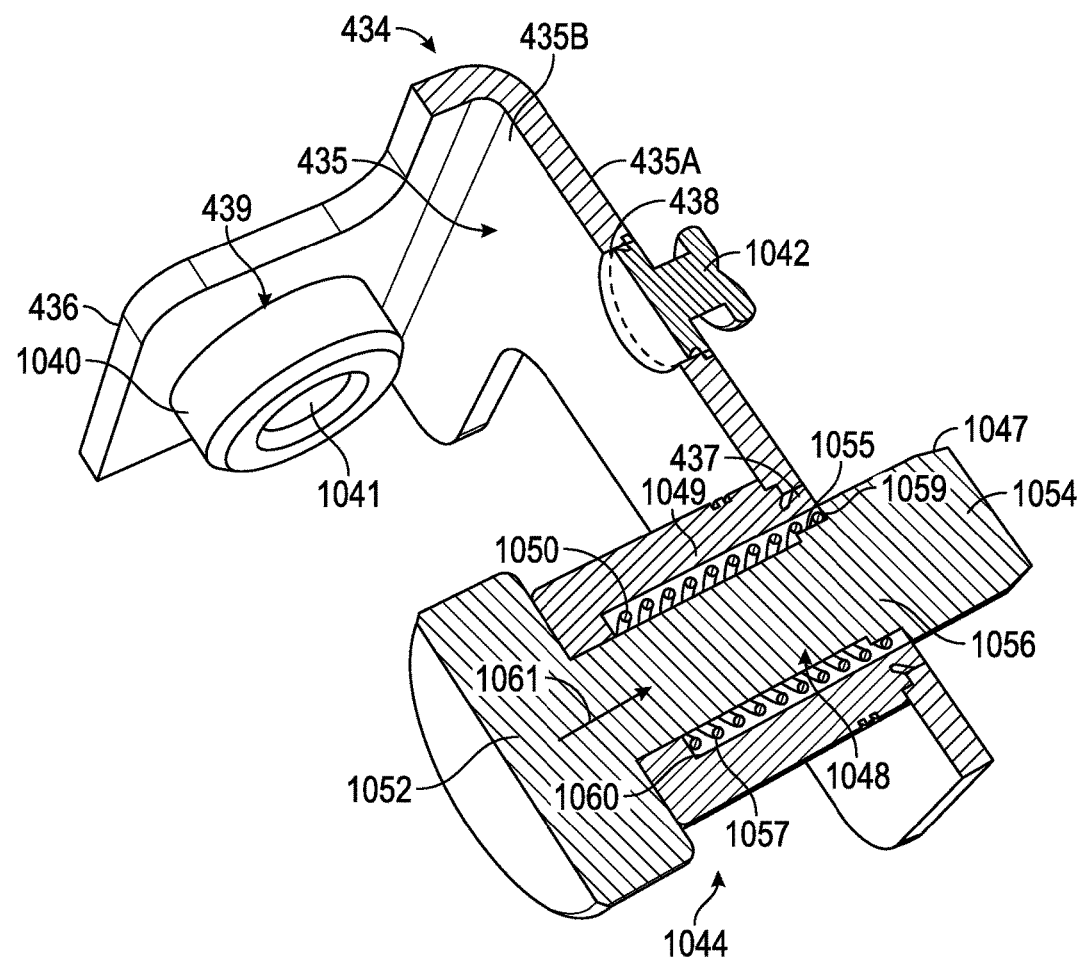
FIG. 55 is a cross-sectional view of a partial assembly of an exemplary media patching system of FIG. 1, including a bracket and a spring-loaded pin assembly.

FIG. 55 is a cross-sectional view of spring-loaded pin assembly 1044 mated with bracket 434. The spring-loaded pin assembly 1044 includes a pin body 1048 that can translate inside a cavity or opening 1050 formed in the pin housing 1049. The pin body 1048 includes a head 1052 on one end that is always disposed outside of the housing 1049, a small diameter region 1056 extending from the head 1052 and through the opening 1050 in the housing 1049, and a large diameter region 1054 disposed at an opposing end of the small diameter region 1056 relative to the head 1052. In some embodiments, the pin body 1048 can include an intermediate diameter region 1055 disposed between the small diameter region 1056 and the large diameter region 1054. The transition from the small diameter region 1054, the intermediate diameter region 1055, and the large diameter region 1054 can be formed in a stepped manner. A spring 1057 can be disposed within the opening 1050 and around the pin body 1048. In particular, the spring 1057 can be disposed between a face 1059 of the large diameter region 1054 of the pin body 1048 and a face 1060 of housing 1049, thereby biasing the head 1052 of the pin body 1048 towards the housing 1049 in the direction indicated by arrow 1061.

In some embodiments, an internally threaded member 1040 can be detachably mated with the bracket 434. In particular, the internally threaded member 1040 can be compression fit into the aperture 439 of the bracket 434 such that the member 1040 can extend from the second portion 436 adjacent to the outer surface 435b of the first portion 435 of the bracket 434. The threaded internal aperture 1041 of the member 1040 can be aligned with the aperture 439. Thus, rather than manipulating a nut to ensure alignment of the nut with a fastening member when connecting the bracket 434 to the lower cable management plate 35, the internally threaded member 1040 can remain attached to the bracket 434 to continuously provide a fastening portion in the bracket 434 that is aligned and ready to receive a fastening member. The internally threaded member 1040 therefore improves efficiency in assembling the bracket 434 and the lower cable management plate 35.

With reference to FIGS. 54-56 and 35-38, the bracket 434 can be connected to bracket member 22 as follows. The bracket 434 can be positioned on the outer surface 1062 of the bracket member 22 such that the pem 1042 extending from the inner surface 435a of the first portion 435 of the bracket 434 passes through the large diameter portion 405a of the opening 405 in the bracket member 22, e.g., a first position of the bracket 434. In the first position, the pin body 1048 of the spring-loaded pin assembly 1044 is not aligned with the opening 404 of the bracket member 22, and therefore cannot yet pass through the opening 404 of the bracket member 22. The bracket 434 can be slid backward such that the pem 1042 moves or slides into the small diameter portion 405b of the opening 405 in the bracket member 22, e.g., a second position of the bracket 434. When the bracket 434 is in the second position, the pin body 1048 is aligned with the opening 404 and passes through the opening 404 due to the force of the spring 1057 inside pin assembly 1044. In particular, the spring 1057 biasing the pin body 1048 forces a portion of the large diameter region 1054 into the opening 404 to interlock the bracket 434 with the bracket member 22. The spring-loaded pin assembly 1044 therefore acts as a quick release mechanism for connecting and disconnecting the bracket 434 from the bracket members 20, 22.

Figure 35:
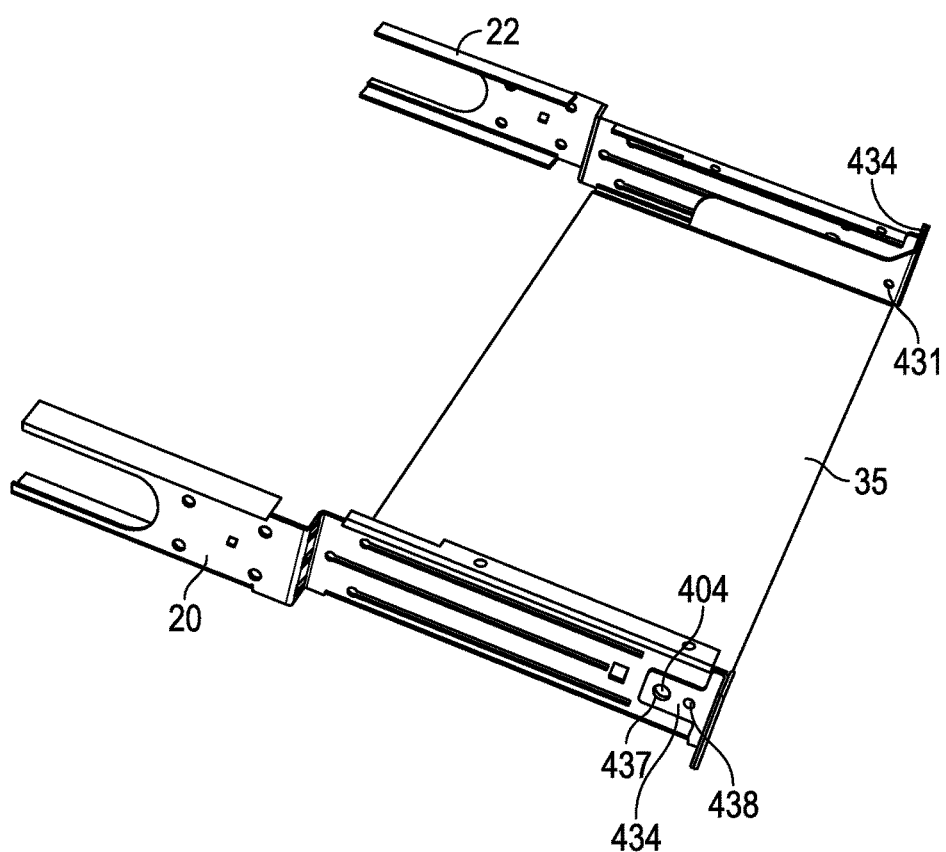
FIG. 35 is a perspective view of a partial assembly of an exemplary media patching system of FIG. 1, including first and second bracket members, lower cable management plate, and brackets.
Figure 36:
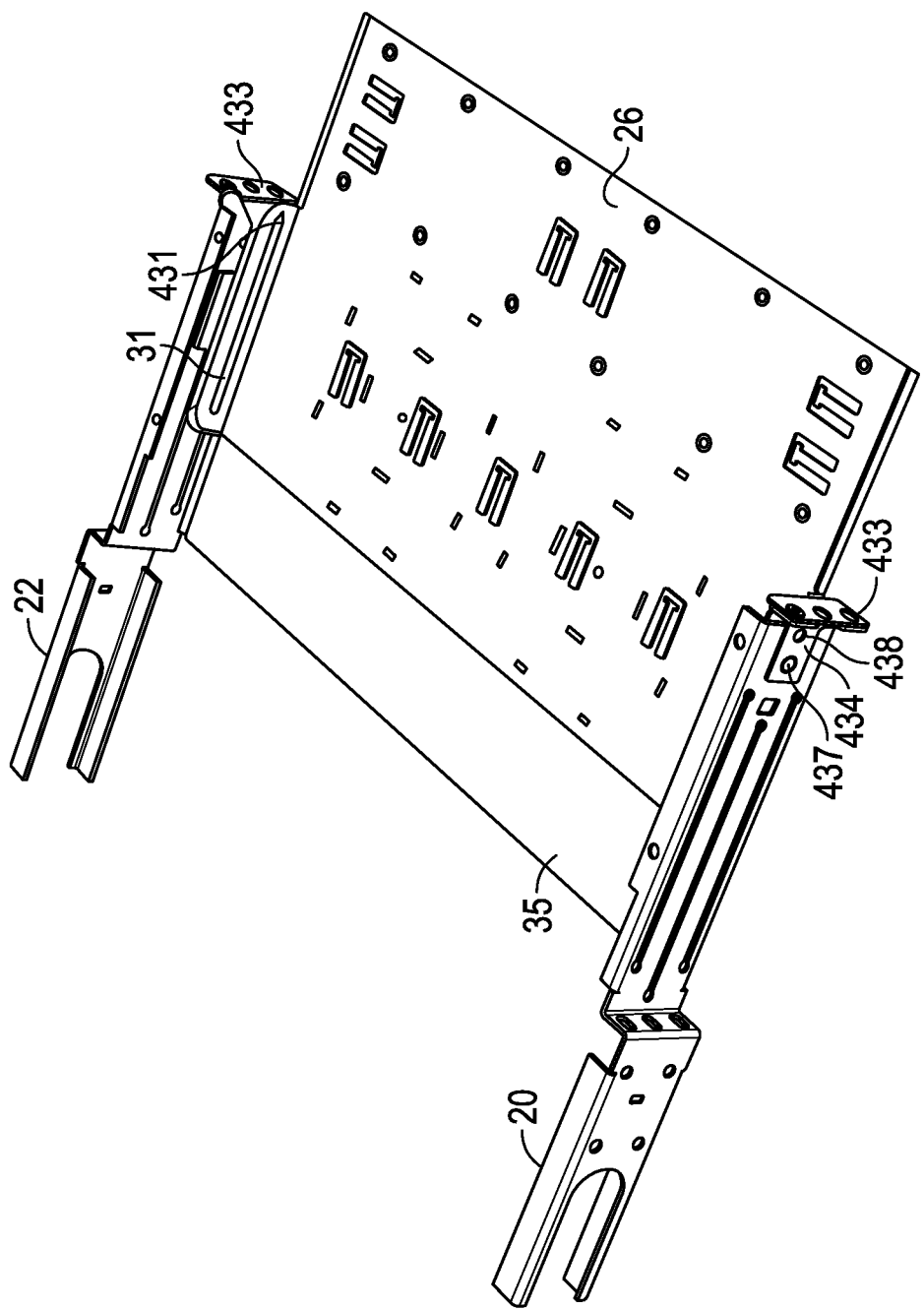
FIG. 36 is a perspective view of a partial assembly of an exemplary media patching system of FIG. 1, including first and second bracket members, lower cable management plate, brackets, and upper cable management plate.
Figure 37:
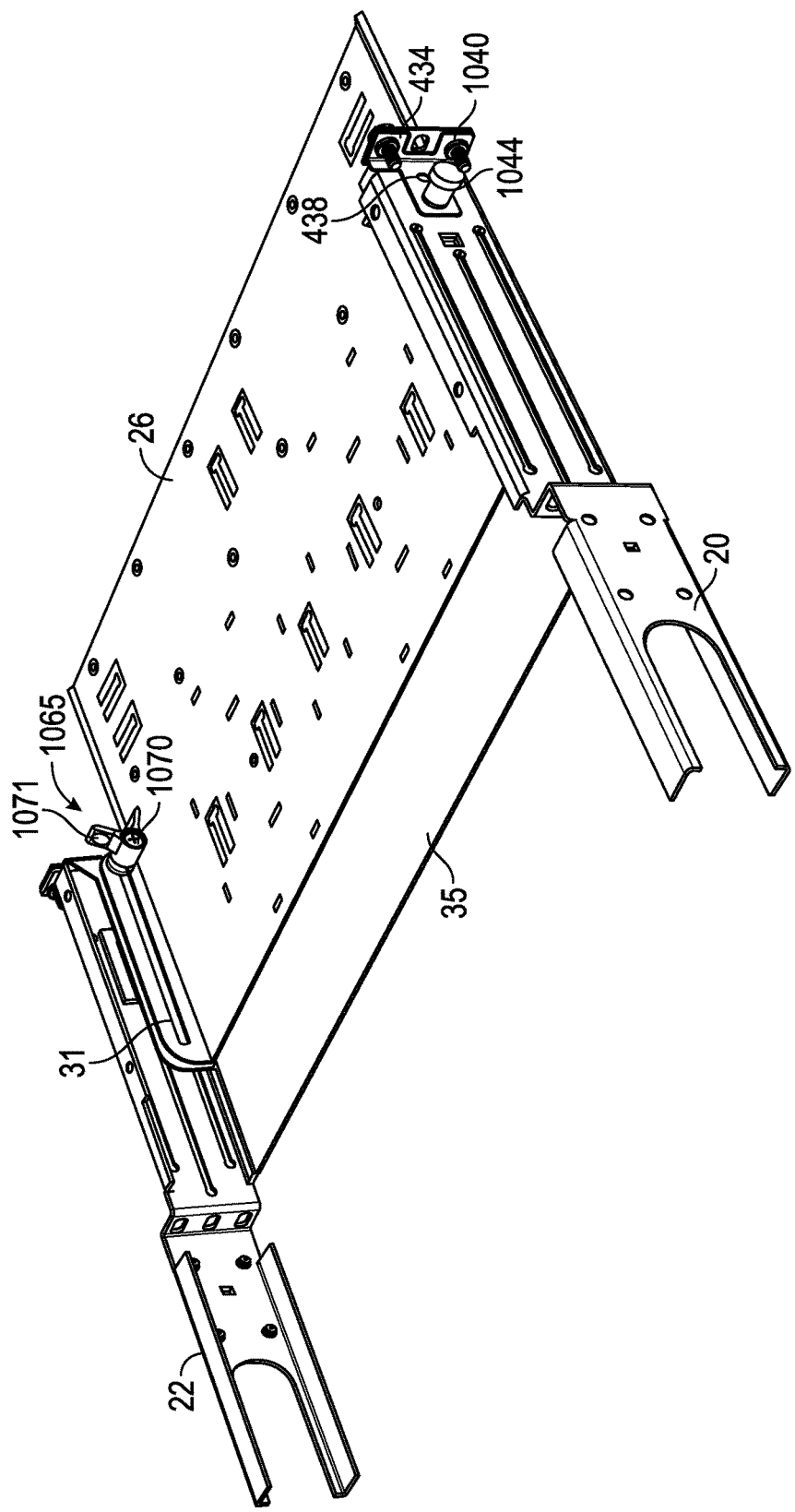
FIG. 37 is a perspective view of a partial assembly of an exemplary media patching system of FIG. 1, including first and second bracket members, lower cable management plate, brackets, upper cable management plate, and spring-loaded pin assemblies.
Figure 38:
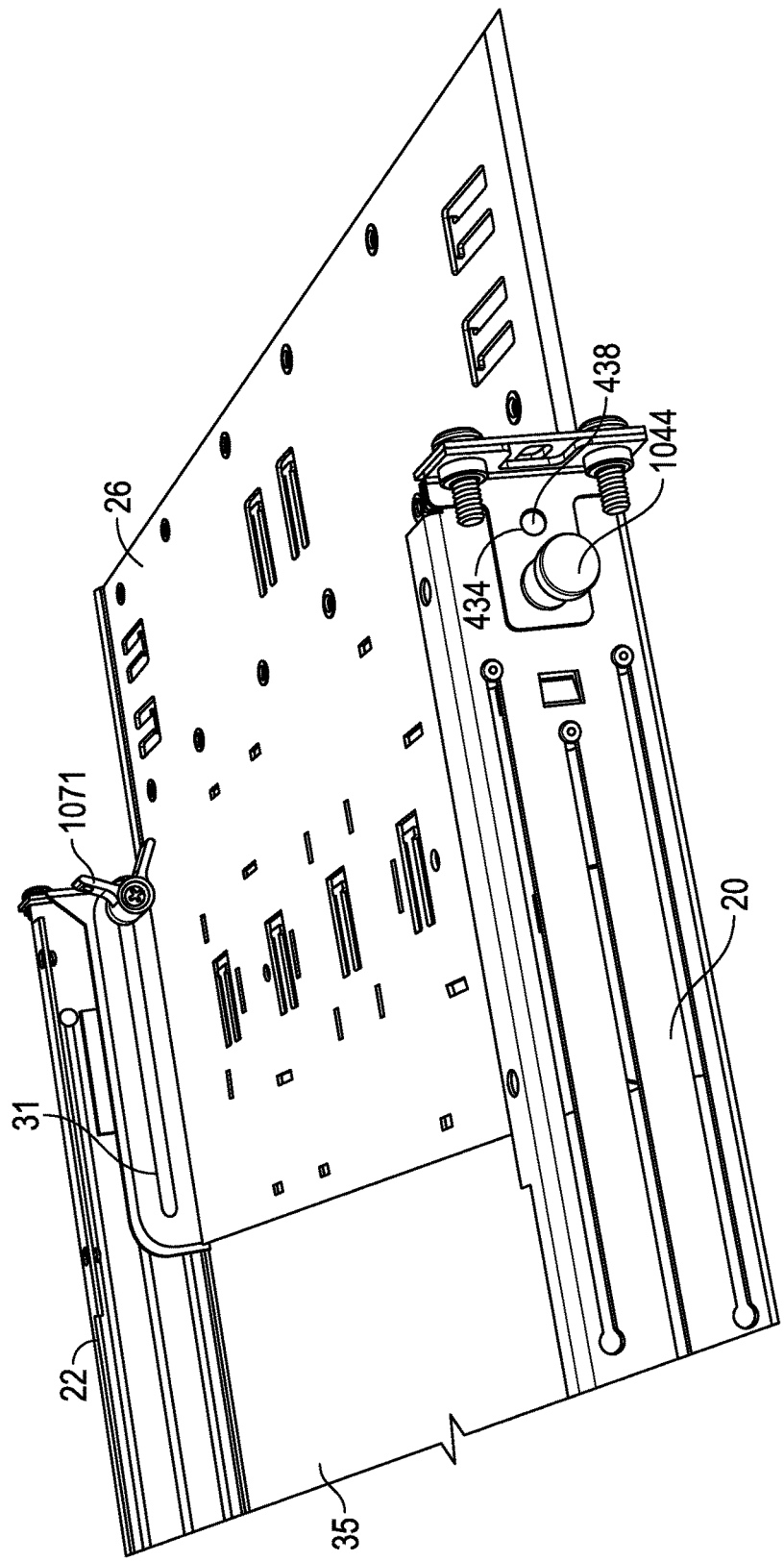
FIG. 38 is a detailed, perspective view of a partial assembly of an exemplary media patching system of FIG. 1, including first and second bracket members, lower cable management plate, brackets, upper cable management plate, and spring-loaded pin assemblies.

Once the bracket 434 has been connected to each bracket member 20, 22, lower cable management plate 35 can be detachably fixed to the bracket members 20, 22 by positioning flanges 429 of lower cable management plate 35 against the bracket 434 such that openings 433 of the lower cable management plate 35 and apertures 439 of bracket 434 are aligned (see FIGS. 35 and 36). When the openings 433 and apertures 439 are aligned, panel mounting screws 1058 can be passed through the openings 433 and apertures 439 and screwed into internally threaded pieces 1040 to secure the lower cable management plate 35 to brackets 434 and, thereby, to the first and second bracket members 20, 22 (see FIGS. 37 and 38).

FIG. 54 further shows a detailed view of how the upper cable management plate 26 is mounted to the lower cable management plate 35 such that the upper cable management plate 26 can slide relative to the lower cable management plate 35. In particular, one end of a pem 1063 can be compression fit into opening 431. The pem 1063 thereby extends inward from the flange 429 of the lower cable management plate 35 and passes through slot 31 in flange 415 of the upper cable management plate 26. The pem 1063 includes an internally threaded bore 1064 extending therein. A thumb latch 1065, e.g., a fastening member, including a first cylindrical portion 1066 with a first cam portion 1068 and a second cylindrical portion 1067 with a second cam portion 1069, e.g., a cam lock mechanism, is mounted to the outer surface of the pem 1063.

The second cylindrical portion 1067 can be rotationally fixed to the pem 1063. The first cylindrical portion 1066 can be attached to the pem 1063 with a screw 1070. The screw 1070 includes threads complementary to the threads of the pem 1063 such that the screw 1070 can mate with the internally threaded bore 1064. The second cylindrical portion 1067 can rotate about pem 1063 and can be manipulated to rotate in either direction with fingers 1071 (see FIGS. 37 and 38). When the first cylindrical portion 1066 of the thumb latch 1065 is disposed in a release position or configuration, the upper cable management plate 26 can slide relative to the lower cable management plate 35 with pem 1063 riding or sliding within slot 431. In particular, in the release position or configuration, a first cam surface 1072 of the first cam portion 1068 can be disposed in a spaced relation relative to the second cam surface 1073 of the second cam portion 1069 along the pem 1063.

When the first cylindrical portion 1066 of the thumb latch 1065 is rotated into a locking position or configuration, the first cam surface 1072 can interact with the second cam surface 1073 to push the second cylindrical portion 1067 towards the inner surface of flange 415 of the upper cable management plate 26. In particular, the first cylindrical portion 1066 can be rotated along the pem 1063 to rotate the screw 1070 deeper into the internally treaded bore 1064 of the pem 1063. The first cam surface 1072 can thereby press against the second cam surface 1073 to push the second cylindrical portion 1067 against the inner surface of flange 415 of the upper cable management plate 26.

The friction force created between the second cylindrical portion 1067 and the flange 415 of the upper cable management plate 26 fixates or secures the upper cable management plate 26 to the lower cable management plate 35 such that the upper cable management plate 26 cannot translate relative to the lower cable management plate 35. In particular, the pressure of the second cylindrical portion 1067 against the flange 415 prevents the pem 1063 from sliding within the slot 31 of the flange 415. To release and move the upper cable management plate 26 relative to the lower cable management plate 35, the first cylindrical portion 1066 can be rotated away from the second cylindrical portion 1067 to release and allow sliding of the pem 1063 within the slot 31 of the flange 415.

Figure 56:
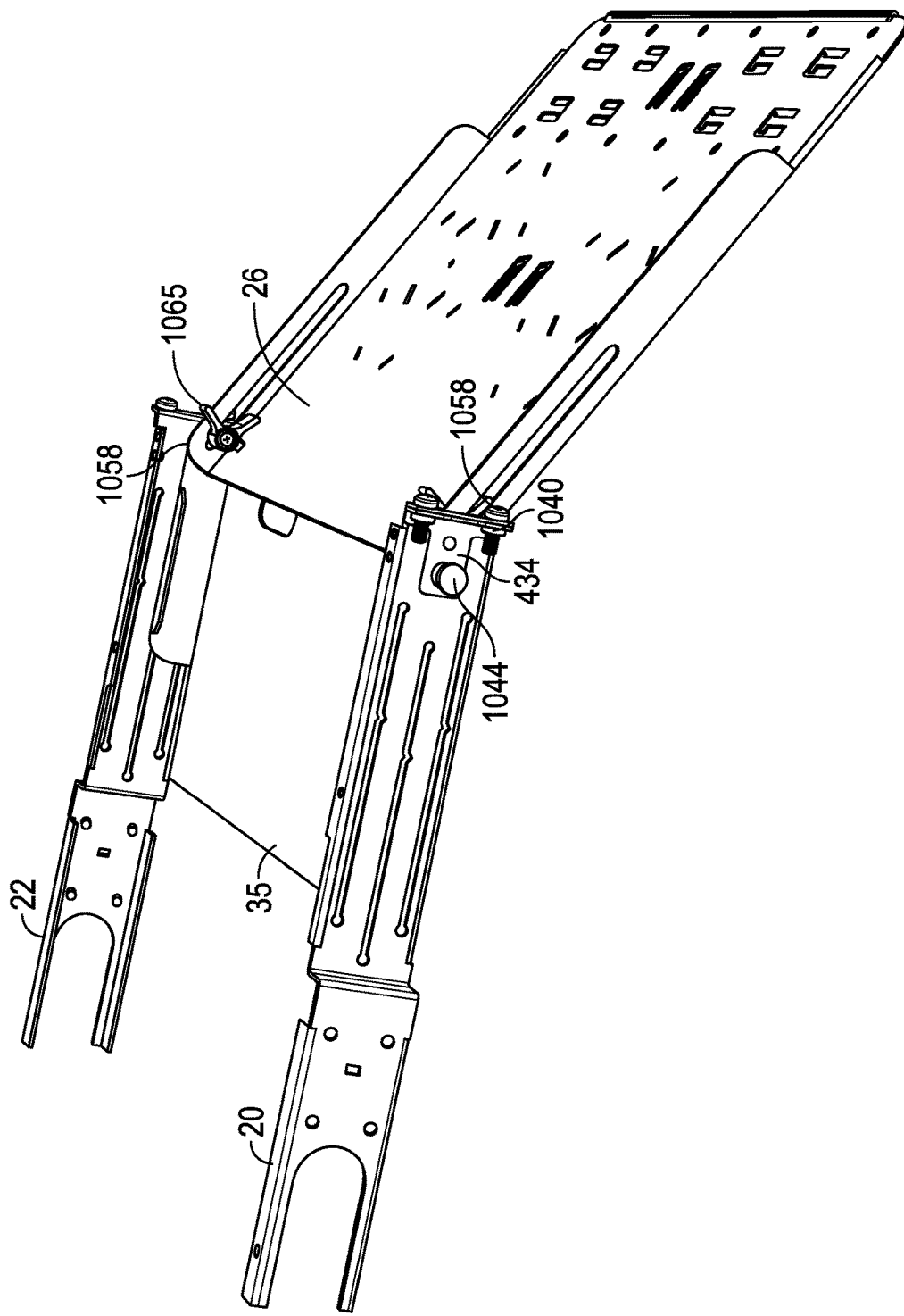
FIG. 56 is a perspective view of a partial assembly of an exemplary media patching system of FIG. 1, including first and second frame members, lower cable management plate, brackets, and upper cable management plate pivoted relative to lower cable management plate.

Thus, rather than removing the entire media patching system 10 from the rack 350, to access cables supported by upper cable management plate 26, upper cable management plate 26 can slide out from the rear of media patching system 10 (see FIG. 56). Upon at least partially extending upper cable management plate 26 from the rear of media patching system 10 along slots 31, pems 1063 can act as hinges to at least partially allow upper cable management plate 26 to rotate or pivot relative to media patching system 10. In particular, the upper cable management plate 26 can slide along the pems 1063 between the proximal end 416 and the distal end 417 of the slots 31 (see FIG. 32). At the proximal end 416 position, the upper cable management plate 26 can be positioned in a fully extended position relative to the lower cable management plate 35, and the rounded configuration of the proximal end 416 of the slot 31 allows variation in the pivot angle of the upper cable management plate 26 relative to the lower cable management plate 35. At the distal end 417 position, the upper cable management plate 26 can be positioned in a fully retracted position relative to the lower cable management plate 35. The upper cable management plate 26 can therefore pivot relative to first and second bracket members 20, 22 and lower cable management plate 35 as is shown in FIG. 56. For example, upper cable management plate 26 can pivot in a downward direction relative to a plane defined by or parallel to first and second bracket members 20, 22, lower cable management plate 35, or both. Greater access can thereby be provided to cables stored or organized on upper cable management plate 26.

Figure 57:
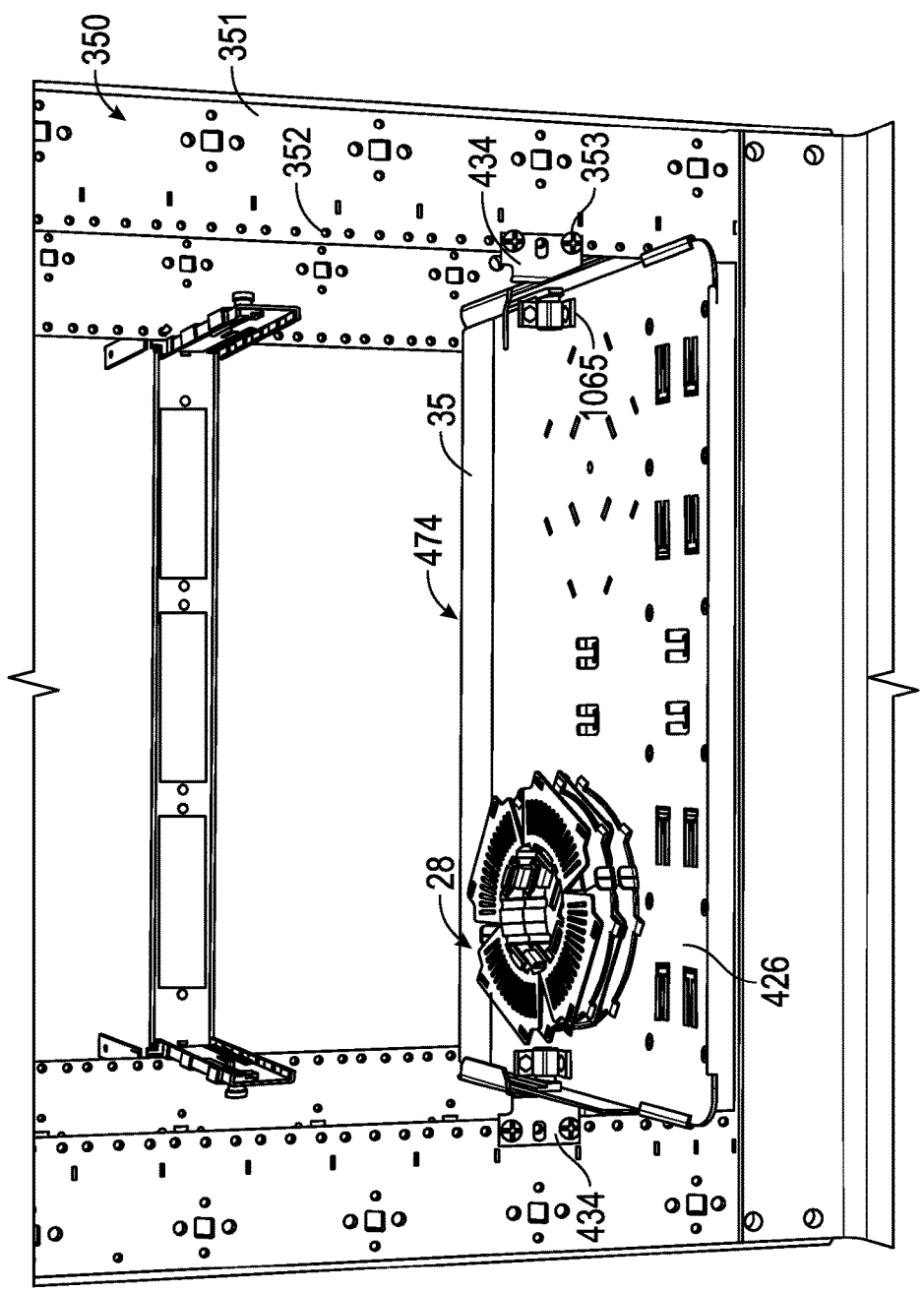
FIG. 57 is a rear, perspective view of a cable management plate assembly including lower cable management plate and upper cable management plate secured directly to a rack without first and second bracket members.

Cable management plate assembly 474 (FIG. 57) includes the assembly of upper cable management plate 26 and lower cable management plate 35. In some embodiments, the cable management plate assembly 474 need not be connected to bracket members 20, 22. Rather, as shown in FIG. 57, the cable management plate assembly 474 provides versatility in that the cable management plate assembly 474 can be connected directly to the back portions 351 of the uprights of the rack 350. In the configuration shown in FIG. 42, openings 433 in second portion 432 in flanges 429 of lower cable management plate 35 are not aligned with apertures 439 in bracket 434. Instead, openings 433 can be aligned with openings 352 formed in the back portions 351 of the uprights of rack 350 and panel mounting screws 353 can pass through the openings 433 and the corresponding openings 352 in the back portions 351 of the uprights of rack 350 to secure the cable management plate assembly 474 to the rack 350. The upper cable management plate 26 can be secured to the lower cable management plate 35 as describe above and can slide and pivot relative to the lower cable management plate 35 when the thumb latches 1065 are disposed in the release position. Thus, the cable management plate assembly 474 can advantageously be located further back in the rack 350 when cable management in that location is needed or desired, and can be secured to the rack 350 independently of a media patching system 10.

Figure 29:
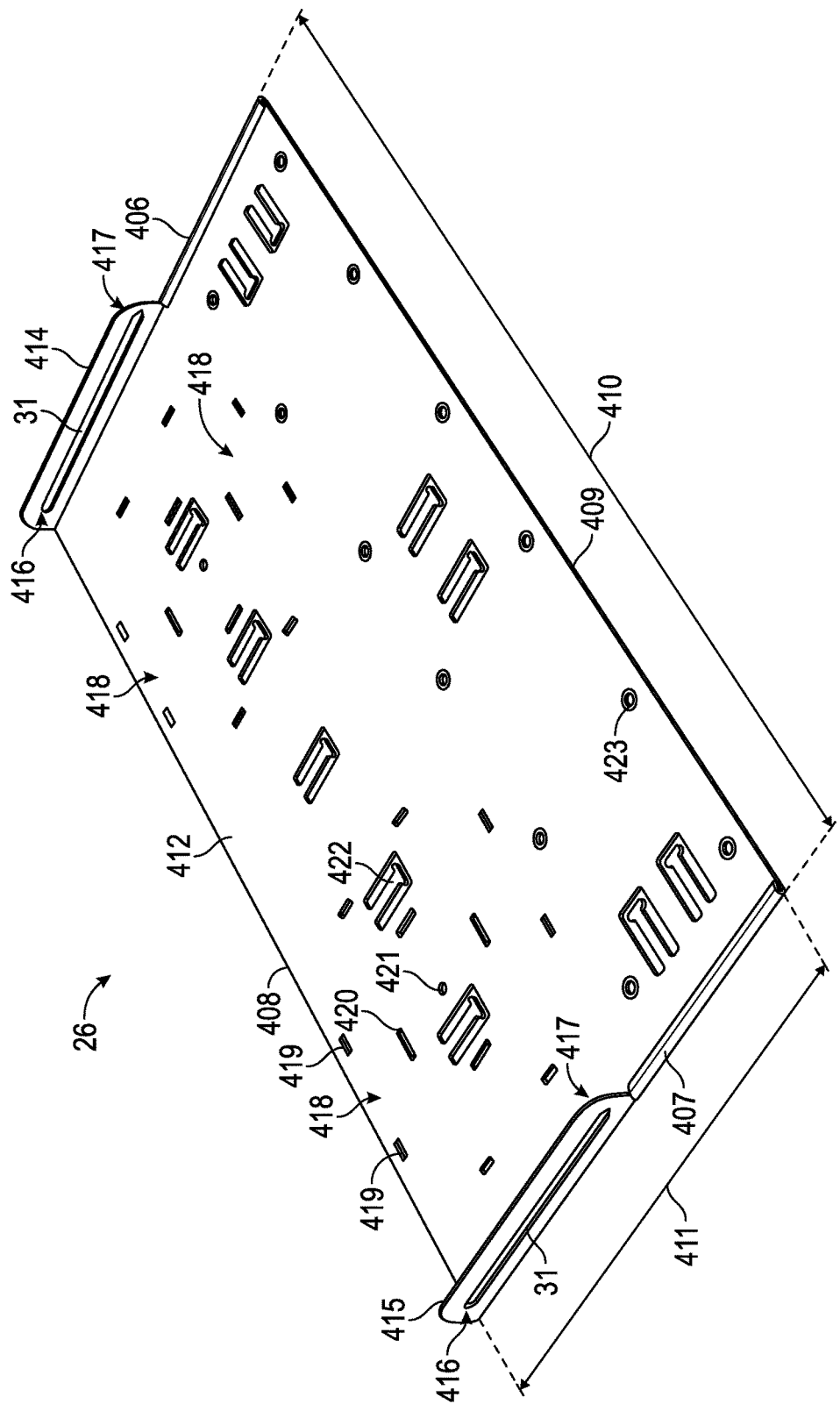
FIG. 29 is a top, perspective view of an exemplary upper cable management plate according to the present disclosure.
Figure 30:
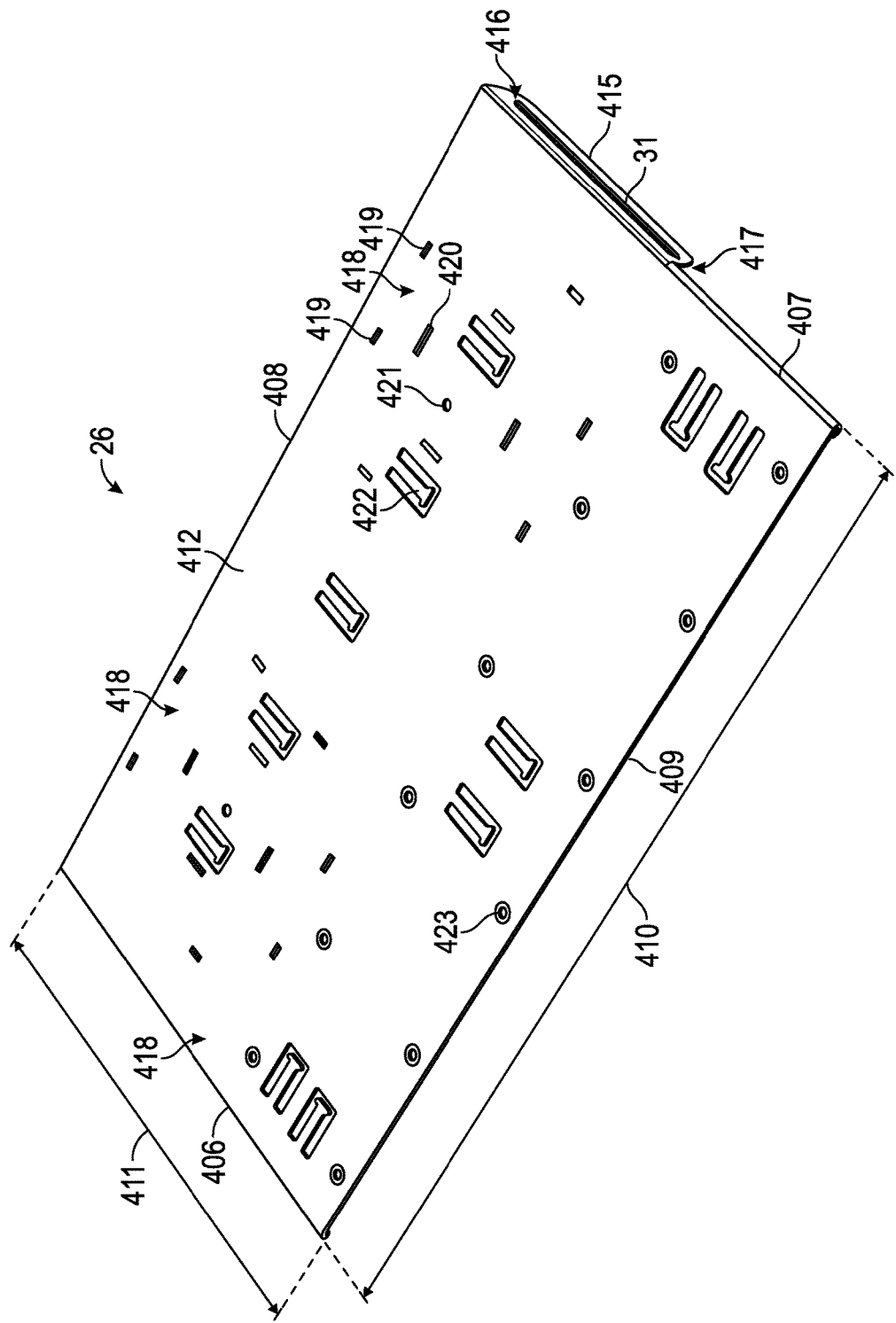
FIG. 30 is a bottom, perspective view of an exemplary upper cable management plate of FIG. 29.
Figure 31:
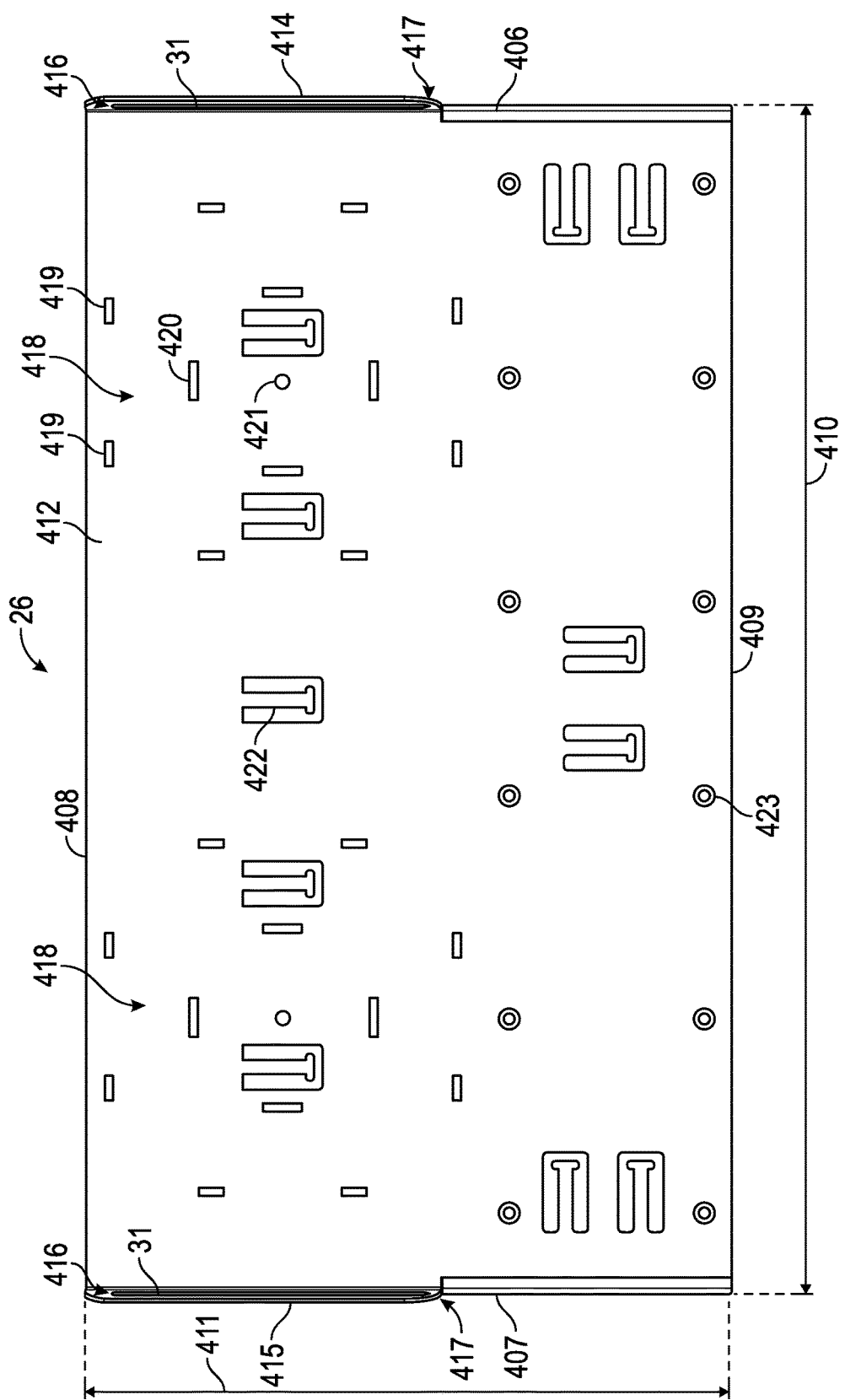
FIG. 31 is a top view of an exemplary upper cable management plate of FIG. 29.
Figure 32:
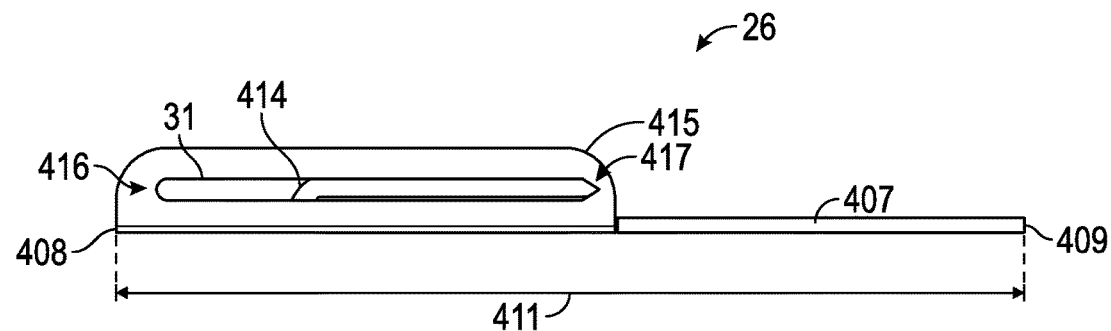
FIG. 32 is a side view of an exemplary upper cable management plate of FIG. 29.
Figure 42:
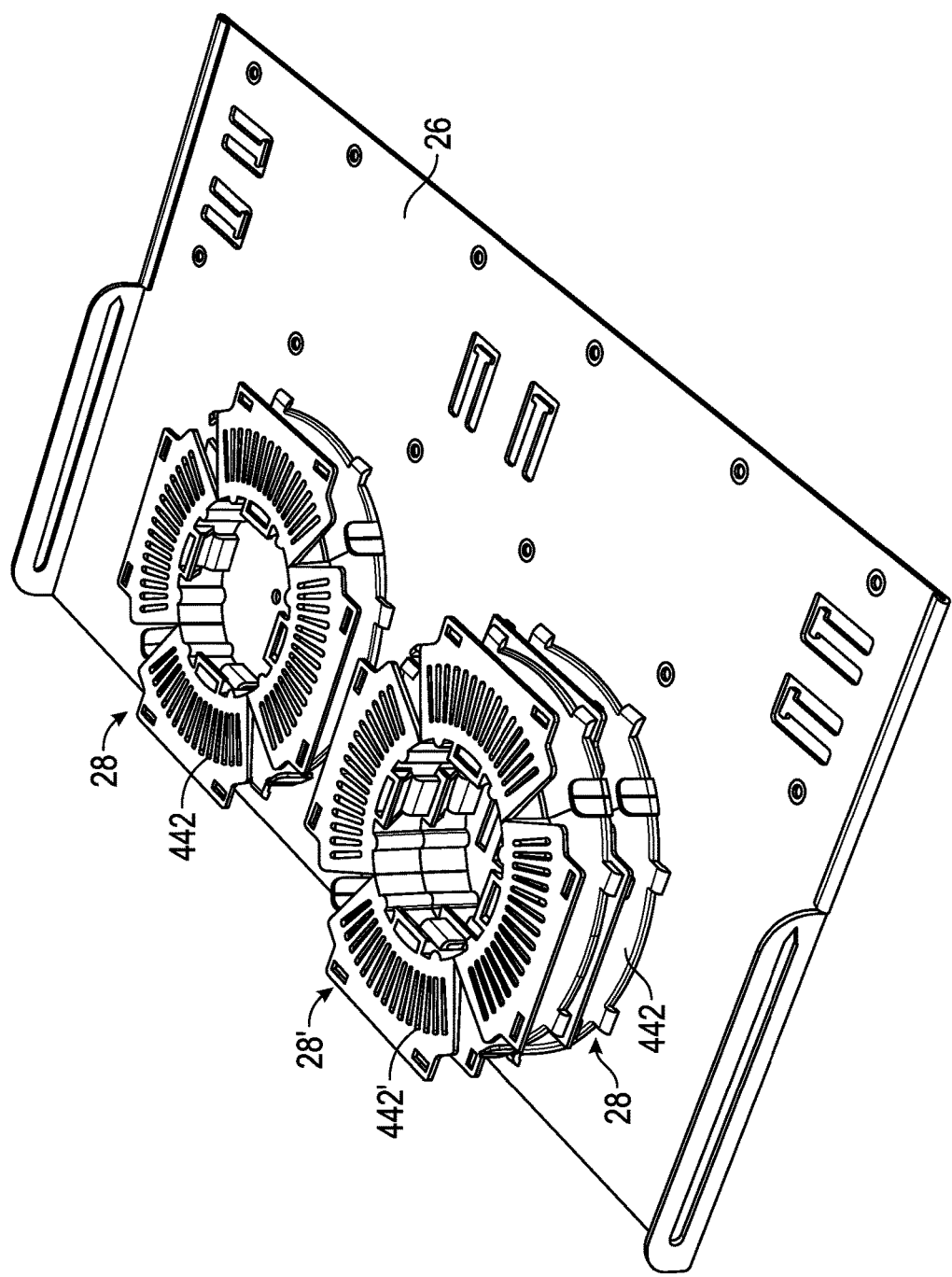
FIG. 42 is a perspective view of the exemplary spool assembly of FIG. 41 secured to a cable management plate.

As noted above and as shown in FIGS. 3, 6, 7 and 42, upper cable management plate 26 can include one or more cable management spool assemblies 28 or the like removably mounted thereon for cable/wire 38, 40 management purposes of system 10, 100. For example and as shown in FIGS. 29 and 42, groups of slots 418 can be used to detachably secure one or more spool assemblies 28 to body 412 (e.g., for cable management purposes). As discussed above, plate 26 is configured to be movably mounted with respect to first and second bracket members 20, 22 of media patching system 10, 100.

Figure 39:
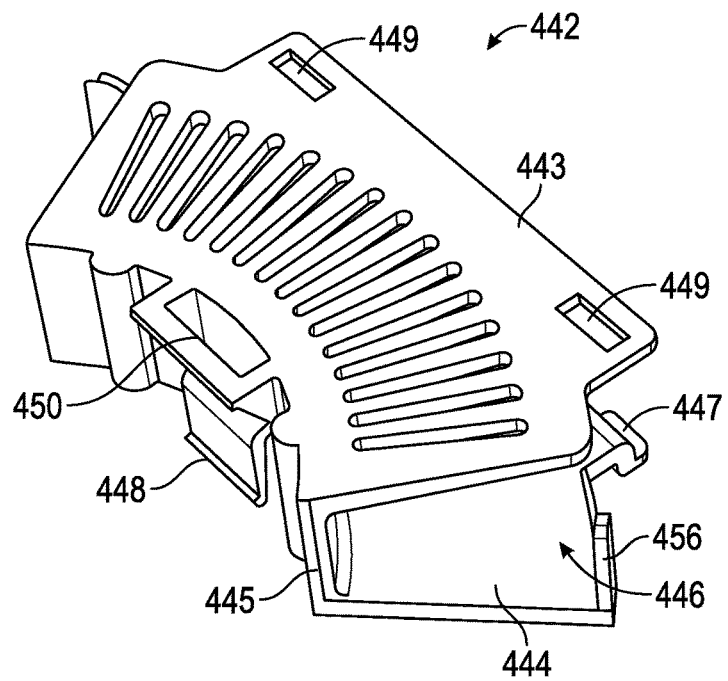
FIG. 39 is a top, perspective view of an exemplary quarter spool according to the present disclosure.
Figure 40:
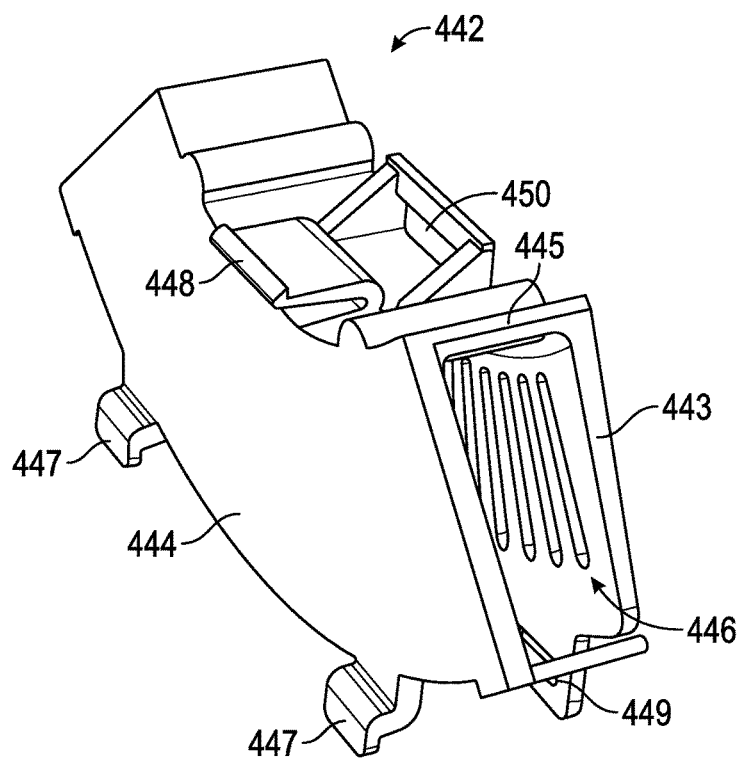
FIG. 40 is a bottom, perspective view of the exemplary quarter spool of FIG. 39.
Figure 41:
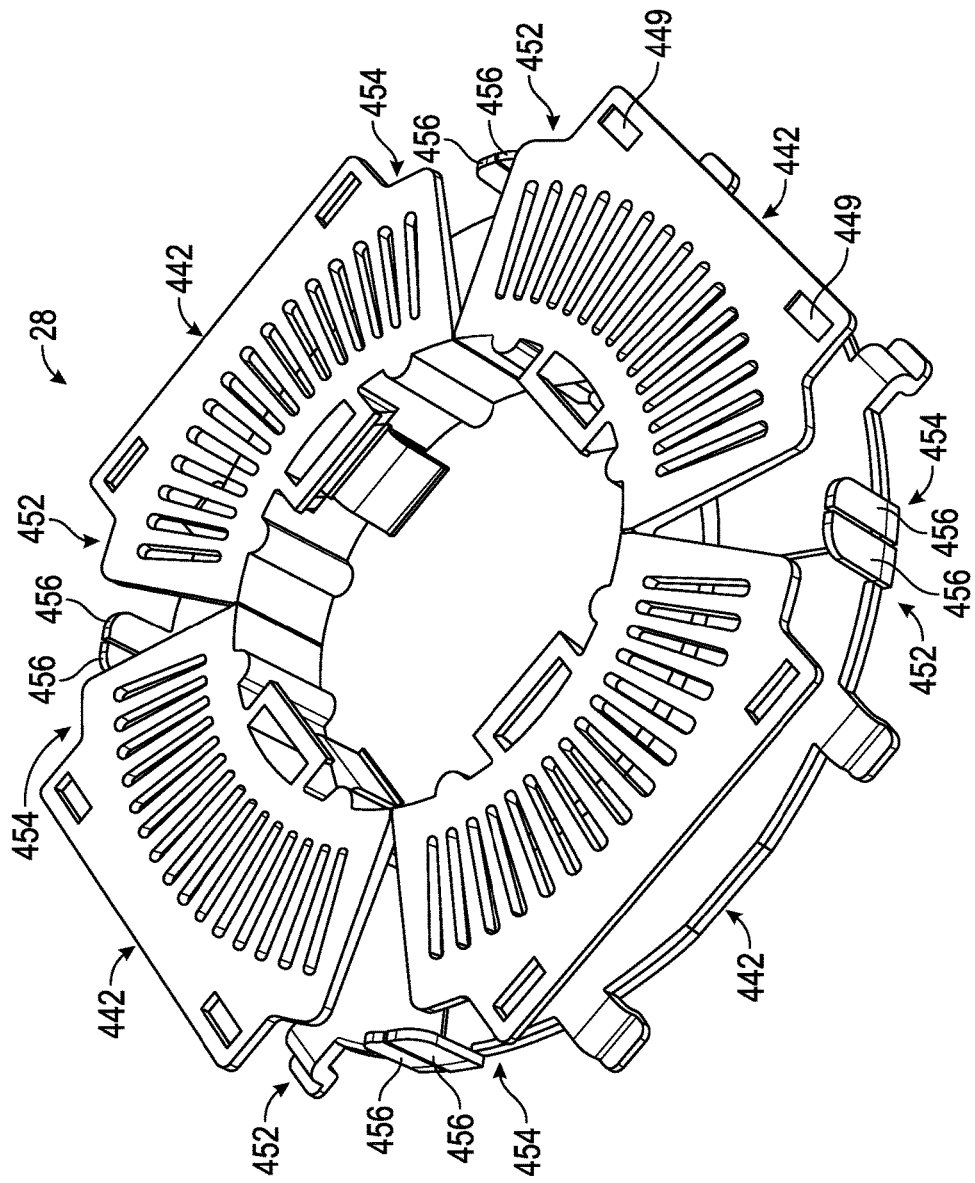
FIG. 41 is a perspective view of an exemplary spool assembly including four quarter spools.

FIGS. 39 and 40 show perspective views of an exemplary spool member 442. In general, each spool assembly 28 includes at least one spool member 442. In exemplary embodiments and as shown in FIG. 41, spool assembly 28 includes four spool members 442, although the present disclosure is not limited thereto. Rather and as discussed further below, spool assembly 28 can include other suitable numbers of spool members 442 (e.g., one, two, three, four, a plurality, etc.).

As shown in FIGS. 39-40, each exemplary spool member 442 includes a top wall 443 and a bottom wall 444 separated by an inner wall 445. Inner wall 445 connects top and bottom walls 443, 444 relative to each other and forms a cavity 446 between top and bottom walls 443, 444.

In general, top and bottom walls 443, 444 extend from inner wall 445, with the top, bottom and inner walls 443, 444, 445 defining the cavity 446. Each cavity 446 is configured and dimensioned to support and/or at least partially house media cables 38, 40 or the like. Exemplary spool members 442 include attachment features/structures (e.g., flanges 447, 448) that are advantageously configured and dimensioned to releasably mount with respect to: (i) media patching systems 10, 100 (e.g., to cable management plate 26), (ii) related supporting structures (e.g., relative to vent holes of a rack 350), and/or (iii) other spool members 442, for cable management purposes.

In some embodiments, top and bottom walls 443, 444 are substantially parallel to one another, and inner wall 445 is substantially perpendicular or transverse to top and bottom walls 443, 444.

In general, the top, bottom and inner walls 443, 444, 445 of each spool member 442 extend from a first end 452 to a second end 454 (FIG. 41). In exemplary embodiments and as shown in FIG. 41, at least a portion of the top, bottom and inner walls 443, 444, 445 of each spool member 442 extend substantially arcuately from first end 452 to second end 454.

Moreover and as shown in FIGS. 41-42, after the four individual spool members 442 are releasably mounted with respect to plate 26, at least a portion of the top, bottom and inner walls 443, 444, 445 of each spool member 442 are positioned so that: (i) the inner walls 445 of the four mounted spool members 442 define a substantially circular and substantially continuous inner surface of spool assembly 28, (ii) the top walls 443 of the four mounted spool members 442 define a substantially circular and substantially continuous top surface of spool assembly 28, and (iii) the bottom walls 444 of the four mounted spool members 442 define a substantially circular and substantially continuous bottom surface of spool assembly 28.

As such and as also depicted in FIGS. 41-42, after the four individual spool members 442 are releasably mounted with respect to plate 26, the first ends 452 of the inner and bottom walls 445, 444 of a first spool member 442 are positioned proximal to the second ends 454 of the inner and bottom walls 445, 444 of a neighboring second spool member 442, the first ends 452 of the inner and bottom walls 445, 444 of the second spool member 442 are positioned proximal to the second ends 454 of the inner and bottom walls 445, 444 of a neighboring third spool member 442, the first ends 452 of the inner and bottom walls 445, 444 of the third spool member 442 are positioned proximal to the second ends 454 of the inner and bottom walls 445, 444 of a neighboring fourth spool member 442, and the first ends 452 of the inner and bottom walls 445, 444 of the fourth spool member 442 are positioned proximal to the second ends 454 of the inner and bottom walls 445, 444 of the neighboring first spool member 442.

Furthermore and in exemplary embodiments, the first and second ends 452, 454 of each bottom wall 444 of each spool member 442 include an abutment wall 456 extending from an outer end of the bottom wall 444. As such and as shown in FIG. 41, abutment walls 456 of neighboring spool members 442 are positioned proximal to one another when spool assembly 28 is mounted (e.g., to cable management plate 26 or the like).

Figure 50:
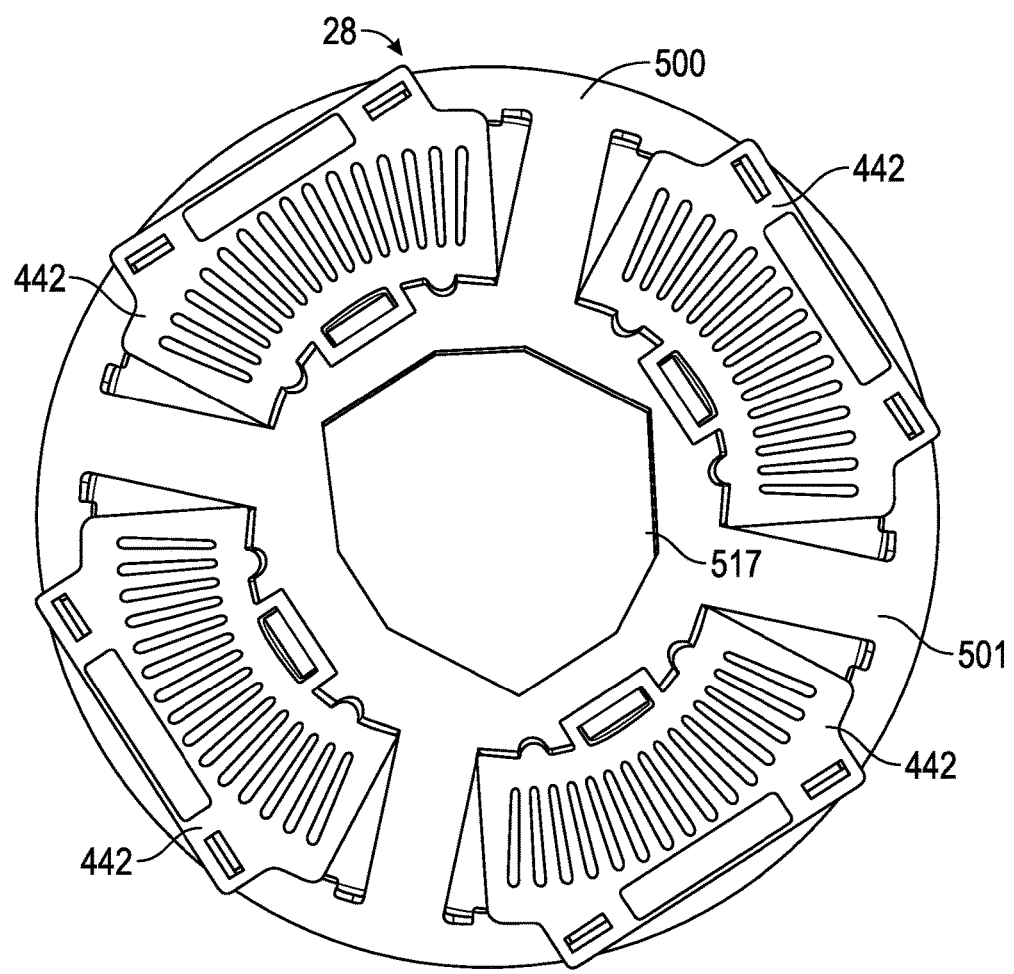
FIG. 50 is a top view of the mounting body of FIG. 49.
Figure 51:
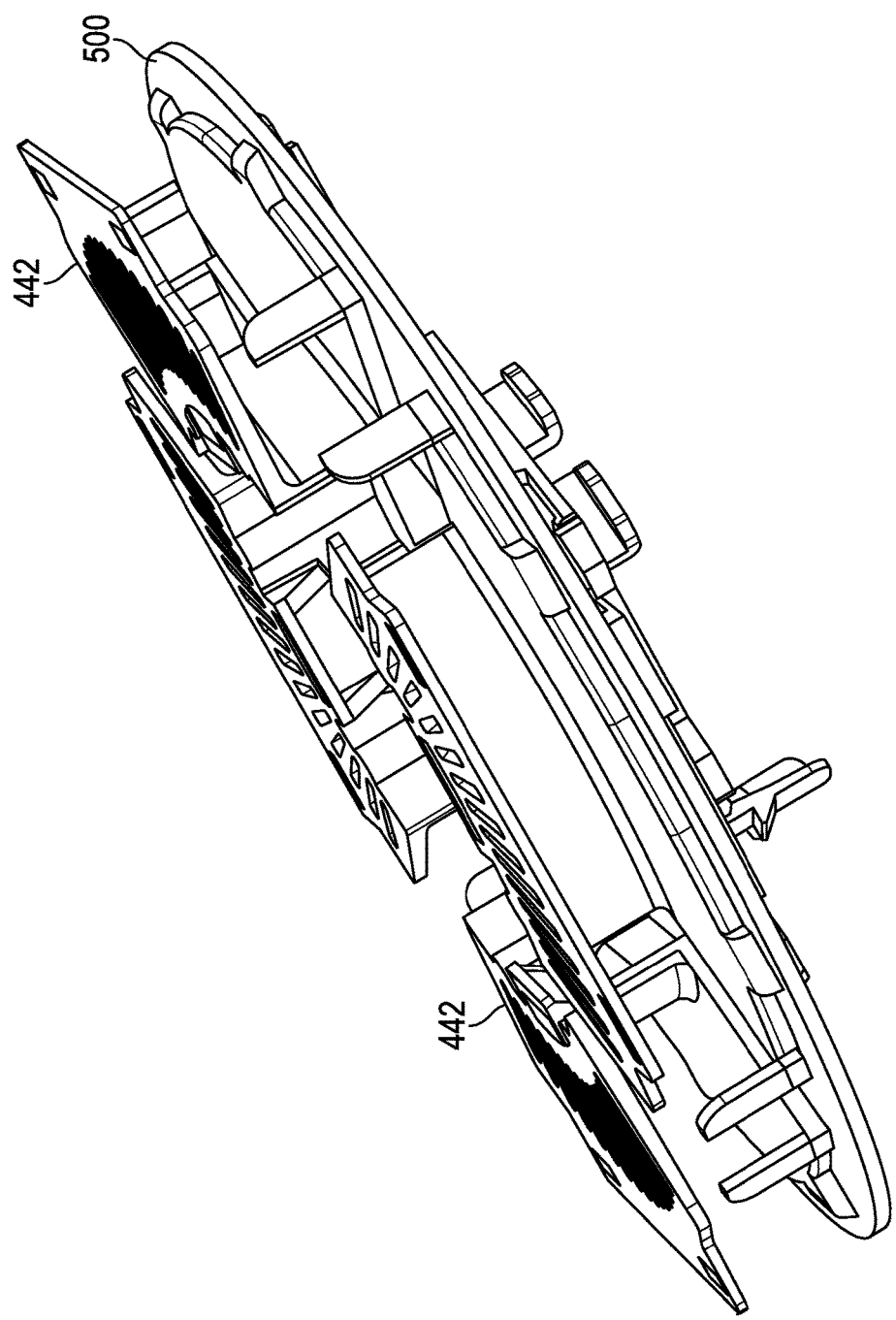
FIG. 51 is a side view of the mounting body of FIG. 49.

In other embodiments and as discussed further below in connection with FIG. 50, it is noted that mounted spool members 442 can be positioned on the mounting structure (e.g., as shown on body 500 in FIG. 50, or as an alternative mounting position on plate 26) with spaces between neighboring members 442 (e.g., neighboring members 442 are spaced apart from one another on body 500, or on plate 26). It is noted that such configurations also provide a mounted assembly 28 having a substantially circular shape/design (e.g., as shown in FIG. 50, the walls 443, 444, 445 of the four mounted spool members 442 define substantially circular inner, top and bottom surfaces of spool assembly 28).

As noted above, each spool member 442 includes attachment features/structures (e.g., flanges 447, 448) that are advantageously configured and dimensioned to releasably mount with respect to: (i) media patching systems 10, 100 (e.g., to cable management plate 26), (ii) related supporting structures (e.g., relative to vent holes of a rack 350), and/or (iii) other spool members 442, for cable management purposes.

For example and as shown in FIGS. 39-40, the bottom wall 444 can include one or more flanges 447 (e.g., two S-shaped flanges 447) extending from an outer edge of spool member 442. The bottom wall 444 can include one or more flanges 448 (e.g., a U-shaped flange 448) on an opposing inner edge of spool member 442.

In general, each flange 447, 448 extends from bottom wall 444, with each flange 447, 448 configured to releasably mount with respect to a supporting structure (or to another member 442).

For example, flanges 447, 448 can be configured and dimensioned complementary to slots 419, 420 of cable management plate 26 (FIGS. 29 and 42). In particular, flanges 447 can be complementary to slots 419, and flange 448 can be complementary to slot 420 such that spool members 442 can be mounted onto cable management plate 26.

During assembly, flanges 447 can be inserted into slots 419 such that a portion of flanges 447 passes through slots 419. Flange 448 can be depressed and inserted into slot 420 to detachably lock spool member 442 to cable management plate 26. For example, upon release of flange 448, flange 448 can spring or snap outward within slot 420 and interlock relative to cable management plate 26. One or more cables 38, 40 can be passed through cavity 446 and wrapped around mounted spool member(s) 442 to organize the cables 38, 40 on cable management plate 26.

In some embodiments and as shown in FIGS. 41-42, spool member 442 can define an approximately ninety degree portion or circumference of a full spool assembly 28. As shown in FIGS. 41 and 42, four spool members 442 can be individually interlocked relative to cable management plate 26 such that a substantially circular spool assembly 28 is formed. Inner walls 445 (and/or top and/or bottom walls 443, 444) of spool members 442 can mate to form a substantially complete circumference around which cables 38, 40 can be wrapped, housed and/or positioned (e.g., for cable management purposes).

In other embodiments and as noted above, (circular) spool assembly 28 can include other suitable numbers of spool members 442 (e.g., one, two, three, a plurality, etc.). For example, spool member 442 can define an approximately one-hundred-eighty degree portion or circumference of a full spool assembly 28. As such, two spool members 442 can be individually interlocked relative to cable management plate 26 such that a substantially circular spool assembly 28 is formed. As another example, spool member 442 can define an approximately one-hundred-twenty degree portion or circumference of a full spool assembly 28. As such, three spool members 442 can be individually interlocked relative to cable management plate 26 such that a substantially circular spool assembly 28 is formed. It is noted that other combinations/permutations of spool members 442 are possible to form spool assembly 28 (e.g, to form substantially circular spool assembly 28).

Each spool member 442 can include one or more slots 449, 450 that are advantageously configured and dimensioned to releasably mount with respect to other spool members 442 (e.g., to flanges 447, 448).

For example and as shown in FIGS. 39, 41 and 42, the top wall 443 can include one or more slots 449 (e.g., two slots 449) positioned near the outer edge of top wall 443 of spool member 442. The top wall 443 can include one or more slots 450 (e.g., one slot 450) positioned near the inner edge of top wall 443 of spool member 442.

In general, each slot 449, 450 is positioned on top wall 443, with each slot 449, 450 configured to releasably mount with respect to another spool member 442. In this regard, it is noted that slots 449 can be complementary to flanges 447, and slot 450 can be complementary to flange 448. Spool members 442 can thereby be stacked relative to each other (e.g., on top of another) to provide additional space onto which cables 38, 40 can be organized (FIG. 42). For example and as shown in FIG. 42, upper spool members 442' can be releasably stacked on top of lower spool members 442 to form upper spool assembly 28' on top of lower spool assembly 28.

Figure 43:
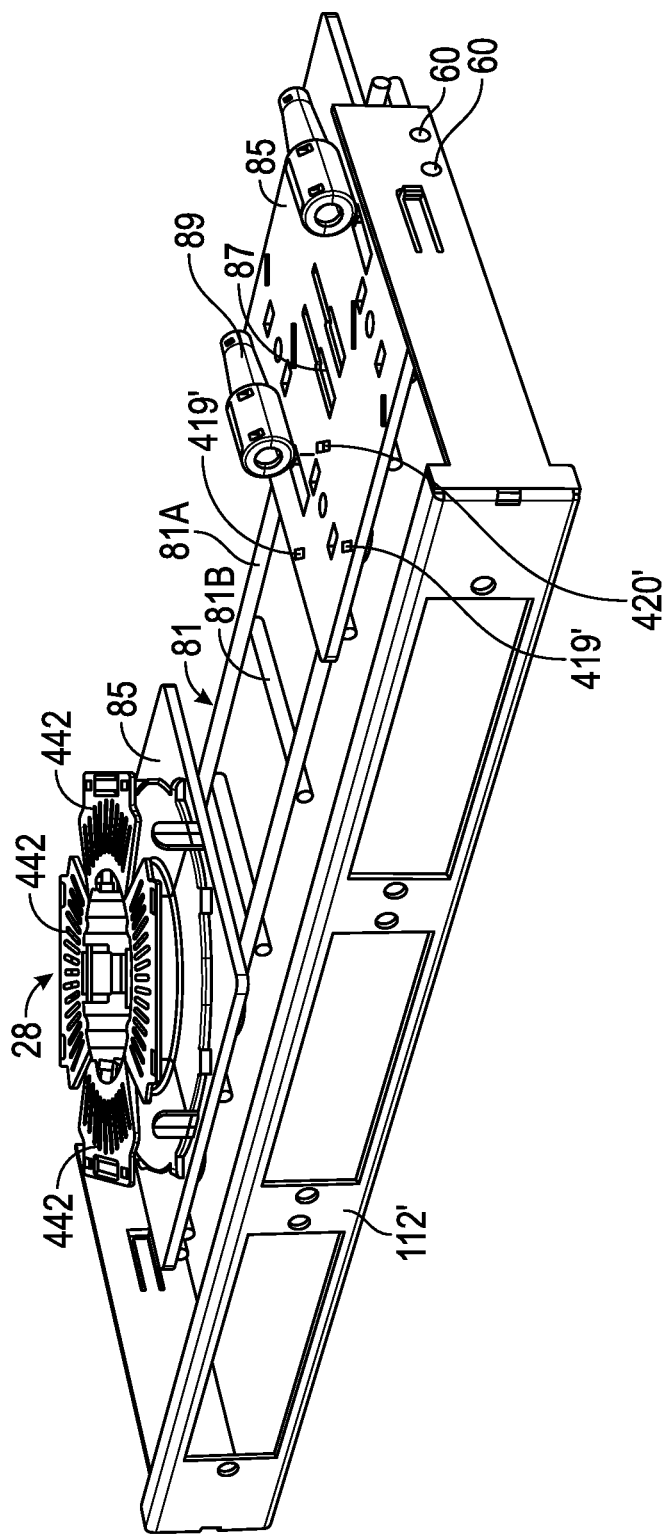
FIG. 43 is a side perspective view of an exemplary panel assembly.

With reference now to FIG. 43, panel assembly 112' of media patching system 10, 100 can include a manager member 81 that is removably mounted with respect to panel assembly 112' (e.g., when optional cable management plate 26 is not mounted relative to bracket members 20, 22). Similar to panel assembly 112 discussed above, exemplary panel assembly 112' can be movably mounted relative to bracket members 20, 22 (e.g., via one or more slots 30 or the like of bracket members 20, 22).

The inner surfaces of the side segments of panel assembly 112' can each include one or more protrusion members 60 that are configured to allow a securing member on each side of manager member 81 to removably mount to protrusion members 60.

In exemplary embodiments, manager member 81 includes one or more horizontal members 81A, and one or more vertical members 81B that are substantially transverse to members 81A, although the present disclosure is not limited thereto. Rather, manager member 81 can take a variety of shapes/designs/forms (e.g., shelf-like, wire-cage, etc.).

In some embodiments and as shown in FIG. 43, one or more mounting members 85 (as described and disclosed in U.S. Pat. No. 8,731,364, the entire contents of which is hereby incorporated by reference in its entirety) can be removably mounted to manager member 81. More particularly and as disclosed in the '364 patent, each mounting member 85 typically includes at least one attachment member that is configured to attach or mount with respect to various equipment (e.g., to manager member 81) or the like. Each mounting member 85 can include one or more apertures 87, each aperture 87 configured to releasably secure a breakout assembly 89 or the like.

As shown in FIG. 43, each exemplary mounting member 85 can also include one or more slots 419', 420' (e.g., similar to slots 419, 420 on plate 26) that are configured and dimensioned to allow spool members 442 (and cable management spool assemblies 28) to be mounted with respect to mounting member 85 (e.g., for cable management purposes). As noted above, upper spool members 442' can be mounted on top of the lower spool members 442 of FIG. 43 (e.g., an upper spool assembly 28' can be mounted on the spool assembly 28 shown in FIG. 43).

It is noted that FIG. 43 depicts a manager member 81 mounted relative to panel assembly 112'. However, it is noted that the other panel assemblies (e.g., 12, 12', 112) disclosed herein can also be similarly mounted with respect to manager member 81.

It is noted that when manager member 81 is secured to panel assembly 112', the manager member 81 thereby translates/moves along with panel assembly 112' when a user moves panel assembly 112' relative to bracket members 20, 22, which thereby does not allow the wires/cables 38, 40 secured to and/or associated with manager member 81 (e.g., the wires/cables 38, 40 secured to and/or associated with the spool assemblies 28 mounted to members 81, 85) to substantially move relative to the assemblies 14, 14A, 14B, 14C, 14D mounted to panel assembly 112', which advantageously reduces signal loss associated with the assemblies 14, 14A, 14B, 14C, 14D and their associated wires/cables 38, 40.

Figure 44:
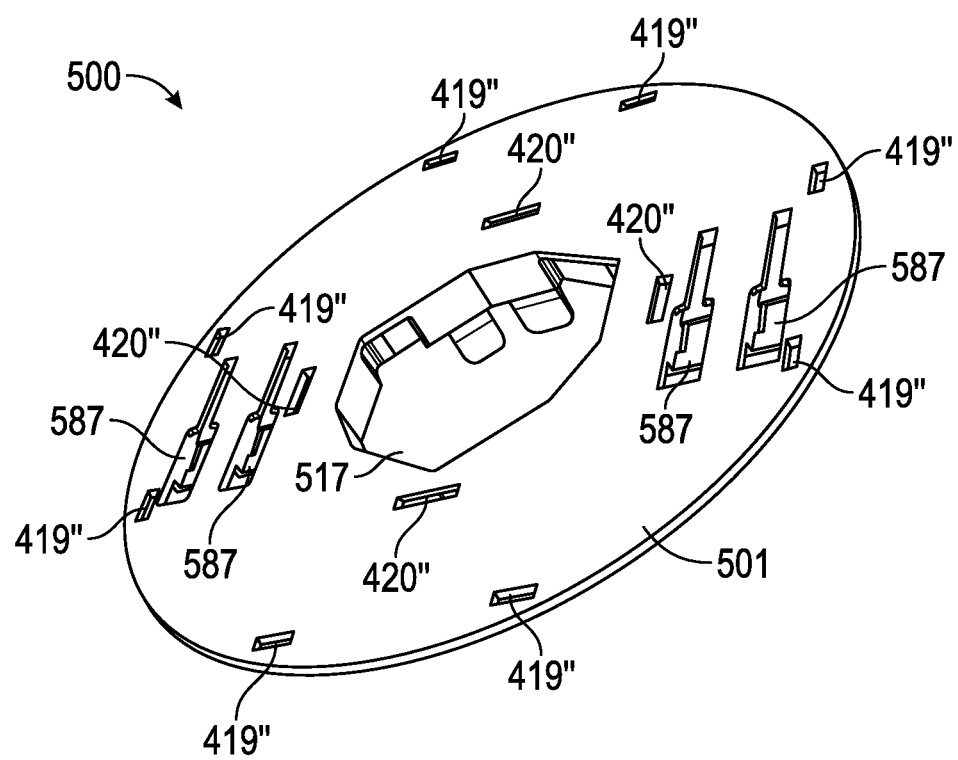
FIG. 44 is a front perspective view of an exemplary mounting body.
Figure 45:
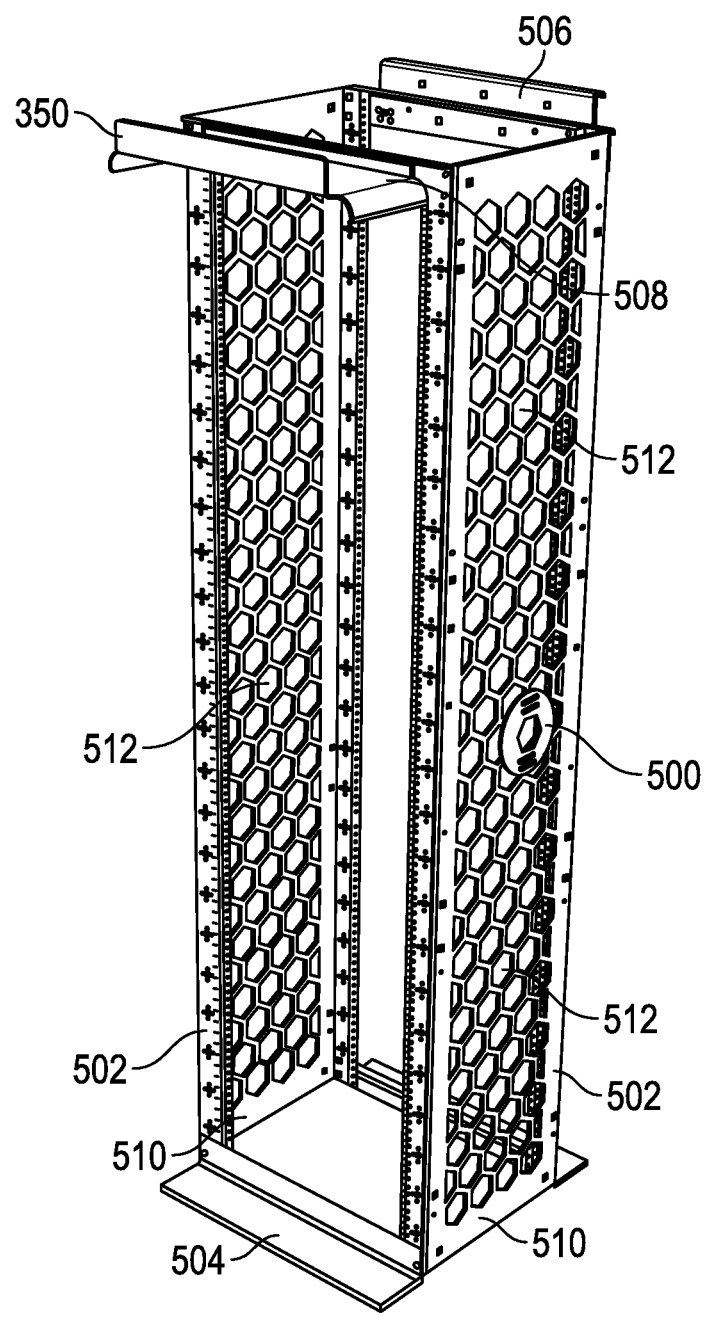
FIG. 45 is a perspective side view of an exemplary supporting structure having ventilated side panels in accordance with embodiments of the present disclosure, with a mounting body mounted to the supporting structure.

With reference to FIGS. 44-53, there is illustrated an embodiment of an exemplary mounting body 500 according to the present disclosure. In general, mounting body 500 is configured and dimensioned to allow spool members 442 (and cable management spool assemblies 28) to be mounted thereon (e.g., for cable management purposes). In exemplary embodiments and as discussed further below, mounting body 500 is configured to mount with respect to a supporting structure/unit 350 (e.g., a rack) or the like (FIG. 45). More particularly, mounting body 500 is configured to removably mount with respect to an aperture 512 of a supporting unit 350. In certain embodiments and as discussed below, exemplary aperture 512 has a substantially hexagonal shape or the like, although the present disclosure is not limited thereto.

It is noted that exemplary mounting bodies 500 are adapted for use in conjunction with a rack 350 (e.g., network or server rack) or the like, although the present disclosure is not limited thereto. Rather, the disclosed mounting bodies 500 are adapted for use in conjunction with other structures (e.g., frames, cabinets, patch panels, enclosures, supporting structures, or other structures that stand to benefit from proximate cable management functionality). The present disclosure is not limited by or to implementations wherein the disclosed mounting bodies 500 are mounted with respect to, or used in conjunction with, a rack, but may be mounted with respect to, or used in conjunction with any structure/unit that is in proximity to or otherwise associated with cable routing.

As shown in FIG. 45, an exemplary rack 350 is depicted. In certain embodiments, rack 350 defines a rectangular frame, and can include two or more upright members 502. The upright members 502 can be attached to a base 504 at a bottom margin of the frame. The upright members 502 may further be attached to a top member 506. The top member 506 may include a waterfall 508 for facilitating the formation of appropriately large bend radii in cables mounted with respect to the rack 350. It is also noted that media patching systems 10, 100 can be removably mounted with respect to rack 350, as discussed above in conjunction with FIG. 27.

Each of the upright members 502 may include side panel 510. Each side panel 510 may include a plurality of vent holes/apertures 512 for facilitating the passage of air through the side panel 510. For example, rack 350 is operable as a component of a ventilation system for delivering an improved flow of cooling air to one or more heat generating devices (e.g., devices associated with media patching system 10, 100) mounted with respect to the rack 350 through the vent holes 512 of a side panel 510, and/or to promote an effective flow of warm exhaust air through the vent holes 512 of a side panel 510.

In exemplary embodiments, the plurality of vent apertures 512 can extend across a predominant portion of the surface area of the side panel 510 to allow the side panel 510 to offer a relatively low level of resistance to the passage of air through the side panel 510 so that the rack 350 is able to deliver an effective flow of cooling air to a device/system 10, 100 through the vent apertures 512 of a side panel 510, and/or to eliminate an effective flow of exhaust air from the device/system 10, 100 through the vent apertures 512 of a side panel 510.

As shown in FIG. 45, exemplary vent apertures 512 can take the form of one or more regular or irregular arrays and collectively representing a predominant portion of the total area of the side panel 510 of the respective upright 502. It is noted that other arrangements of vent apertures 512 are possible.

In exemplary embodiments and as shown in FIG. 45, the vent apertures 512 can form one or more honeycomb-type arrays of polygonal (e.g., hexagonal) perforations through the side panel 510. For example, the respective shapes of the array and the individual perforations can be beneficial for purposes of achieving relatively high structural rigidity while simultaneously permitting a relatively high proportion of the area covered by the respective arrays to be open to the unhindered passage through the side panel 510 of respective flows of cooling and/or warm exhaust air with respect to the device/system 10, 100 mounted thereto.

It is noted that other shapes than a honeycomb shape may be provided for the array of vent apertures 512, and/or other shapes than a hexagonal shape may be provided for the vent apertures 512 themselves. For example, the vent apertures 512 may be arranged in an regular array of columns and rows (e.g., vertical columns and horizontal rows), and/or the vent holes themselves may define other shapes (e.g., polygonal shapes such as tetragons, pentagons, heptagons, octagons, etc., and/or regular or irregular shapes, circles, rhombi, etc., or combinations thereof).

Figure 53:
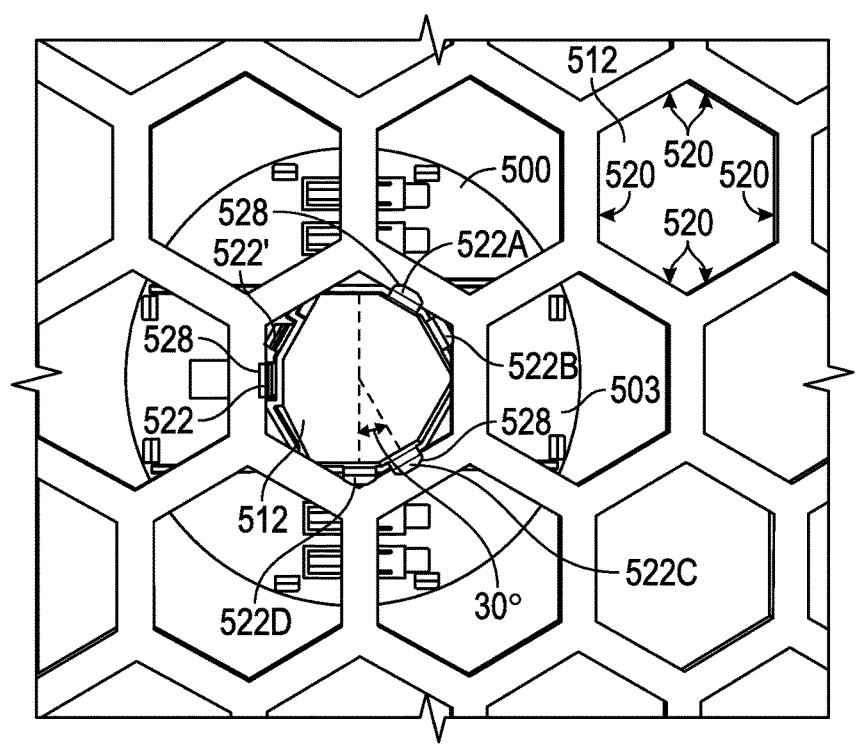
FIG. 53 is a partial exploded view of the supporting structure and mounting body of FIG. 45.

In general, each aperture 512 is defined by edges 520 of side panel 510. For example, each fully hexagonally-shaped aperture 512 is defined by six edges 520 of side panel 510 (FIG. 53). It is again noted that apertures 512 can take of variety of shapes (e.g., polygonal shapes) and/or geometries, and therefore can be defined by a variety of different numbers of edges 520.

As discussed further below, exemplary mounting bodies 500 of the present disclosure are advantageously configured and dimensioned to be mounted with respect to a vent aperture 512 of rack 350 (e.g., for cable management purposes via spool assemblies 28 mounted on bodies 500). For example, the exemplary mounting bodies 500 include attachment features/structures (e.g., an attachment flange 514 and/or attachment members 522) that are advantageously configured and dimensioned to releasably mount with respect to a user-selected aperture 512 of rack 350 (e.g., a user can mount mounting body 500 to one of a variety of different apertures 512 for differing mounting locations of mounting body 500 to rack 350). Moreover, the attachment features/structures of the exemplary mounting body 500 allow the body 500 to be releasably mounted at various angled positions relative to the rack 350 (and to aperture 512), as selected by a user.

As shown in FIGS. 44-53, exemplary mounting body 500 includes a top surface 501 and a bottom surface 503. In exemplary embodiments, mounting body 500 is fabricated from plastic or a polymeric material or the like, although the present disclosure is not limited thereto. Rather, it is noted that mounting body 500 can be fabricated from a variety of materials, and can take a variety of shapes, forms or geometries.

In certain embodiments, mounting body 500 is substantially circular in shape, although the present disclosure is not limited thereto. Rather, body 500 can take a variety of shapes/forms/designs (e.g., square, rectangular, polygonal, etc.). Mounting body 500 may include a hole 517 therethrough, as discussed further below.

Figure 49:
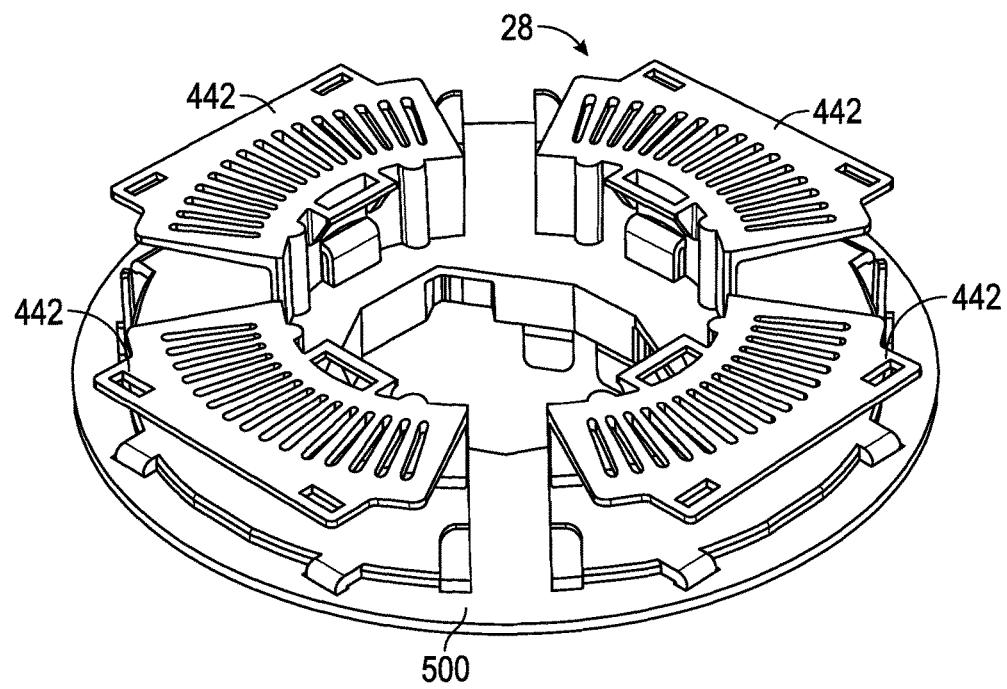
FIG. 49 is a side perspective view of the mounting body of FIG. 44, with spool members mounted thereon.

As shown in FIGS. 44, 49 and 50, exemplary mounting body 500 includes one or more slots 419", 420" (e.g., similar to slots 419, 420 on plate 26) that are configured and dimensioned to allow spool members 442 (and cable management spool assemblies 28) to be removably mounted with respect to body 500 (e.g., for cable management purposes). In some embodiments, upper spool members 442' can be mounted on top of the lower spool members 442 of FIG. 49 (e.g., an upper spool assembly 28' can be mounted on the spool assembly 28 shown in FIG. 49).

Figure 46:
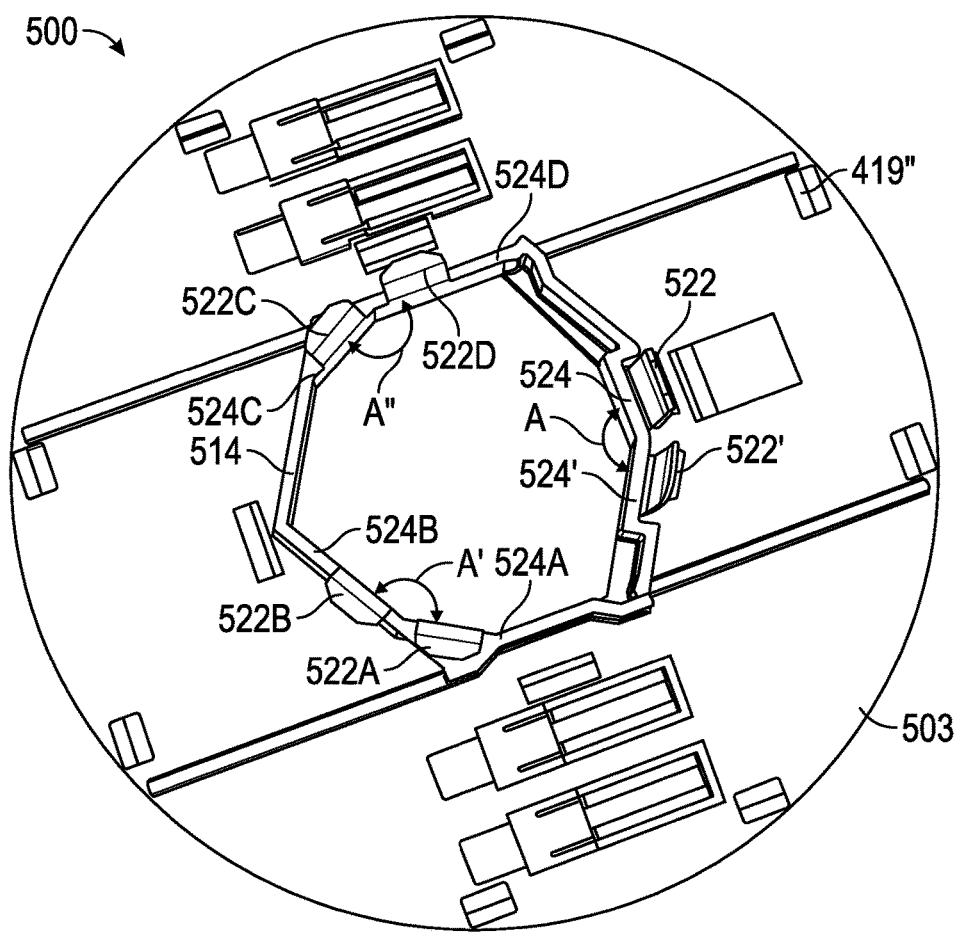
FIG. 46 is a rear view of the mounting body of FIG. 44.
Figure 47:
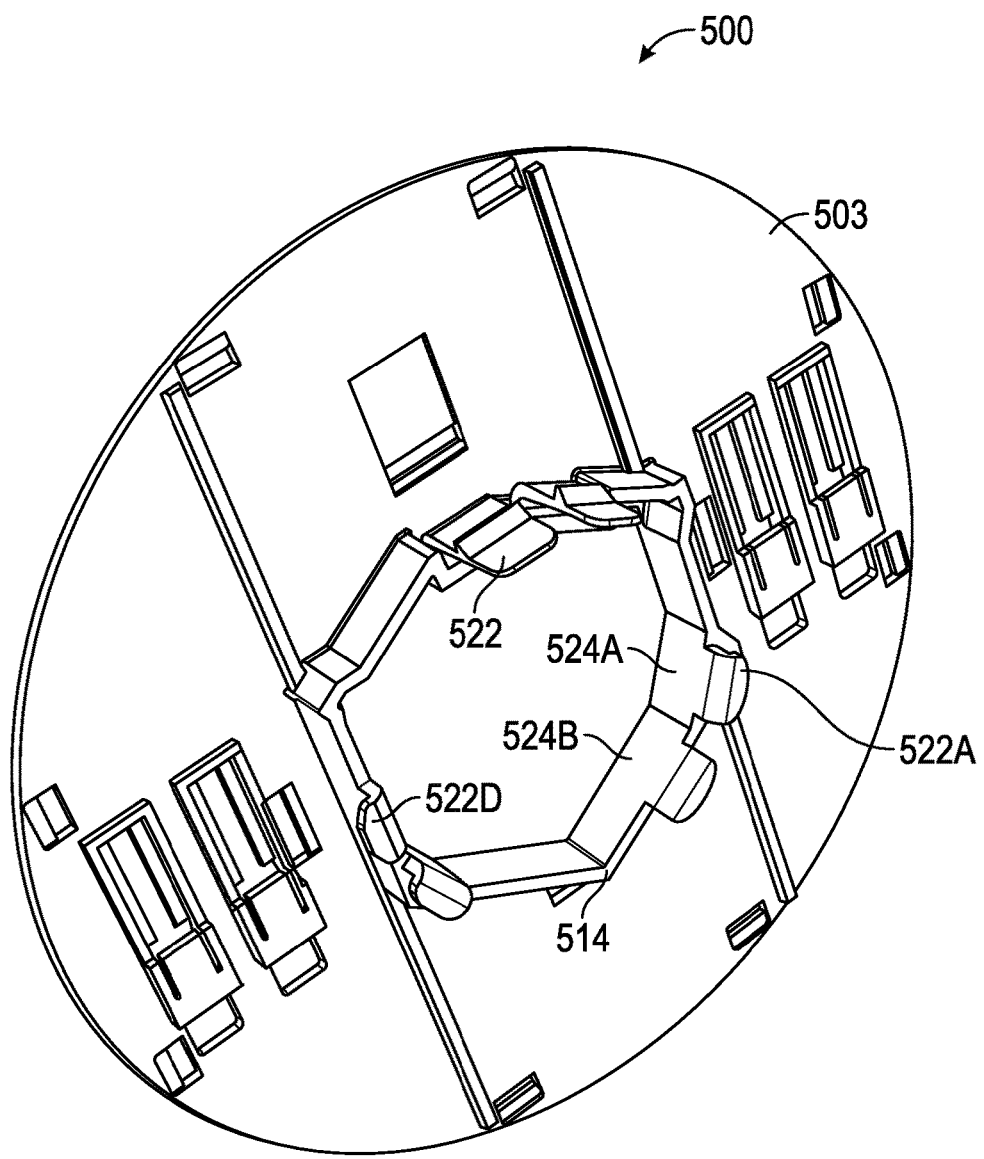
FIG. 47 is a rear perspective view of the mounting body of FIG. 44.
Figure 48:
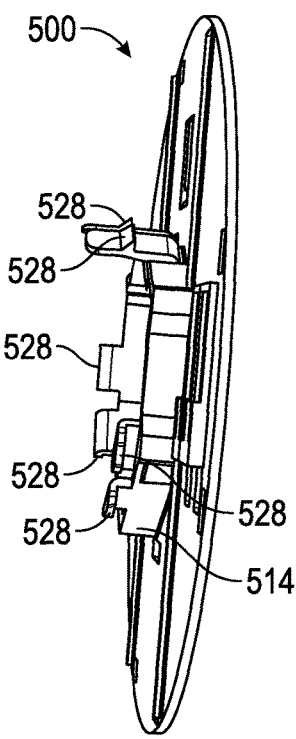
FIG. 48 is a side view of the mounting body of FIG. 44.

In exemplary embodiments and as shown in FIGS. 46-48, the mounting body 500 includes an attachment flange 514. Exemplary attachment flange 514 extends from bottom surface 503. As discussed further below, attachment flange 514 includes one or more attachment members 522 extending therefrom.

As noted, attachment flange 514 and attachment members 522 are advantageously configured and dimensioned to releasably mount with respect to a user-selected aperture 512 of rack 350. Exemplary attachment flange 514 and attachment members 522 allow the mounting body 500 to be releasably mounted at various angled positions relative to the rack 350, and relative to aperture 512, as selected by a user. It is noted that mounting body 500 can be mounted with respect to the exterior surface or to the interior surface of side panel 510 of rack 350.

In general, attachment flange 514 includes a plurality of flange walls 524, with the plurality of flange walls 524 defining attachment flange 514. Each attachment member 522 of attachment flange 514 typically extends from a different flange wall 524, although the present disclosure is not limited thereto. Rather, it is noted that more than one attachment member 522 can extend from each flange wall 524.

In exemplary embodiments and as shown in FIGS. 48 and 53, each attachment member 522 includes a securing portion 528. Securing portion 528 is configured and dimensioned to releasably secure/mount or snap-fit with respect to an edge 520 of aperture 512 for securement purposes of mounting body 500 (FIG. 53).

As shown in FIG. 46, the plurality of flange walls 524 defines a substantially hexagonal shape of attachment flange 514. It is noted that flange walls 524 can define other shapes/geometries of flange 514 (e.g., polygonal shapes).

Figure 52:
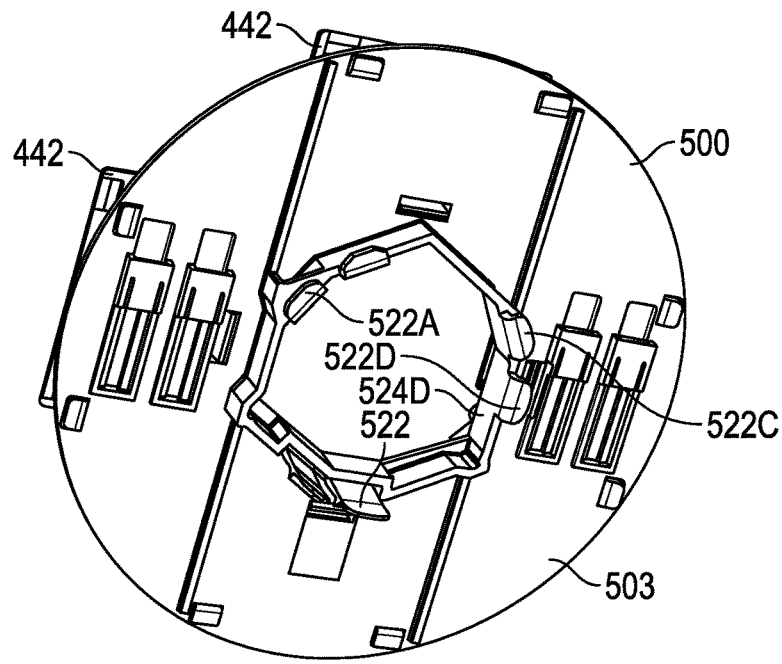
FIG. 52 is a rear perspective view of the mounting body of FIG. 49.

In exemplary embodiments and as shown in FIGS. 46, 47 and 52, flange 514 includes six attachment members 522, 522', 522A, 522B, 522C and 522D. Flange 514 can include any suitable number of attachment members 522, 522', etc.

As shown in FIGS. 46, 47 and 52, attachment member 522 extends from flange wall 524, attachment member 522' extends from flange wall 524', attachment member 522A extends from flange wall 524A, attachment member 522B extends from flange wall 524B, attachment member 522C extends from flange wall 524C, and attachment member 522D extends from flange wall 524D.

Flange walls 524 and 524' are proximal (e.g., adjacent) to one another, and each wall 524, 524' is angled at a pre-determined angle A (e.g., about 150°) relative to one another (FIG. 46). It is noted that at least one surface of walls 524, 524' can be angled at any suitable angle relative to one another.

Likewise, attachment members 522, 522' are proximal (e.g., adjacent) to one another, and each attachment member 522, 522' is angled at a pre-determined angle (e.g., about 150°) relative to one another. It is noted that attachment members 522, 522' are typically angled relative to one another at about the same angle (e.g., about 150°) that the walls 524, 524' are angled relative to one another. As such, exemplary walls 524, 524' are angled at about 150° relative to one another, and exemplary attachment members 522, 522' are angled at about 150° relative to one another. It is noted, however, that walls 524, 524' and/or members 522, 522' can be angled at other angles relative to one another (e.g., from about 90° to about 175°).

Flange walls 524A and 524B are proximal (e.g., adjacent) to one another, and each wall 524A, 524B is angled at a pre-determined angle A' (e.g., about 150°) relative to one another (FIG. 46). At least one surface of walls 524A, 524B can be angled at any suitable angle relative to one another.

Likewise, attachment members 522A, 522B are proximal (e.g., adjacent) to one another, and each attachment member 522A, 522B is angled at a pre-determined angle (e.g., about 150°) relative to one another. Attachment members 522A, 522B are typically angled relative to one another at about the same angle (e.g., about 150°) that the walls 524A, 524B are angled relative to one another. Exemplary walls 524A, 524B are angled at about 150° relative to one another, and exemplary attachment members 522A, 522B are angled at about 150° relative to one another. Walls 524A, 524B and/or members 522A, 522B can be angled at other angles relative to one another (e.g., from about 90° to about 175°).

Flange walls 524C and 524D are proximal (e.g., adjacent) to one another, and each wall 524C, 524D is angled at a pre-determined angle A" (e.g., about 150°) relative to one another. At least one surface of walls 524C, 524D can be angled at any suitable angle relative to one another.

Likewise, attachment members 522C, 522D are proximal (e.g., adjacent) to one another, and each attachment member 522C, 522D is angled at a pre-determined angle (e.g., about 150°) relative to one another. Attachment members 522C, 522D are typically angled relative to one another at about the same angle (e.g., about 150°) that the walls 524C, 524D are angled relative to one another. Exemplary walls 524C, 524D are angled at about 150° relative to one another, and exemplary attachment members 522C, 522D are angled at about 150° relative to one another. Walls 524C, 524D and/or members 522C, 522D can be angled at other angles relative to one another (e.g., from about 90° to about 175°).

As noted above, attachment flange 514 and attachment members 522, 522', etc. are advantageously configured and dimensioned to releasably mount with respect to a user-selected aperture 512 of rack 350 (e.g., a user can mount body 500 to one of a variety of different apertures 512 for differing mounting locations of body 500 to rack 350). Moreover, the attachment flange 514 and attachment members 522, 522', etc. allow the body 500 to be releasably mounted at various angled positions relative to the rack 350 (and relative to aperture 512), as selected by a user. Body 500 can be mounted with respect to the exterior surface, or to the interior surface of side panel 510 of rack 350.

It is also noted that a plurality of bodies 500 can be mounted with respect to side panel 510 of rack 350, with each body 500 mounted at differing mounting locations on rack 350 (e.g., to different apertures 512), and with each body 500 mounted at the same or different angled positions relative to the rack 350 (as selected by the user).

In certain embodiments, one or more bodies 500 are mounted with respect to side panel 510 of rack 350, and media cables 38, 40 from a cable/wire manager assembly or the like (e.g., a vertical cable manager assembly positioned between two adjacent/proximal racks 350) travel from the cable/wire manager assembly to the one or more bodies 500 (e.g., to spool assemblies 28 on bodies 500) for cable management purposes (e.g., to advantageously provide support for media cables 38, 40 during their travel from the front to the rear of the racks 350, and/or between adjacent racks 350). It is noted that media cables 38, 40 can pass through hole 517 of body 500 for cable management/support purposes (FIG. 44). Additionally, it is noted that mounted body 500 to rack 350 does not impede the flow of air (e.g., cooling or exhaust air) through side panels 510 of rack (e.g., via air flowing thorough hole 517). It certain embodiments, the shape of hole 517 substantially matches up with and aligns with aperture 512 when body 500 is mounted to that particular aperture 512.

In some embodiments, when body 500 is mounted with respect to side panel 510 at a first angled position relative to side panel 510, at least a portion of the securing portions 528 of attachment members 522, 522A and 522C are engaged with and/or releasably mounted with respect to a respective edge 520 of aperture 512. In some embodiments and in this first angled position relative to side panel 510 as shown in FIG. 53, the securing portions 28 of attachments members 522', 522B and 522D are unable to engage with and/or releasably mount with respect to a respective edge 520 of aperture 512.

However, it is to be noted that in this first angled position of FIG. 53, the securing portions 528 of attachments members 522', 522B and 522D could be configured and dimensioned to be engaged with and/or releasably mounted with respect to a respective edge 520 of aperture 512, along with the securing portions 528 of attachment members 522, 522A and 522C (e.g., depending on the pre-determined angle between the respective attachment members 522, 522', etc.).

It is noted that body 500 can be mounted with respect to side panel 510 at a second angled position relative to side panel 510 where at least a portion of the securing portions 528 of attachment members 522', 522B and 522D are engaged with and/or releasably mounted with respect to a respective edge 520 of aperture 512. In certain embodiments and in this second angled position relative to side panel 510, the securing portions 528 of attachments members 522, 522A and 522C are unable to engage with and/or releasably mount with respect to a respective edge 520 of aperture 512.

However, it is to be noted that in this second angled position, the securing portions 528 of attachments members 522, 522A and 522C could be configured and dimensioned to be engaged with and/or releasably mounted with respect to a respective edge 520 of aperture 512, along with the securing portions 528 of attachment members 522', 522B and 522D (e.g., depending on the pre-determined angle between the respective attachment members 522, 522', etc.).

As such, exemplary mounting bodies 500 are configured and dimensioned to be releasably mounted with respect to an exemplary aperture 512 (e.g., a substantially hexagonal aperture 512) of side panel 510 in at least 12 different angled positions relative to side panel 510 and to aperture 512 (e.g., when attachment members 522 and 522' are angled at an angle of about 150° relative to one another, and when attachment members 522A and 522B are angled at an angle of about 150° relative to one another, and when attachment members 522C and 522D are angled at an angle of about 150° relative to one another). Stated another way, a user can move and then mount exemplary bodies 500 in about 30° angle increments (FIG. 53) around hexagonal aperture 512 (e.g., a user can move and mount bodies 500 of the present disclosure 360° around hexagonal aperture 512 in 30° increments).

Again, depending on the pre-determined angle between the respective attachment members 522, 522', etc., and depending on the shape/geometry (e.g., polygonal shape) of apertures 512, it is noted that bodies 500 could be mounted with respect to other such apertures 512 in a variety of different angled positions relative to rack 350, with a variety of combinations of attachment members 522, 522' etc. mounting to a respective edge 520 at each angled mounting position of bodies 500.

In some embodiments, it is noted that one or more breakout assemblies 89 (e.g., fiber optic breakout assemblies 89—FIG. 43) can be mounted with respect to body 500 (e.g., in lieu of a spool member 442), as described and disclosed in U.S. Pat. No. 8,731,364 noted above. More particularly and as shown in FIG. 44, body 500 can include one or more mating features or apertures 587, with each mating feature/aperture 587 configured to releasably secure a breakout assembly 89 (FIGS. 43 and 44) thereto as described and disclosed in U.S. Pat. No. 8,731,364. Mounting body 500 can include any number of mating features/apertures 587 for breakout assembly 89 mounting purposes (e.g., one, two, three, four, a plurality, etc.).

Moreover, body 500 can include one or more mounting features (e.g., similar to 587), with each mounting feature configured and dimensioned to allow a cable strain relief member or cable management element or the like to be mounted with respect to mounting body 500. Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A cable management assembly comprising:
   a mounting body;
   a first spool member having an inner wall, with a top wall and a bottom wall extending from the inner wall to define a cavity configured to support and at least partially house media cables;
   at least one flange extending from the bottom wall, the at least one flange configured to releasably mount to the mounting body; and
   at least one additional spool member, each of the at least one additional spool members having an inner wall and a top wall and a bottom wall extending from the inner wall to define a cavity configured to support and at least partially house media cables, with at least one flange extending from each bottom wall, each flange configured to releasably mount to the mounting body;
   wherein the inner, top and bottom walls of the first spool member and each additional spool member each extend substantially arcuately from a first end to a second end;
   wherein when the first spool member and each additional spool member are mounted to the mounting body, the inner, top and bottom walls of the plurality of spool members are positioned so that: (i) the inner walls of the plurality of spool members define a substantially circular and substantially continuous inner surface, (ii) the top walls of the plurality of spool members define a substantially circular and substantially continuous top surface, and (iii) the bottom walls of the plurality of spool members define a substantially circular and substantially continuous bottom surface;
   wherein the mounting body is an upper cable management plate slidably secured to a lower cable management plate, the upper cable management plate disposed in a retracted position relative to the lower cable management plate in a first configuration and the upper cable management plate disposed in an extended position relative to the lower cable management plate in a second configuration;
   wherein the upper cable management plate includes a body with first and second side edges and a flange extending from each of the first and second side edges, each of the flanges of the upper cable management plate including an elongated slot;
   further comprising fastening members passing through the elongated slots and secured to the lower cable management plate, the upper cable management plate sliding along the fastening members relative to the lower cable management plate;
   wherein the fastening members include a cam lock mechanism including a first cam portion and a second cam portion.

2. The assembly of claim 1, wherein the first spool member includes at least one slot positioned on its respective top wall;
   wherein the slot of the first spool member is configured to releasably mount to a first upper spool member.

3. The assembly of claim 1, wherein the bottom wall of the first spool member extends from an inner end to an outer end; and
   wherein the at least one flange extending from the bottom wall of the first spool member includes a first flange extending from the inner end, and the outer end includes a second and a third flange, with the first, second and third flanges each configured to releasably mount to the mounting body.

4. The assembly of claim 1, wherein the top wall of the first spool member extends from an inner end to an outer end; and
   wherein the inner end includes a first slot and the outer end includes a second and a third slot, with the first, second and third slots positioned on the top wall and configured to releasably mount to a first upper spool member.

5. The assembly of claim 1, wherein the top and bottom walls of the first spool member are substantially parallel to one another, and the inner wall of the first spool member is substantially perpendicular to the top and bottom walls.

6. A cable management assembly comprising:
   a mounting body;
   a first spool member having an inner wall, with a top wall and a bottom wall extending from the inner wall to define a cavity configured to support and at least partially house media cables;
   at least one flange extending from the bottom wall, the at least one flange configured to releasably mount to the mounting body;
   a second spool member, a third spool member and a fourth spool member, the second, third and fourth spool members each having an inner wall, a top wall and a bottom wall, with the inner, top and bottom walls of the second, third and fourth spool members each defining a respective cavity configured to support and at least partially house media cables, and the second, third and fourth spool members each including at least one flange extending from its respective bottom wall, each flange configured to releasably mount to the mounting body;
   wherein the inner, top and bottom walls of the first, second, third and fourth spool members each extend substantially arcuately from a first end to a second end;
   wherein when the first, second, third and fourth spool members are releasably mounted to the mounting body, the inner, top and bottom walls of the first, second, third and fourth spool members are positioned so that: (i) the inner walls of the first, second, third and fourth spool members define a substantially circular and substantially continuous inner surface, (ii) the top walls of the first, second, third and fourth spool members define a substantially circular and substantially continuous top surface, and (iii) the bottom walls of the first, second, third and fourth spool members define a substantially circular and substantially continuous bottom surface;
   wherein the mounting body is an upper cable management plate slidably secured to a lower cable management plate, the upper cable management plate disposed in a retracted position relative to the lower cable management plate in a first configuration and the upper cable management plate disposed in an extended position relative to the lower cable management plate in a second configuration;

wherein the upper cable management plate includes a body with first and second side edges and a flange extending from each of the first and second side edges, each of the flanges of the upper cable management plate including an elongated slot;

further comprising fastening members passing through the elongated slots and secured to the lower cable management plate, the upper cable management plate sliding along the fastening members relative to the lower cable management plate;

wherein the fastening members include a cam lock mechanism including a first cam portion and a second cam portion.

7. The assembly of claim 6, wherein the first, second, third and fourth spool members each include at least one slot positioned on its respective top wall;

wherein the slot of the first spool member is configured to releasably mount to a first upper spool member;

wherein the slot of the second spool member is configured to releasably mount to a second upper spool member;

wherein the slot of the third spool member is configured to releasably mount to a third upper spool member; and wherein the slot of the fourth spool member is configured to releasably mount to a fourth upper spool member.

8. The assembly of claim 6, wherein the bottom wall of the first spool member extends from an inner end to an outer end; and wherein the at least one flange extending from the bottom wall of the first spool member includes a first flange extending from the inner end, and the outer end includes a second and a third flange, with the first, second and third flanges each configured to releasably mount to the mounting body.

9. The assembly of claim 6, wherein the top wall of the first spool member extends from an inner end to an outer end; and wherein the inner end includes a first slot and the outer end includes a second and a third slot, with the first, second and third slots positioned on the top wall and configured to releasably mount to a first upper spool member.

10. The assembly of claim 6, wherein the top and bottom walls of the first spool member are substantially parallel to one another, and the inner wall of the first spool member is substantially perpendicular to the top and bottom walls.

11. The assembly of claim 1, wherein in the retracted position the upper cable management plate is slidably retracted relative to the lower cable management plate such that the fastening members are disposed adjacent to a distal end of the elongated slots.

12. The assembly of claim 1, wherein in the extended position the upper cable management plate is slidably extended relative to the lower cable management plate such that the fastening members are disposed adjacent to a proximal end of the elongated slots.

13. The assembly of claim 1, wherein in the extended position the upper cable management plate can rotate about the fastening members.

14. The assembly of claim 1, wherein the first cam portion is configured to impart a force on the second cam portion to create a friction force on the upper cable management plate, the friction force preventing sliding of the upper cable management plate relative to the lower cable management plate.

15. The assembly of claim 1, wherein the lower cable management plate includes two side flanges having holes that are spaced to allow the mounting body to be fixedly secured to either a patch panel enclosure or a rack.

16. The assembly of claim 6, wherein in the retracted position the upper cable management plate is slidably retracted relative to the lower cable management plate such that the fastening members are disposed adjacent to a distal end of the elongated slots.

17. The assembly of claim 6, wherein in the extended position the upper cable management plate is slidably extended relative to the lower cable management plate such that the fastening members are disposed adjacent to a proximal end of the elongated slots; and wherein in the extended position the upper cable management plate can rotate about the fastening members.

18. The assembly of claim 6, wherein the first cam portion is configured to impart a force on the second cam portion to create a friction force on the upper cable management plate, the friction force preventing sliding of the upper cable management plate relative to the lower cable management plate.

19. The assembly of claim 6, wherein the lower cable management plate includes two side flanges having holes that are spaced to allow the mounting body to be fixedly secured to either a patch panel enclosure or a rack.

* * * * *